US007042513B2

(12) United States Patent
Kondo et al.

(10) Patent No.: US 7,042,513 B2
(45) Date of Patent: May 9, 2006

(54) INFORMATION SIGNAL PROCESSING DEVICE, INFORMATION SIGNAL PROCESSING METHOD, IMAGE SIGNAL PROCESSING DEVICE, IMAGE SIGNAL PROCESSING METHOD AND IMAGE DISPLAYING METHOD USING IT, COEFFICIENT KIND DATA GENERATING DEVICE AND METHOD USED THEREIN, AND COMPUTER READABLE MEDIUM AND PROGRAM

(75) Inventors: Tetsujiro Kondo, Tokyo (JP); Wataru Niitsuma, Tokyo (JP); Yasushi Tatehira, Kanagawa (JP); Nobuyuki Asakura, Tokyo (JP); Takuo Morimura, Kanagawa (JP); Kei Hiraizumi, Kanagawa (JP); Takahide Ayata, Kanagawa (JP)

(73) Assignee: Sony Corporation, Tokyo (JP)

( * ) Notice: Subject to any disclaimer, the term of this patent is extended or adjusted under 35 U.S.C. 154(b) by 546 days.

(21) Appl. No.: 10/239,484

(22) PCT Filed: Jan. 22, 2002

(86) PCT No.: PCT/JP02/00412

§ 371 (c)(1),
(2), (4) Date: Mar. 24, 2003

(87) PCT Pub. No.: WO02/058386

PCT Pub. Date: Jul. 25, 2002

(65) Prior Publication Data

US 2003/0164896 A1 Sep. 4, 2003

(51) Int. Cl.
*H04N 7/01* (2006.01)
(52) U.S. Cl. ..................................... 348/458; 348/441
(58) Field of Classification Search ................ 348/443, 348/452, 458, 448, 441, 554, 581; 345/660, 345/667; 382/299–301; 708/442, 445, 109, 708/313; H04N 7/01, 11/20
See application file for complete search history.

(56) References Cited

U.S. PATENT DOCUMENTS 5,945,044 A    8/1999  Kawai et al.

(Continued)

FOREIGN PATENT DOCUMENTS

| EP | 0 975 156 | 1/2000 |
| JP | 9-74543 | 3/1997 |
| JP | 10-313445 | 11/1998 |

(Continued)

*Primary Examiner*—Sherrie Hsia
(74) *Attorney, Agent, or Firm*—Frommer Lawrence & Haug LLP; William S. Frommer

(57) ABSTRACT

The present invention relates to an information signal processor and the like preferable for use in the case of converting a format of an image signal or converting an image size. An input image signal, Vin, is converted into an output image signal, Vout that has different format and/or size therefrom. A class code, CL, is obtained from tap data extracted from the Vin and corresponding to each pixel (pixel at a target position) within a unit pixel block, which constitutes Vout. Product-sum device 137 generates the coefficient data, $a_{i0}$ to $a_{i8}$, in the upper layered production equation in each class according to the lower layered production equation using coefficient seed data, $b_{ij0}$ to $b_{ij8}$, of each class and resolution information, g and f, during vertical blanking period, while it generates the coefficient data, Wi, in the estimated equation, according to the upper layered production equation during effective vertical scanning period using the coefficient data, $a_{i0}$ to $a_{i8}$, in connection with the class code CL and phase information, h and v. A calculation circuit 127 provides pixel data, y, at the target position according to the estimated equation using the tap data, xi, corresponding to the target position and the coefficient data, Wi, obtained by the product-sum device 137.

49 Claims, 18 Drawing Sheets

U.S. PATENT DOCUMENTS 5,946,044 A * 8/1999 Kondo et al. ................ 348/458
6,034,734 A * 3/2000 De Haan et al. ............ 348/458
6,057,885 A * 5/2000 Horishi et al. ............... 348/458
6,509,930 B1 * 1/2003 Hirano et al. ................ 348/452

FOREIGN PATENT DOCUMENTS

| JP | 2000-41223 | 2/2000 |
| JP | 2000-69435 | 3/2000 |
| JP | 2000-115717 | 4/2000 |

* cited by examiner

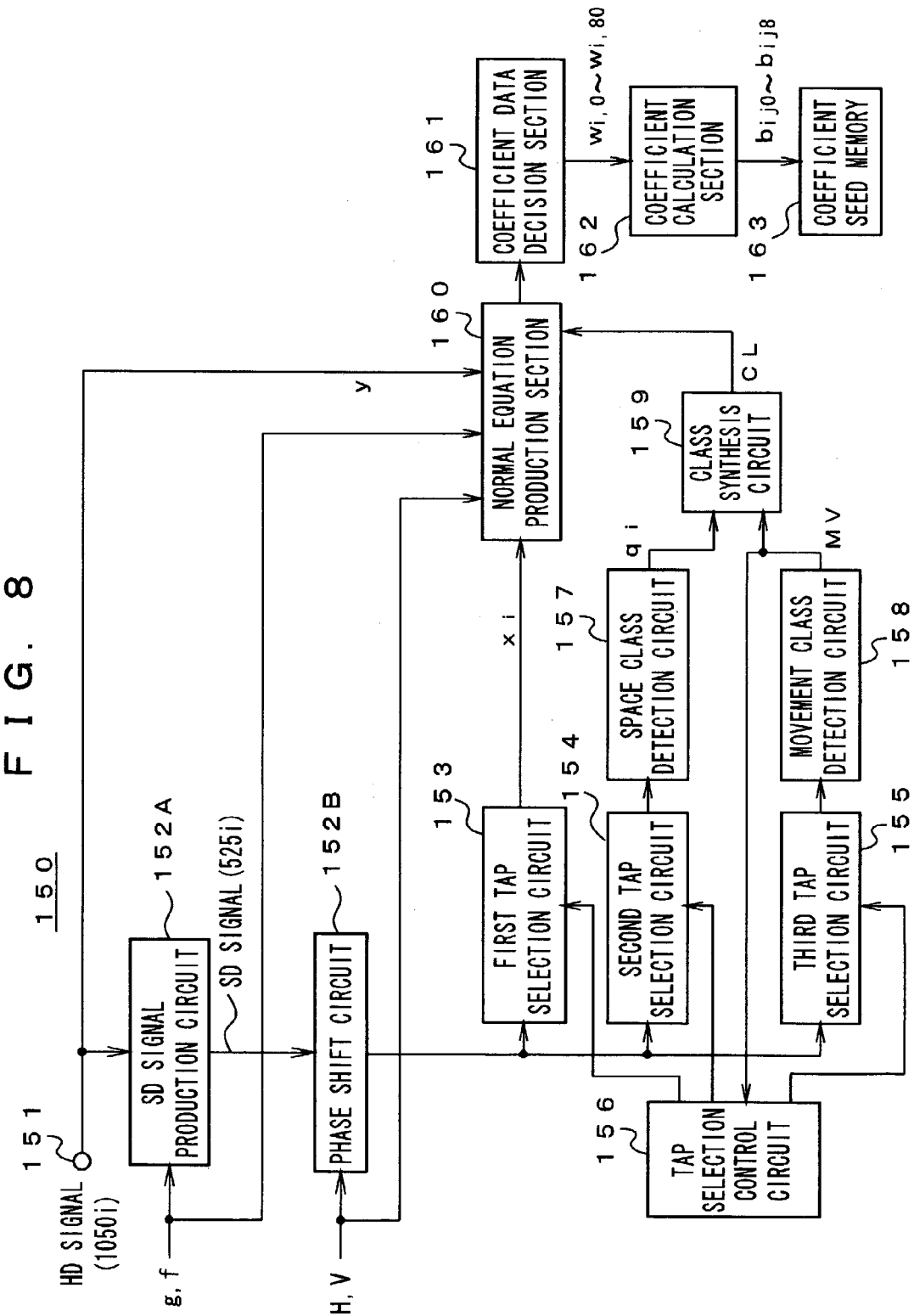

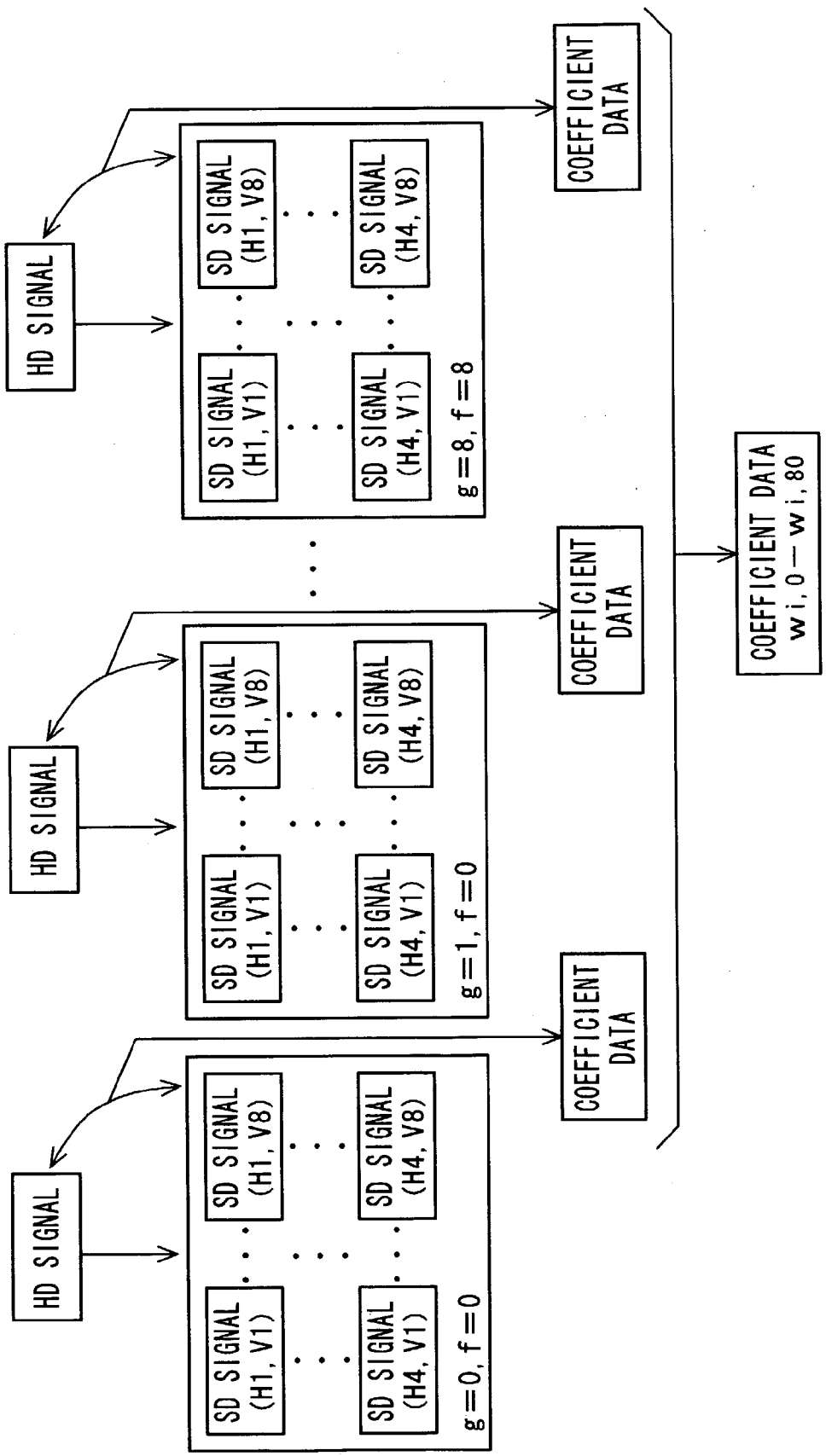

VERTICAL

HORIZONTAL

INFORMATION SIGNAL PROCESSING DEVICE, INFORMATION SIGNAL PROCESSING METHOD, IMAGE SIGNAL PROCESSING DEVICE, IMAGE SIGNAL PROCESSING METHOD AND IMAGE DISPLAYING METHOD USING IT, COEFFICIENT KIND DATA GENERATING DEVICE AND METHOD USED THEREIN, AND COMPUTER READABLE MEDIUM AND PROGRAM

TECHNICAL FIELD

The present invention relates to an information signal processor, a method for processing an information signal, an image signal processor, a method for processing image signal, an image display apparatus using the same, a coefficient seed data production device used in the same, a method for producing coefficient seed data, and computer-readable medium and program, which are preferable for use in the case of, for example, converting a first information signal to second information signal.

More specifically, the present invention relates to an information signal processor and the like wherein coefficient data in estimated equation, which is for use in the case of converting a first information signal to second information signal, is produced using a production equation classified in a hierarchy in more than one layers, thereby reducing processing amount in each step and the scale of hardware, and making effective use thereof.

BACKGROUND ART

In order to convert formats or image sizes, it is required to acquire pixel data having a phase different from a phase of pixel data of an input image signal so as to obtain an output image signal therefrom. In this case, the format or the image size thus converted makes a phase relationship of the pixel of the output image signal to the pixel of the input image signal univocally determined.

As an example of a format conversion, description will be made as to a case where an input image signal is a 525i signal and an output image signal is a 1080i signal. The 525i signal means an image signal in an interlace system consisting of 525 lines. The 1080i signal means an image signal in an interlace system consisting of 1080 lines. FIG. 16 shows a positional relationship between the pixels of the 525i signal and the pixels of the 1080i signal. Herein, large dots are pixels of the 525i signal, and small dots are pixels of the 1080i signal. Solid lines express the positions of pixels in odd fields and broken lines express the positions of pixels in even fields.

When converting the 525i signal into the 1080i signal, it is required to obtain a pixel block in the unit of 9×9 of the 1080i signal in correspondence with each pixel block in the unit of 4×4 of the 525i signal in the respective odd and even fields.

FIG. 17 shows a phase relationship in a vertical direction between the pixels of the 525i signal and the pixels of the 1080i signal. In FIG. 17, the numerical value assigned to each pixel (indicated as a smaller circle) of the 1080i signal means a shortest distance from the pixel (indicated as a larger circle) of the 525i signal in a vertical direction. In this case, the interval between the pixels of the 525i signal in a vertical direction is set to 16. In this FIG. 17, each of the numerical values assigned to each pixel of the 1080i signal shows phase information of this pixel in a vertical direction with respect to the pixel of the 525i signal.

The phase information is set to a negative value when the pixel of the 1080i signal is located at a position upper than the pixel of the 525i signal (i.e. a pixel located at the shortest distance from this pixel of the 1080i signal), while it is set to a positive value when the pixel of the 1080i signal is located at a position lower than the pixel of the 525i signal. The same thing is applied to the drawing showing a phase relationship in a vertical direction between an extended graphics array (XGA) signal and the 525i signal, which will be described later.

FIG. 18 shows a phase relationship in a horizontal direction between the pixels of the 525i signal and the pixels of the 1080i signal. In FIG. 18, the numerical value assigned to each pixel (indicated as a smaller circle) of the 1080i signal means a shortest distance from the pixel (indicated as a larger circle) of the 525i signal in a horizontal direction. In this case, the interval between the pixels of the 525i signal in a horizontal direction is set to 8. In this FIG. 18, each of the numerical values assigned to the pixel of the 1080i signal shows phase information of this pixel in a horizontal direction with respect to the pixel of the 525i signal.

The phase information is set to a negative value when the pixel of the 1080i signal is located at a position more left to the pixel of the 525i signal (i.e. a pixel located at the shortest distance from this pixel of the 1080i signal) while it is set to a positive value when the pixel of the 1080i signal is at a position more right to the pixel of the 525i signal. The same thing is applied to the drawing showing a phase relationship in a horizontal direction between the XGA signal and the 525i signal, which will be described later.

Next, as an example of a format conversion, description will be made as to a case where an input image signal is a 525i signal and an output image signal is an XGA signal. The XGA signal is an image signal in a progressive system (i.e. non-interlace system) available at a display with a resolution of 1024×768 dots. FIG. 19 shows a positional relationship between the pixels of the 525i signal and the pixels of the XGA signal. Herein, large dots are pixels of the 525i signal, and small dots are pixels of the XGA signal. In addition, as to the 525i signal, solid lines express the positions of pixels in odd fields and broken lines express the positions of pixels in even fields.

When converting the 525i signal into the XGA signal, it is required to obtain a 8×16 pixel block of the 1080i signal in correspondence with each 5×5 pixel block of the 525i signal in the respective odd and even fields.

FIG. 20 shows a phase relationship in a vertical direction between the pixels of the 525i signal and the pixels of the XGA signal. In FIG. 20, each of the numerical values assigned to the pixels of the XGA signal means a shortest distance from the pixel of the 525i signal in a vertical direction. In this case, the interval between the pixels of the 525i signal in a vertical direction is set to 16. In this manner, each of the numerical values assigned to the pixels of the XGA signal shows phase information of this pixel in a vertical direction with respect to the pixel of the 525i signal.

FIG. 21 shows a phase relationship in a horizontal direction between the pixels of the 525i signal and the pixels of the XGA signal. In FIG. 21, each of the numerical values assigned to the pixels of the XGA signal means a shortest distance from the pixel of the 525i signal in a horizontal direction. In this case, the interval between the pixels of the 525i signal in a horizontal direction is set to 8. In this manner, each of the numerical values assigned to the pixels of the XGA signal shows phase information of this pixel in a horizontal direction with respect to the pixel of the 525i signal.

Although an example of image size conversion is not specifically shown, the phase relationship of the pixels of the output image signal to the pixels of the input image signal is uniquely determined, as is the case of the format conversion described above. For example, in the case where the size of an image (magnification of a displayed image) is magnified by 9/4 times in both vertical and horizontal directions, the same phase relationship is obtained as the phase relationship between the 525i signal and the 1080i signal described above.

Conventionally, it has been suggested to employ the following method at the time when pixel data of an output image signal is to be obtained from pixel data of an input image signal in order to convert formats or image sizes. That is, coefficient data of an estimated equation corresponding to each phase of the pixel of the output image signal with respect to the pixel of the input image signal is stored in a memory. Then, by use of thus-obtained coefficient data, pixel data of the output image signal is obtained by the estimated equation.

As described above, if the format or the image size is different between before and after the conversion, then the phase relationship of the pixels of the output image signal to the pixels of the input image signal becomes different between before and after conversion accordingly. For this reason, if the coefficient data in estimated equation is to be stored in the memory when converting format or image size into various ones, it is required to store the coefficient data therein corresponding to each format or image size in the memory. Further, if image quality is adaptable for many steps when conversions into various formats or sizes are performed, it is required to store coefficient data into the memory in correspondence with each step. In such a case, therefore, it is required to install a memory capable of storing a large amount of coefficient data. This causes inconvenience that the conversion apparatus becomes expensive, and the like.

DISCLOSURE OF INVENTION

An objective of the present invention is to avoid installing memory for storing a large amount of coefficient data in order to performing conversion into various formats or size and adapt the image quality for many steps.

Another objective of the present invention is to reduce processing amount in each step when coefficient data is produced according to the production equation in order to avoid installing memory for storing the coefficient data, to reduce the scale of hardware, and to make effective use thereof.

An information signal processor in accordance with the present invention for converting a first information signal including plural sets of informational data into a second information signal including plural sets of informational data, comprises parameter-setting means for setting values of plural parameters in connection with the second information signal, first memory means for storing coefficient seed data, the coefficient seed data being coefficient data in a production equation for producing coefficient data to be used in an estimated equation, the production equation being classified in a hierarchy in more than one layers, the lowest layered production equation including the plural parameters and the coefficient seed data, coefficient data generation means for generating the coefficient data to be used in the estimated equation corresponding to the values of plural parameters set by the parameter-setting means, the coefficient data in the estimated equation being produced according to the production equation classified in a hierarchy in more than one layers using the coefficient seed data stored in the first memory means and the set values of plural parameters, first data selection means for selecting plural sets of first informational data located in periphery of target position in the second information signal, based on the first information signal, and calculation means for calculating and obtaining informational data of the target position based on the estimated equation using the coefficient data generated in the coefficient data generation means and the plural sets of the first informational data selected in the first data selection means.

Further, a method for processing an information signal in accordance with the present invention for converting a first information signal including plural sets of informational data into a second information signal including plural sets of informational data comprises a first step of setting values of plural parameters in connection with the second information signal, a second step of generating coefficient data to be used in estimated equation corresponding to the values of plural parameters set by the first step, the coefficient data in the estimated equation being produced according to the production equation classified in a hierarchy in more than one layers using coefficient seed data and the set values of plural parameters, the coefficient seed data being coefficient data in production equation for producing coefficient data to be used in an estimated equation, the lowest layered production equation including the plural parameters and the coefficient seed data, a third step of selecting plural sets of first informational data located in periphery of a target position in the second information signal based on the first information signal, and a fourth step of calculating and obtaining informational data of the target position based on the estimated equation using the coefficient data generated in the second step and the plural sets of first informational data selected in the third step.

Further, a program in accordance with the present invention allows a computer to execute the above method for processing the information signal described above. Additionally, a computer readable medium in accordance with the present invention allows recording the above program.

Further, an image signal processor in accordance with the present invention for converting a first image signal including plural sets of pixel data into a second image signal including plural sets of pixel data, comprises parameter-setting means for setting values of plural parameters in connection with the second image signal, first memory means for storing coefficient seed data, the coefficient seed data being coefficient data in a production equation for producing coefficient data to be used in an estimated equation, the production equation being classified in a hierarchy in more than one layers, the lowest layered production equation including the plural parameters and the coefficient seed data, coefficient data generation means for generating the coefficient data to be used in the estimated equation corresponding to the values of plural parameters set by the parameter-setting means, the coefficient data in the estimated equation being produced according to the production equation classified in a hierarchy in more than one layers using the coefficient seed data stored in the first memory means and the set values of plural parameters, first data selection means for selecting plural sets of first pixel data located in periphery of target position in the second image signal, based on the first image signal, and calculation means for calculating and obtaining pixel data of the target position based on the estimated equation using the coefficient data generated in the coefficient data generation means and the plural sets of the first pixel data selected in the first data selection means Further, a method for processing an image signal in accordance with the present invention for converting a first image signal including plural sets of pixel data into a second image signal including plural sets of pixel data comprises a first step of setting values of plural parameters in connection with the second image signal, a second step of generating coefficient data to be used in estimated equation corresponding to the values of plural parameters set by the first step, the coefficient data in the estimated equation being produced according to a production equation classified in a hierarchy in more than one layers using coefficient seed data and the set values of plural parameters, the coefficient seed data being coefficient data in the production equation for producing coefficient data to be used in an estimated equation, the lowest layered production equation including the plural parameters and the coefficient seed data, a third step of selecting plural sets of first pixel data located in periphery of a target position in the second image signal based on the first image signal, and a fourth step of calculating and obtaining pixel data of the target position based on the estimated equation using the coefficient data generated in the second step and the plural sets of first pixel data selected in the third step.

Further, a program in accordance with the present invention allows a computer to execute the above method for processing the image signal described above. Additionally, a computer readable medium in accordance with the present invention allows recording the above program.

Further, an image display apparatus according to the present invention comprises image signal input means for inputting a first image signal including plural sets of pixel data, image signal processing means for converting the first image signal received from the image signal input means into a second image signal including plural sets of pixel data and for outputting the resultant second image signal, image display means for displaying an image produced by the second image signal received from the image signal processing means onto an image display element, and parameter-setting means for setting values of plural parameters in connection with the second image signal. The image signal processing means includes first memory means for storing coefficient seed data, the coefficient seed data being coefficient data in a production equation for producing coefficient data to be used in an estimated equation, the production equation being classified in a hierarchy in more than one layers, the lowest layered production equation including the plural parameters and the coefficient seed data, coefficient data generation means for generating the coefficient data to be used in the estimated equation corresponding to the values of plural parameters set by the parameter-setting means, the coefficient data in the estimated equation being produced according to the production equation classified in a hierarchy in more than one layers using the coefficient seed data stored in the first memory means and the set values of plural parameters, data selection means for selecting plural sets of pixel data located in periphery of the target position in the second image signal, based on the first image signal, and calculation means for calculating and obtaining pixel data of the target position based on the estimated equation using the coefficient data generated in the coefficient data generation means and the plural sets of the first pixel data selected in the data selection means.

According to the present invention, the values of plural parameters in connection with the second information signal are set. Herein, the information signal is a signal such as an image signal and a sound signal. When the information signal is the image signal, the plural parameters illustratively comprises a first parameter for determining image quality of image in accordance with the second image signal and a second parameter indicating phase information of the target position in the second image signal. When the information signal is the image signal, the format or the image size after the conversion makes the phase relationship of the pixels of the output image signal to the pixels of the input image signal uniquely determined. In addition, the plural sets of first informational data located in periphery of the target position in the second information signal are selected based on the first information signal.

Then, the informational data of the target position is obtained corresponding to the plural parameters. Specifically, the production equation is classified in a hierarchy in more than one layers. The memory means stores the coefficient data included in the lowest layered production equation constituting the production equation classified in a hierarchy in more than one layer as the coefficient seed data, which is coefficient data in the production equation for producing the coefficient data to be used in the estimated equation. By use of this coefficient seed data and the set values of plural parameters, coefficient data in the estimated equation corresponding to the values of plural parameters is generated. Then, by use of thus-generated coefficient data and the plural sets of the first informational data, informational data of the target position is produced based on the estimated equation.

For example, the coefficient data generation means comprises a single product-sum device for calculating the production equation in each layer of the production equation classified in a hierarchy in more than one layers, and a second memory means for storing coefficient data in the production equation in a second layer for calculating the production equation in the second layer. The second layer is higher than the first layer given by the calculation of the product-sum device according to the production equation of the first layer.

Thus, the coefficient data in the estimated equation used when the first information signal is to be converted into the second information signal is produced using the coefficient seed data so that it is easily possible to obtain the coefficient data corresponding to the set plural parameters. Therefore, no memory for storing a large amount of coefficient data is need. Further, the coefficient data in the estimated equation is produced using the production equation classified in a hierarchy in more than one layers, thereby reducing processing amount in each step and the scale of hardware, and making effective use thereof. When the higher in layers the production equation classified in a hierarchy in more than one layers includes parameter with a higher update frequency, the lower in layers the production equation includes parameter with a lower update frequency, thereby reducing calculational frequency of the production equation in lower layer.

Further, a coefficient seed data production device in accordance with the present invention for producing coefficient seed data, the coefficient seed data being coefficient data in a production equation for producing coefficient data to be used in estimated equation employed when converting a first information signal including plural sets of informational data into a second information signal including plural sets of informational data, said production equation being classified in a hierarchy in more than one layers, the lowest layered production equation including the coefficient seed data, comprising parameter-setting means for setting values of plural parameters each for determining a situation of student signal corresponding to the first information signal in connection with values of plural parameters included in the production equation, data selection means for selecting plural sets of informational data located in periphery of a target position in the teacher signal corresponding to the second information signal, based on said student signal, normal equation production means for producing a normal equation for obtaining coefficient data in a production equation that is still far from being classified in a hierarchy in more than one layers, using the plural sets of informational data selected by the data selection means and the informational data at the target position in the teacher signal, coefficient data calculation means for solving the normal equation to obtain the coefficient data in the production equation that is still far from being classified in a hierarchy, and coefficient seed data calculation means for obtaining as the coefficient seed data coefficient data in the lowest layered production equation constituting the production equation classified in a hierarchy in more than one layers, using the coefficient data in the production equation that is still far from being classified in a hierarchy, obtained in the coefficient data calculation means.

Further, a method for producing coefficient seed data in accordance with the present invention, the coefficient seed data being coefficient data in a production equation for producing coefficient data to be used in estimated equation employed when converting a first information signal including plural sets of informational data into a second information signal including plural sets of informational data, the production equation being classified in a hierarchy in more than one layers, the lowest layered production equation including the coefficient seed data, comprises a first step of setting values of plural parameters each for determining a situation of student signal corresponding to the first information signal in connection with values of plural parameters included in the production equation, a second step of selecting plural sets of informational data located in periphery of a target position in teacher signal corresponding to the second information signal, based on the student signal, a third step of producing a normal equation for obtaining the coefficient data in a production equation that is still far from being classified in a hierarchy in more than one layers, using the plural sets of informational data selected in the second step and the informational data at the target position in the teacher signal, a fourth step of solving the normal equation produced in the third step to obtain coefficient data in the production equation that is still far from being classified in a hierarchy, and a fifth step of obtaining as the coefficient seed data coefficient data in the lowest layered production equation constituting the production equation classified in a hierarchy, using the coefficient data in the production equation that is still far from being classified in a hierarchy, obtained in the fourth step.

Further, a program in accordance with the present invention allows a computer to execute the above method for producing the coefficient seed data. Additionally, a computer readable medium in accordance with the present invention allows recording the above program.

According to the present invention, the 1050i signal is illustratively used as the teacher signal and then the thinning-out processing is performed on the teacher signal to obtain 525i signal as the student signal. Then, the situation of the student signal is set to correspond to the set plural parameters. For example, when the information signal is image signal, the plural parameters determine phase shift of the student signal and image quality of image in accordance with the student signal.

Plural sets of informational data located in periphery of the target position in the teacher signal are selected from the student signals corresponding to these plural parameters. Then, by use of the plural sets of informational data and the informational data of the target position in the teacher signal, a normal equation for obtaining the coefficient data in the production equation that is still far from being classified in a hierarchy in more than one layers is produced. This equation is then solved to obtain the coefficient data in the production equation that is still far from being classified in a hierarchy in more than one layers. By using the coefficient data in the production equation that is still far from being classified in a hierarchy in more than one layers, the coefficient data in the lowest layered production equation constituting the production equation classified in a hierarchy in more than one layers is obtained as the coefficient seed data.

Herein, the coefficient seed data is coefficient data in the production equation for producing coefficient data to be used in the estimated equation employed when converting the first information signal into the second information signal. The production equation is classified in a hierarchy in more than one layers and the lowest layered production equation includes the plural parameters and the coefficient seed data. Using this coefficient seed data allows the sets of coefficient data corresponding to the plural parameters to be obtained according to the production equation classified in a hierarchy in more than one layers. As a result of this, when converting the format or the size in addition to changing a quality of the output obtained according to the second information signal, the coefficient data in the estimated equation is produced from the coefficient seed data on the basis of the phase information about the target position in the second information signal so that it can obtain the informational data of the target position using thus-produced coefficient data.

Further, a coefficient seed data production device in accordance with the present invention for producing coefficient seed data, the coefficient seed data being coefficient data in a production equation for producing coefficient data to be used in estimated equation employed when converting a first information signal including plural sets of informational data into a second information signal including plural sets of informational data, the production equation being classified in a hierarchy in more than one layers, the lowest layered production equation including the coefficient seed data, comprises parameter-setting means for setting values of plural parameters each for determining a situation of student signal corresponding to the first information signal in connection with values of plural parameters included in the production equation, data selection means for selecting plural sets of informational data located in periphery of a target position in teacher signal corresponding to the second information signal, based on the student signal, first normal equation production means for producing a first normal equation for obtaining the coefficient data in the estimated equation every combination of values of plural parameters set by the parameter-setting means, using the plural sets of informational data selected by the data selection means and the informational data at the target position in the teacher signal, first coefficient data calculation means for solving the first normal equation to obtain the coefficient data in the estimated equation every combination described above, second normal equation production means for producing a second normal equation for obtaining coefficient data in a production equation that is still far from being classified in a hierarchy in more than one layers, from the coefficient data every combination described above obtained by the first coefficient data calculation means, second coefficient data calculation means for solving the second normal equation to obtain the coefficient data in the production equation that is still far from being classified in a hierarchy, and coefficient seed data calculation means for obtaining as the coefficient seed data coefficient data in the lowest layered production equation constituting the production equation classified in a hierarchy in more than one layers, using the coefficient data in the production equation that is still far from being classified in a hierarchy, obtained by the second coefficient data calculation means.

Further, a method for producing coefficient seed data in accordance with the present invention, the coefficient seed data being coefficient data in a production equation for producing coefficient data to be used in estimated equation employed when converting a first information signal including plural sets of informational data into a second information signal including plural sets of informational data, the production equation being classified in a hierarchy in more than one layers, the lowest layered production equation including the coefficient seed data, comprises a first step of setting values of plural parameters each for determining a situation of student signal corresponding to the first information signal in connection with values of plural parameters included in the production equation, a second step of selecting plural sets of informational data located in periphery of a target position in teacher signal corresponding to the second information signal, based on the student signal, a third step of producing a first normal equation for obtaining the coefficient data in the estimated equation every combination of values of plural parameters set in said first step, using the plural sets of informational data selected in the second step and the informational data at the target position in the teacher signal, a fourth step of solving the first normal equation produced in the third step to obtain the coefficient data in the estimated equation every combination described above, a fifth step of producing a second normal equation for obtaining coefficient data in a production equation that is still far from being classified in a hierarchy in more than one layers, from the coefficient data every combination obtained in the fourth step; a sixth step of solving the second normal equation produced in the fifth step to obtain the coefficient data in the production equation that is still far from being classified in a hierarchy, and a seventh step of obtaining as the coefficient seed data coefficient data in the lowest layered production equation constituting the production equation classified in a hierarchy in more than one layers, using the coefficient data in the production equation that is still far from being classified in a hierarchy, obtained in the sixth step.

Further, a program in accordance with the present invention allows a computer to execute the above method for producing the coefficient seed data. Additionally, a computer readable medium in accordance with the present invention allows recording the above program.

According to the present invention, the 1050i signal is illustratively used as the teacher signal and then the thinning-out processing is performed on the teacher signal to obtain 525i signal as the student signal. Then, the situation of the student signal is set to correspond to the set plural parameters. For example, when the information signal is image signal, the values of plural parameters determine phase shift of the student signal and image quality of image in accordance with the student signal.

Plural sets of informational data located in periphery of the target position in the teacher signal are selected from the student signals corresponding to these plural parameters. Then, by use of the plural sets of informational data and the informational data of the target position in the teacher signal, the first normal equation for obtaining the coefficient data in the estimated equation every combination of the values of plural parameters is produced. This first normal equation is then solved to obtain the coefficient data in the estimated equation every combination described above.

The second normal equation for obtaining the coefficient data in the production equation that is still far from being classified in a hierarchy in more than one layers, is produced from the coefficient data every combination described above. Solving the second normal equation allows obtaining coefficient data in the production equation that is still far from being classified in a hierarchy in more than one layers. By using the coefficient data in the production equation that is still far from being classified in a hierarchy in more than one layers, the coefficient data in the lowest layered production equation constituting the production equation classified in a hierarchy in more than one layers is obtained as the coefficient seed data.

Herein, the coefficient seed data is coefficient data in the production equation for producing coefficient data to be used in the estimated equation employed when converting the first information signal into the second information signal. The production equation is classified in a hierarchy in more than one layers and the lowest layered production equation includes the plural parameters and the coefficient seed data. Using this coefficient seed data allows the coefficient data corresponding to the plural parameters to be obtained according to the production equation classified in a hierarchy in more than one layers. As a result of this, when converting the format or the size in addition to changing a quality of the output obtained according to the second information signal, the coefficient data in the estimated equation is produced from the coefficient seed data on the basis of the phase information about the target position in the second information signal so that it can obtain the informational data of the target position using thus-produced coefficient data.

BRIEF DESCRIPTION OF THE DRAWINGS

FIG. 8 is a block diagram showing an exemplary structure of a coefficient seed data production device;

FIG. 10 is a diagram showing concept of another example of the method for producing the plural sets of coefficient data, $W_{i,0}$ through $W_{i,80}$ of the production equation that is still far from being classified in a hierarchy;

BEST MODE FOR CARRYING OUT THE INVENTION

Figure 1:
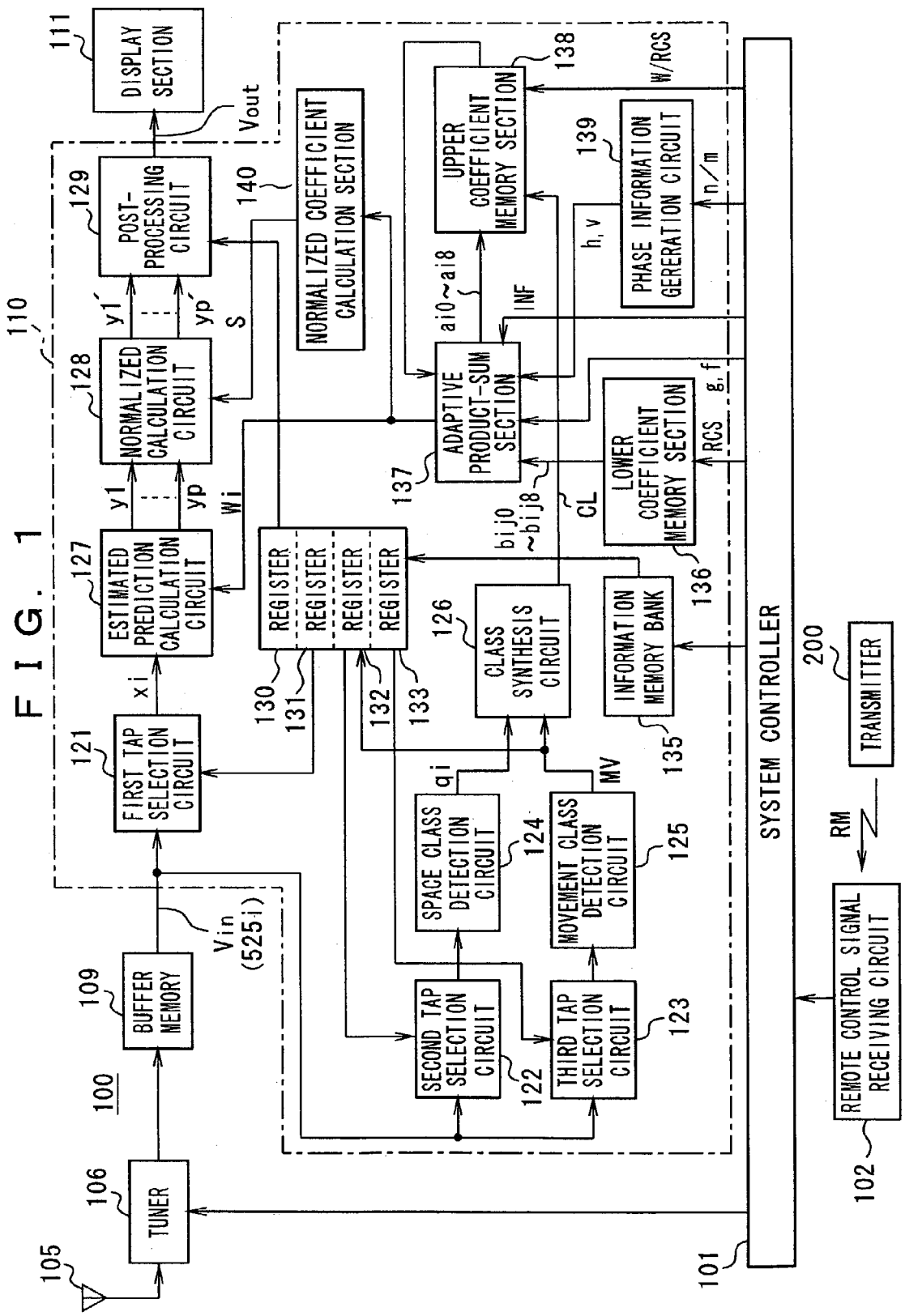
FIG. 1 is a block diagram showing a configuration of television receiver as an embodiment.

Hereinafter, embodiments of the present invention will be described with reference to drawings. FIG. 1 shows a configuration of television receiver 100 as an embodiment. The television receiver 100 receives a 525i signal from a broadcast signal and converts the 525i signal into a 1080i signal or a XGA signal so as to display an image, or converts the 525i signal into a new 525i signal for partially magnifying the image by an arbitrary magnification and displaying the partially magnified image.

The television receiver 100 comprises a system controller 101 with a microcomputer for controlling operations of the entire system, and a remote control signal receiving circuit 102 for receiving a remote control signal. The remote control signal receiving circuit 102 is connected to the system controller 101, and it is constituted so as to receive a remote control signal RM from a remote control transmitter 200 in accordance with the user operation and to supply an operation signal corresponding to the received signal RM to the system controller 101.

The television receiver 100 also comprises a receiving antenna 105, a tuner 106 for receiving a broadcast signal (RF modification signal) captured by the receiving antenna 105, and performing processing such as a channel selection, a middle frequency amplification, and a wave detection so as to obtain a 525i signal, and a buffer memory 109 for temporarily storing the 525i signal output from the tuner 106.

The television receiver 100 further comprises an image signal processing section 110 for using the 525i signal temporarily stored in the buffer memory 109 as an input image signal Vin and converting the 525i signal into a 1080i signal or a XGA signal, or converting it into a new 525i signal for partially magnifying the image by an arbitrary magnification and displaying the partially magnified image, and then transmitting the resultant signal, and a display section 111 for displaying an image produced by the output image signal Vout received from the image signal processing section 110. The display section 111 is constituted by, for example, a display apparatus such as a cathode-ray tube (CRT) display, a liquid crystal display (LCD).

Operations of the television receiver 100 shown in FIG. 1 will be described.

The 525i signal transmitted from the tuner 106 is supplied to the buffer memory 109, which temporarily stores it. The 525i signal stored in the buffer memory 109 is supplied to the image signal processing section 110 as an input image signal Vin.

In the image signal processing section 110, in response to the setting by the user through operations of the remote control transmitter 200, the 525i signal as the input image signal Vin is converted into a 1080i signal or a XGA signal, or the 525i signal is converted into a new 525i signal for partially magnifying the image by an arbitrary magnification and displaying the partially magnified image. The output image signal Vout transmitted from the image signal processing section 110 is supplied to the display section 111, which displays an image produced by the output image signal Vout on the screen thereof.

Although not described above, user can smoothly and successively adapt resolution of image displayed on the screen of the display section 111 in vertical and horizontal directions thorough operations of the remote control transmitter 200. The image signal processing section 110 calculates pixel data constituting the output image signal Vout according to the estimated equation, which will be described later. In doing so, the coefficient data corresponding to parameters, g and f, for determining the resolution in vertical and horizontal directions set thorough operations of the remote control transmitter 200 is produced according to the production equation including these parameters, g and f, to use it as the coefficient data in the estimated equation. Thus, the resolution in vertical and horizontal directions of the image in connection with the output image signal Vout output from the image signal processing section 110 corresponds to the set values of the parameters, g and f.

Next, details of the image signal processing section 110 will be described. The image signal processing section 110 includes first to third tap selection circuits 121 to 123 each for selectively extracting plural sets of pixel data located in periphery of each pixel (target pixel) within a unit pixel block constituting the output image signal Vout from the 525i signal stored in the buffer memory 109, and then transmitting them.

The first tap selection circuit 121 selectively extracts data of the pixel for use in prediction (hereinafter, referred to as "prediction tap"). The second tap selection circuit 122 selectively extracts data of the pixel for use in sorting space classes (hereinafter, referred to as "space class tap"). The third tap selection circuit 123 selectively extracts data of pixel for use in sorting movement classes (hereinafter, referred to as "movement class tap"). Where the space class is determined using the pixel data belonging to the plural fields, this space class also contains information about movements.

The image signal processing section 110 also includes a space class detection circuit 124 for detecting a distribution pattern of levels of sets of data of space class tap (two or more) selectively extracted in the second tap selection circuit 122, and detecting a space class based on the distribution pattern of the levels so as to transmit information about the class.

The space class detection circuit 124 performs an operation such that, for example, the space class tap data is compressed from 8 bit-data into 2 bit-data. Then, the space class detection circuit 124 transmits sets of the compressed data each corresponding to sets of the space class tap data as class information of the space class. In this embodiment, data compression is performed according to an adaptive dynamic range coding (ADRC) method. Alternative to the ADRC, as a method for compressing information, also employable is prediction coding such as differential pulse code modulation (DPCM), vector quantization (VQ) and the like.

Originally, the ADRC is an adaptive re-quantization method, which has been developed for use in high performance coding for video tape recorder (VTR). The ADRC is also preferable to a case used in the data compression described above because this method is capable of effectively expressing a local pattern of a signal level in a short language. In the case of employing the ADRC, defining the maximum value of the space class tap data as MAX, the minimum value thereof as MIN, a dynamic range of the space class tap data as DR (=MAX−MIN+1), and re-quantized bit number as P, a re-quantized code, qi, as compressed data is obtained from a calculation in following Equation (1) as to each set of space class tap data, ki.

$$qi = [(ki - MIN + 0.5) * 2^P / DR] \quad (1)$$

In the Equation (1), the portion enclosed with [ ] means truncation process. When there is Na set(s) of pixel data as the space class tap data, i, is set to 1 to Na.

The image signal processing section 110 also includes an movement class detection circuit 125 for detecting a movement class for mainly expressing the degree of movement, from the sets of movement class tap data (two or more) selectively extracted in the third tap selection circuit 123, and then transmitting the class information thereof.

In the movement class detection circuit 125, a differential between frames is calculated from the movement class tap data selectively extracted in the third tap selection circuit 123. Then, a threshold value processing is performed on an average value of the absolute values of differentials so that the movement class, which is an index of movement, can be detected. Specifically, in the movement class detection circuit 125, an average value AV of the absolute values of the differentials is calculated in following Equation (2).

$$AV = \frac{\sum_{i=1}^{Nb} |mi - ni|}{Nb} \quad (2)$$

When six sets of pixel data, m1 to m6, and six sets of pixel data, n1 to n6, located in the immediately preceding frame are extracted as class tap data, for example, in the third tap selection circuit 123, Nb in the Equation (2) is 6.

In the movement class detection circuit 125, the average value AV calculated as described above is compared with one or a plurality of threshold values so as to allow class information MV about movement class to be obtained. For example, when three threshold values th1, th2, th3 (th1<th2<th3) are prepared and four movement classes are to be detected, MV is set to 0 when AV≦th1; MV is set to 1 when th1<AV≦th2; MV is set to 2 when th2<AV≦th3; and MV is set to 3 when th3<AV.

The image signal processing section 110 also includes a class synthesis circuit 126 for obtaining a class code CL showing a class including the data of each pixel (target pixel) within the unit pixel block constituting the output image signal Vout to be produced, based on the re-quantized code qi as class information about the space class received from the space class detection circuit 124 and the class information MV about the movement class received from the movement class detection circuit 125.

In the class synthesis circuit 126, the class code CL is calculated in following Equation (3).

$$CL = \sum_{i=1}^{Na} qi(2^P)^{i-1} + MV \cdot (2^P)^{Na} \quad (3)$$

In the Equation (3), Na indicates the number of sets of the space class tap data, and P indicates the re-quantized bit number in ADRC method.

The image signal processing section 110 also includes registers 130 to 133. A post-processing circuit 129, which will be described later, is required to change its operation among the case where a 1080i signal is transmitted as the output image signal Vout, the case where an XGA signal is transmitted as the output image signal Vout, and the case where a 525i signal is transmitted as the output image signal Vout. The register 130 stores operation-specifying information for specifying operations of the post-processing circuit 129. The post-processing circuit 129 exhibits the operations in compliance with the operation-specifying information supplied from the register 130.

The register 131 stores tap position information of the prediction tap to be selected in the first tap selection circuit 121. The first tap selection circuit 121 selects the prediction tap in compliance with the tap position information supplied from the register 131. The tap position information assigns numbers to plural pixels which may be selected, for example, and specifies the number of pixel to be selected. The tap position information described hereinafter also performs the same operation as described above.

The register 132 stores tap position information of the space class tap to be selected in the second tap selection circuit 122. The second tap selection circuit 122 selects the space class tap in compliance with the tap position information supplied from the register 132.

Therein, the register 132 stores tap position information A of the case where a movement is relatively small, and tap position information B of the case where a movement is relatively large. Which of the tap position information A or B is to be supplied to the second tap selection circuit 122 is determined by the class information MV of the movement class transmitted from the movement class detection circuit 125.

Specifically, if MV is 0 or MV is 1 because there is no movement or the movement is small, the tap position information A is supplied to the second tap selection circuit 122. The space class tap selected in the second tap selection circuit 122 is made to extend over plural fields. Contrarily, if MV is 2 or MV is 3 because the movement is relatively large, the tap position information B is supplied to the second tap selection circuit 122. Although not shown in the drawings, the space class tap selected in the second tap selection circuit 122 is made to be only the pixel within the field where the pixel to be produced is present.

Alternatively, it is also possible that the register 131 described above also stores the tap position information of the case where the movement is relatively small and the tap position information of the case where the movement is relatively large, so that the tap position information to be supplied to the first tap selection circuit 121 can be selected by the class information MV of the movement class transmitted from the movement class detection circuit 125.

The register 133 stores the tap position information of the movement class tap to be selected in the third tap selection circuit 123. The third tap selection circuit 123 selects a movement class tap in compliance with the tap position information supplied from the register 133.

The image signal processing section 110 also includes an information memory bank 135. In the information memory bank 135, movement-specifying information to be stored into the register 130 and the tap position information to be stored in the registers 131 to 133 are stored beforehand.

Herein, as the movement-specifying information to be stored in the register 130, first movement-specifying information for operating the post-processing circuit 129 to transmit the 1080i signal, second movement-specifying information for operating the post-processing circuit 129 to transmit the XGA signal, and third movement-specifying information for operating the post-processing circuit 129 to transmit the 525i signal, are stored beforehand in the information memory bank 135.

The user can make selection among the first conversion method for transmitting the 1080i signal, the second conversion method for transmitting the XGA signal, and the third conversion method for transmitting the 525i signal, by operating the remote control transmitter 200. In the case of selecting the third conversion method, the user can further specify the magnification (the image size) of the image to be displayed. The information memory bank 135 receives the selection information about the conversion method to be selected from the system controller 101. The information memory bank 135 loads the first, second, or third movement-specifying information in compliance with the received selection information into the register 130.

In the information memory bank 135, first tap position information corresponding to the first conversion method (1080i), second tap position information corresponding to the second conversion method (XGA), and third tap position information corresponding to the third conversion method (525i), are stored beforehand as the tap position information of the prediction tap to be stored in the register 131. The information memory bank 135 loads the first, second, or third tap position information into the register 131 in compliance with the selection information about the conversion method described above.

It is also possible that tap position information corresponding to the magnification of the image to be displayed is stored into the information memory bank 135 beforehand as the third tap position information corresponding to the third conversion method, and at the same time when the third conversion method is selected, the tap position information corresponding to the specified magnification is loaded from the information memory bank 135 into the register 131. The same thing is applicable to the case where the tap information is loaded into registers 132 and 133, which will be described later.

Further, the first tap position information corresponding to the first conversion method (1080i), the second tap position information corresponding to the second conversion information (XGA), and the third tap position information corresponding to the third conversion method (525i) are stored beforehand in the information memory bank 135 as tap position information of the space class tap to be stored into the register 132. The first, second, and third pieces of the tap position information are respectively constituted by tap position information for the case where a movement is relatively small, and tap position information for the case where a movement is relatively large. The first, second, or third tap position information is loaded from the information memory bank 135 into the register 132 in compliance with the selection information about the conversion method described above.

Further, the first tap position information corresponding to the first conversion method (1080i), the second tap position information corresponding to the second conversion method (XGA), and the third tap position information corresponding to the third conversion method (525i) are stored beforehand in the information memory bank 135 as tap position information of the movement class tap to be stored in the register 133. The first, second, or third tap position information is loaded from the information memory bank 135 into the register 133 in compliance with the selection information about the conversion method described above.

The image signal processing section 110 also comprises a lower coefficient memory section 136 consisting of ROMs. The lower coefficient memory section 136 stores coefficient seed data, for each class, beforehand. The system controller 101 supplies the read-out control signal (RCS) to the lower coefficient memory section 136. This coefficient seed data is coefficient data of the lower layered production equation of the production equation classified in a hierarchy in the upper and lower layers for producing coefficient data in the estimated equation used in estimated prediction calculation circuit 127, which will be described later.

In the estimated prediction calculation circuit 127, which will be described later, pixel data y to be produced is calculated according to the estimated equation of following Equation (4) from prediction tap data, xi, and the coefficient data, Wi, produced by the production equation.

$$y = \sum_{i=1}^{n} Wi \cdot xi \qquad (4)$$

When ten prediction taps are selected in the first tap selection circuit 121, n in the Equation (4) is 10.

Then, the set(s) of coefficient data, Wi (i=1 to n) in this estimated equation is/are produced according to a production equation (that is still far from being classified in a hierarchy) using horizontal resolution, g, vertical resolution, f, horizontal phase, h, and vertical phase, v as the parameter, as shown in following Equation (5), for example.

$$Wi = w_{i,0}g^0 f^0 v^0 h^0 + w_{i,1}g^0 f^0 v^0 h^1 + w_{i,2}g^0 f^0 v^0 h^2 + w_{i,3}g^0 f^0 v^1 h^0 + \qquad (5)$$
$$w_{i,4}g^0 f^0 v^1 h^1 + w_{i,5}g^0 f^0 v^1 h^2 + w_{i,6}g^0 f^0 v^2 h^0 + w_{i,7}g^0 f^0 v^2 h^1$$
$$\vdots \qquad \vdots \qquad \vdots \qquad \vdots \qquad \vdots \qquad \vdots \qquad \vdots \qquad \vdots$$
$$\vdots \qquad \vdots \qquad \vdots \qquad \vdots \qquad \vdots \qquad \vdots \qquad \vdots \qquad \vdots \qquad +$$
$$w_{i,73}g^2 f^2 v^0 h^1 + w_{i,74}g^2 f^2 v^0 h^2 + w_{i,75}g^2 f^2 v^1 h^0 + w_{i,76}g^2 f^2 v^1 h^1 +$$
$$w_{i,77}g^2 f^2 v^1 h^2 + w_{i,78}g^2 f^2 v^2 h^0 + w_{i,79}g^2 f^2 v^2 h^1 + w_{i,80}g^2 f^2 v^2 h^2$$

In this invention, the set(s) of coefficient data, Wi (i=1 to n) is/are produced according to the following upper layered production equation (6) and lower layered production equation (7), which are obtained by classifying the relationship as shown in Equation (5) in a hierarchy in two layers.

$$Wi = a_{i0}v^0 h^0 + a_{i1}v^0 h^1 + a_{i2}v^0 h^2 + a_{i3}v^1 h^0 + \qquad (6)$$
$$a_{i4}v^1 h^1 + a_{i5}v^1 h^2 + a_{i6}v^2 h^0 + a_{i7}v^2 h^1 + a_{i8}v^2 h^2$$

$$a_{ij} = b_{ij0}g^0 f^0 + b_{ij1}g^0 f^1 + b_{ij2}g^0 f^2 + b_{ij3}g^1 f^0 + \qquad (7)$$
$$b_{ij4}g^1 f^1 + b_{ij5}g^1 f^2 + b_{ij6}g^2 f^0 + b_{ij7}g^2 f^1 + b_{ij8}g^2 f^2$$

The lower coefficient memory section 136 stores the sets of coefficient seed data, $b_{ij0}$ to $b_{ij8}$ (i=1 to n; j=0 to 8) in each class, which is the coefficient data in the lower layered production equation. The method for producing the coefficient seed data will be described later.

The upper layered production equation as shown in Equation (6) includes the parameters, h and v, while the lower layered production equation as shown in Equation (7) includes the parameters, g and f. In this case, the parameters, h and v, are of pieces of phase information in horizontal and vertical directions of each pixel within the unit pixel block constituting the output image signal Vout, which are frequently updated during an effective vertical scanning period that will be described, while the parameters, g and f, as the resolution information are not so frequently updated.

Thus, the lower layered production equation comprises such the parameters that are not so frequently updated. It is also to be desired that each parameter in the same production equation could be updated at the same timing.

The image signal processing section 110 also includes an adaptive product-sum device 137 for producing the sets of coefficient data, $a_{i0}$ to $a_{i8}$ (i=1 to n) of the upper layered production equation, which are shown in the Equation (6), in each class according to the Equation (7) using the sets of coefficient seed data, bij0 to bij8, and the parameters, g and f, of each class as well as for producing the set8s) of coefficient data, Wi (i=1 to n) in the estimated equation of the corresponding class according to the Equation (6) using the sets of coefficient data, $a_{i0}$ to $a_{i8}$ (i=1 to n), and the parameters, h and v of a class corresponding to the class code, CL, obtained in class synthesis circuit 126. The set(s) of coefficient data, Wi, thus produced by the adaptive product-sum device 137 is/are supplied to the estimated prediction calculation circuit 127, which will be described later.

The adaptive product-sum device 137 receives the values of parameters, g and f, from the system controller 101 and the values of parameters, h and v, from a phase information generation circuit 139, which will be described later. The adaptive product-sum device 137 also receives information about product-sum structure INF from the system controller 101 and takes product-sum structure for performing the operation according to the Equation (7) when performing it according to the Equation (7) and/or for performing the operation according to the Equation (6) when performing it according to the Equation (6). In the embodiment, the Equations (6) and (7) have the same structure so that it takes the same product-sum structure when performing the operation according to the Equation (6) and when performing the operation according to the Equation (7).

Upper coefficient memory section 138 consisting of RAMs stores the sets of coefficient data, $a_{i0}$ to $a_{i8}$ (i=1 to n), of the upper layered production equation as shown in the Equation (6) produced in each class according to the Equation (7) by the adaptive product-sum device 137, as described above, which is available for performing the operation according to the Equation (6). This upper coefficient memory section 138 receives a write/read control signal, W/RCS, from the system controller 101. In this embodiment, the operation according to the Equation (7) is performed during vertical blanking period of the output image signal, Vout while the operation according to the Equation (6) is performed during effective vertical scanning period.

The image signal processing section 110 also includes a phase information generation circuit 139 for generating the phase information h, v in the horizontal direction and the vertical direction of each pixel within the unit pixel block constituting the output image signal Vout, based on the selection information about the conversion method and the corresponding function information, n/m, relating to the number of pixels in each field in the vertical direction and in the horizontal direction in the input image signal, Vin, and the output image signal, Vout, corresponding to the information for specifying the magnification, which are received from the system controller 101. This phase information generation circuit 139 is constituted by a ROM table, for example.

Pieces of the phase information, h and v, in the horizontal direction and the vertical direction of each pixel generated in the phase information generation circuit 139 are respectively associated with the pixel number (tap number) and then supplied to the adaptive product-sum device 137. The phase information generation circuit 139 generates the pieces of phase information, h and v, corresponding to the respective odd and even fields of the input image signal, Vin.

Figure 16:
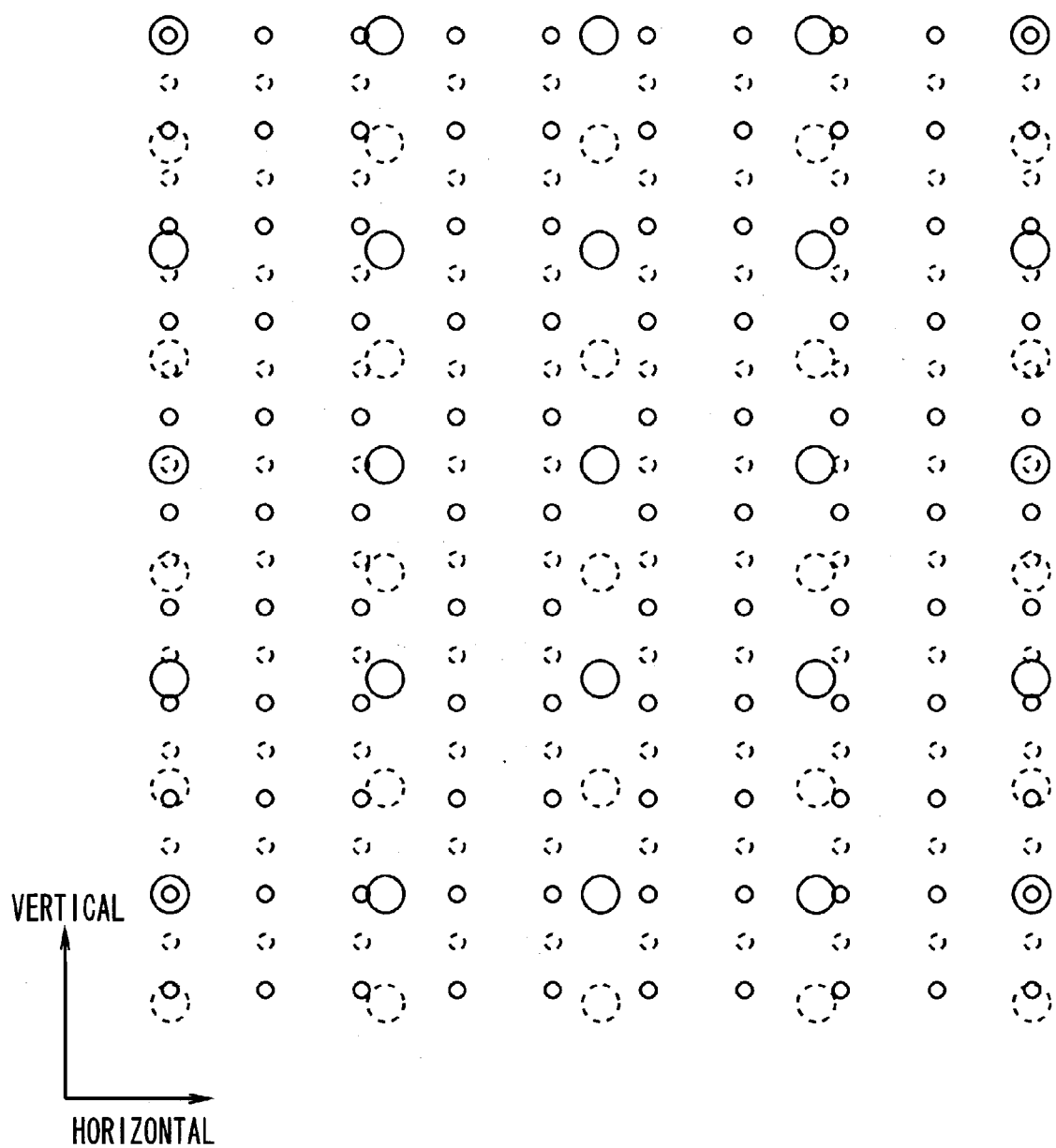
FIG. 16 is a diagram showing a positional relationship between the pixels of the 525i signal and the pixels of the 1080i signal.
Figure 17:
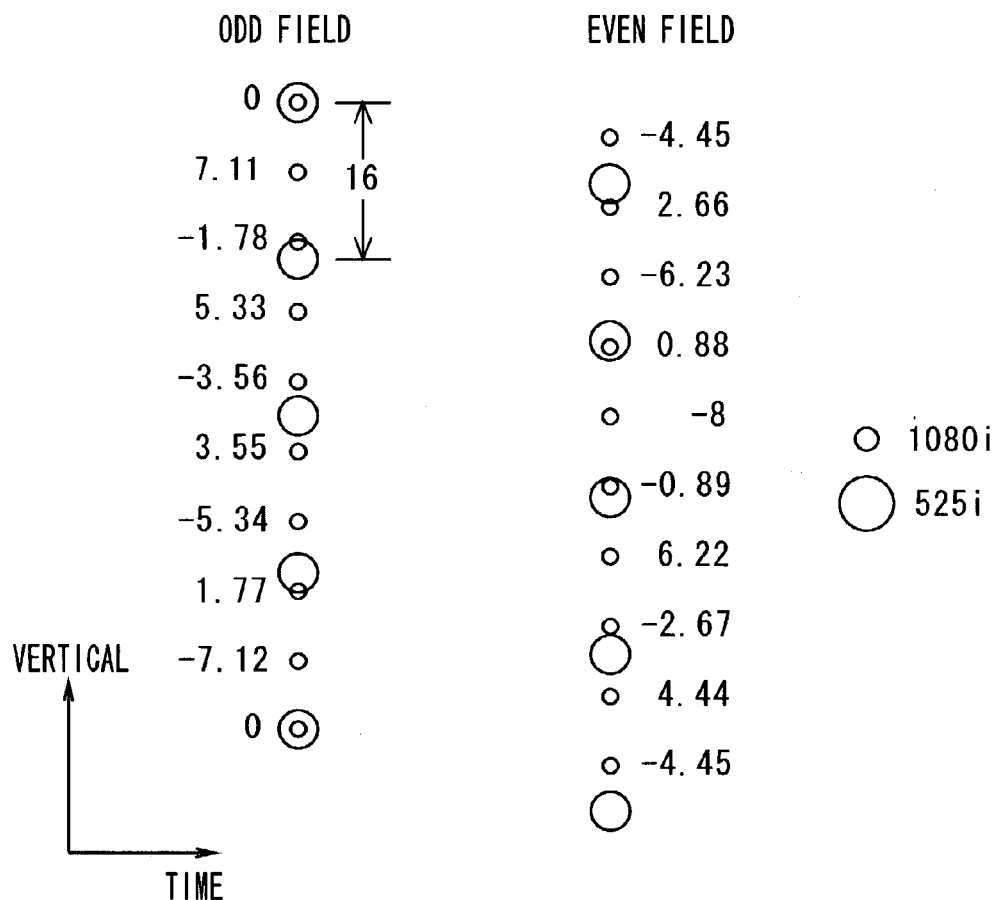
FIG. 17 is a diagram showing a phase relationship in a vertical direction between the pixels of the 525i signal and the pixels of the 1080i signal.
Figure 18:
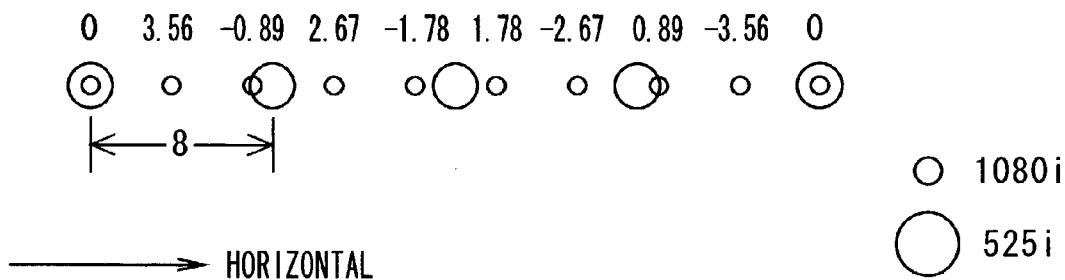
FIG. 18 is a diagram showing a phase relationship in a horizontal direction between the pixels of the 525i signal and the pixels of the 1080i signal.

For example, when the first conversion method (1080i) is selected, n/m is 9/4 as to the vertical direction, and n/m is 9/4 as to the horizontal direction (see FIG. 16). As a result, the 9×9 pixel block of the 1080i signal as the output image signal, Vout, corresponds to the 4×4 pixel block of the 525i signal as the input image signal, Vin. In this case, the unit pixel block constituting the output image signal, Vout, is a 9×9 pixel block.

In this case, in the phase information generation circuit 139, as to each pixel within this 9×9 unit pixel block, a distance between pixels located at positions closest to each other in the vertical direction (pixels at a shortest distance) is obtained among the pixels within the 4×4 pixel block of the 525i signal described above, and the obtained value of the distance is used as phase information, v; and a distance between pixels located at positions closest to each other in the horizontal direction (pixels at a shortest distance) is obtained, and the obtained value of the distance is used as phase information, h. In this embodiment, the pieces of phase information, h and v, described above are obtained under the condition where the interval between pixels in the vertical direction of the 525i signal is set to 16, and the interval between pixels in the horizontal direction thereof is set to 8. The same thing is applied to the case where the second and third conversion methods are selected, respectively.

Herein, the phase information, v, is set to a negative value when the target pixel within the 9×9 unit pixel block is located at a position upper than the pixel at the shortest distance. Contrarily, the phase information, v, is set to a positive value when the target pixel within the 9×9 unit pixel block is located at a position lower than the pixel at the shortest distance described above. In addition, the phase information, h, is set to a negative value when the target pixel thereof is located at a position left of the pixel at the shortest distance. Contrarily, the phase information, h, is set to a positive value when the target pixel thereof is located at a position right of the pixel at the shortest distance. The same thing is applied to the case where the second and third conversion methods are selected, respectively.

As described above, when the first conversion method (1080i) is selected, in the phase information generation circuit 139, the pieces of phase information, h and v, are generated for each of 81 pixels, which constitute the 9×9 unit pixel block, in correspondence with the respective odd and even fields.

Figure 19:
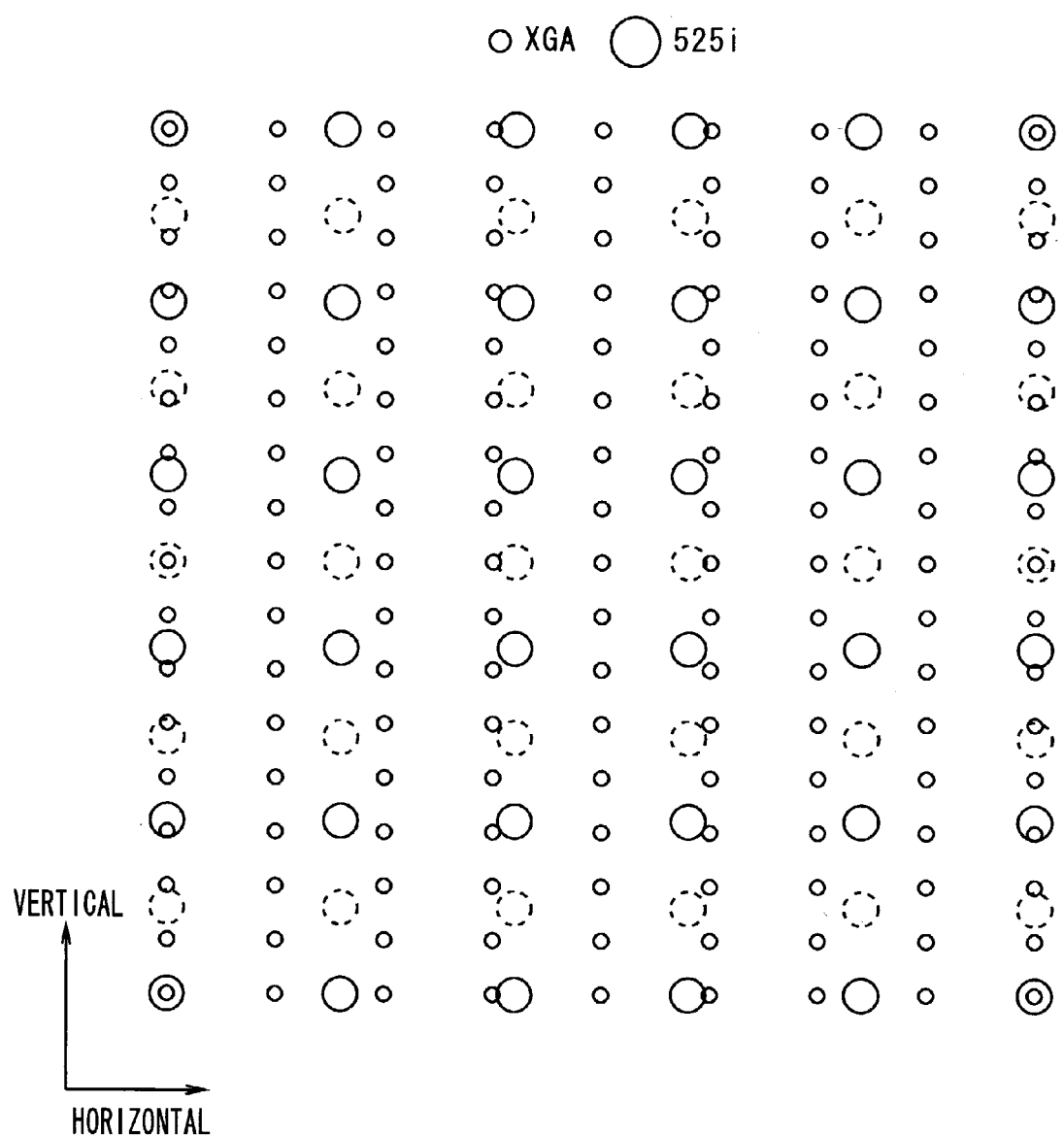
FIG. 19 is a diagram showing a positional relationship between the pixels of the 525i signal and the pixels of the XGA signal.
Figure 20:
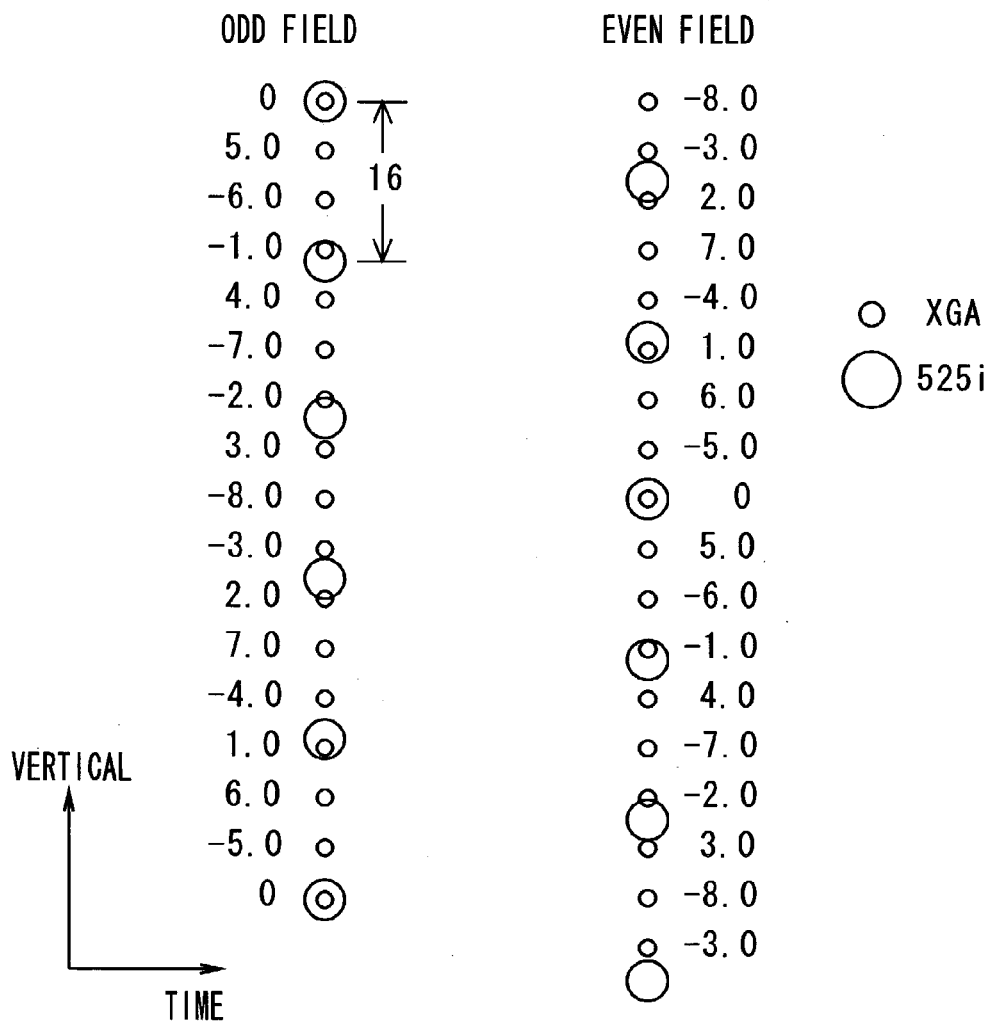
FIG. 20 is a diagram showing a phase relationship in a vertical direction between the pixels of the 525i signal and the pixels of the XGA signal.
Figure 21:
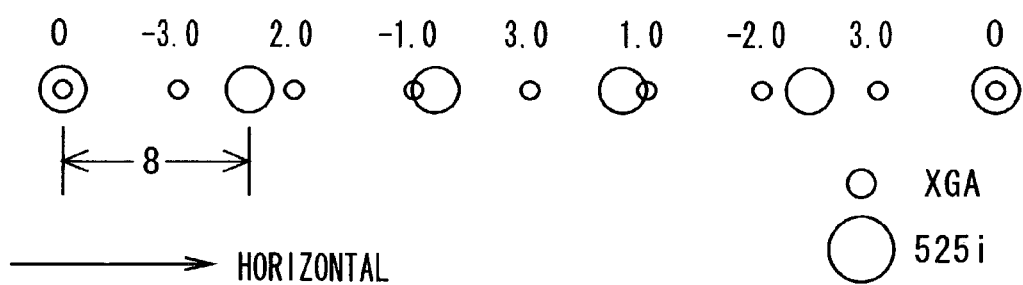
FIG. 21 is a diagram showing a phase relationship in a horizontal direction between the pixels of the 525i signal and the pixels of the XGA signal.

In addition, when the second conversion method (XGA) is selected, for example, n/m is 16/5 as to the vertical direction, and n/m is 8/5 as to the horizontal direction (see FIG. 19). As a result, the 8×16 pixel block of the XGA signal as the output image signal, Vout, corresponds to the 5×5 pixel block of the 525i signal as the input image signal, Vin. In this case, the unit pixel block constituting the output image signal, Vout, is an 8×16 pixel block.

In this case, in the phase information generation circuit 139, as to each pixel within this 8×16 unit pixel block, a distance between pixels located at positions closest to each other in the vertical direction (pixels at a shortest distance) is obtained among the pixels within the 5×5 pixel block of the 525i signal described above, and the obtained value of the distance is used as phase information, v; and a distance between pixels located at positions closest to each other in the horizontal direction (pixels at a shortest distance) is obtained, and the obtained value of the distance is used as phase information, h.

As described above, when the second conversion method (XGA) is selected, in the phase information generation circuit 139, the pieces of phase information, h and v, are generated for each of 128 pixels, which constitute the 8×16 unit pixel block, in correspondence with the respective odd and even fields.

In addition, when the third conversion method (525i) is selected for example, the values of n/m in the vertical direction and in the horizontal direction are uniquely determined in correspondence with the specified magnification of the image to be displayed (the image size). Assuming that n/m is nv/mv as to the vertical direction and n/m is nh/mh as to the horizontal direction, nh×nv pixel block of the 525i signal as the output image signal, Vout, corresponds to the mh×mv pixel block of the 525i signal as the input image signal, Vin. In this case, the unit pixel block constituting the output image signal, Vout, is a nh×nv pixel block.

In this case, in the phase information generation circuit 139, as to each pixel within this nh×nv unit pixel block, a distance between pixels located at positions closest to each other in the vertical direction (pixels at a shortest distance) is obtained among the pixels within the mh×mv pixel block of the 525i signal as the input image signal, Vin, described above, and the obtained value of the distance is used as phase information, v; and a distance between pixels located at positions closest to each other in the horizontal direction (pixels at a shortest distance) is obtained, and the obtained value of the distance is used as phase information, h.

As described above, when the third conversion method (525i) is selected, in the phase information generation circuit 139, the pieces of phase information, h and v, is generated for each of the pixels, which constitute the nh×nv unit pixel block, in correspondence with the respective odd and even fields.

The image signal processing section 110 also includes a normalized coefficient calculation section 140 for calculating according to following Equation (8) a normalized coefficient S corresponding to the set(s) of coefficient data, Wi (i=1 to n) of the respective pieces of the phase information, h and v, produced by the adaptive product-sum device 137.

$$S = \sum_{i=1}^{n} Wi \tag{8}$$

The normalized coefficient S thus given is supplied to a normalized calculation circuit 128, which will be described later.

The image signal processing section 110 also includes the estimated prediction calculation circuit 127 for calculating data of each pixel within the unit pixel block constituting the output image signal, Vout, based on the prediction tap data, xi, selectively extracted in the first tap selection circuit 121 and the coefficient data, Wi, produced by the adaptive product-sum device 137.

In this estimated prediction calculation circuit 127, pixel data constituting the output image signal, Vout, is produced for every unit pixel block. Specifically, the estimated prediction calculation circuit 127 receives the prediction tap data, xi, corresponding to each pixel within the unit pixel block (target pixel) from the first tap selection circuit 121 and the coefficient data, Wi, corresponding to each pixel constituting the unit pixel block from the adaptive product-sum device 137. The data of each pixel constituting the unit pixel block is separately calculated according to the estimated equation of the aforementioned Equation (4).

For example, in the estimated prediction calculation circuit 127, when the first conversion method (1080i) is selected, data of 81 pixels constituting the unit pixel block is simultaneously produced; when the second conversion method (XGA) is selected, data of 128 pixels constituting the unit pixel block is simultaneously produced; and when the third conversion method (525i) is selected, data of pixels in the number of (nh×nv) constituting the unit pixel block (the values of nh and nv change in accordance with the specified magnification of the image to be displayed) is simultaneously produced.

The image signal processing section 110 also includes the normalized calculation circuit 128 for normalizing with dividing sets of the data, $y_1$ to $y_p$ (P shows the number of pixels constituting the unit block) of each pixel within the unit pixel block constituting the output image signal, Vout, each set of the data, $y_1$ to $y_p$, being sequentially supplied from the estimated prediction calculation circuit 127, by the normalized coefficient S corresponding to the set(s) of coefficient data, Wi (i=1 to n), which is/are used in the production of the respective sets of the data, $y_1$ to $y_p$, the normalized coefficient S being calculated by the normalized coefficient calculation section 140. Although not described above, when the adaptive product-sum device 137 calculates the coefficient data, Wi, in the estimated equation and outputs it, rounding is carried out. Therefore, since the coefficient data, Wi, contains a rounding error, there is no guarantee that the sum of the set(s) of coefficient data, Wi (i=1 to n) is 1.0. Thus, the set(s) of data, $y_1$ to $y_p$, of each pixel calculated in the estimated prediction calculation circuit 127 involve(s) a level fluctuation as a result of the rounding error. As described above, such the fluctuation can be removed by normalizing them in the normalized calculation circuit 128.

In addition, the image signal processing section 110 also includes the post-processing circuit 129 for processing sets of data, $y_1'$ to $y_p'$, of the pixels within the unit pixel block normalized in the normalized calculation circuit 128 and sequentially received therefrom, and transmitting the output image signal, Vout, with the format specified by any one of the first to third conversion methods. Specifically, the post-processing circuit 129 transmits the 1080i signal when the first conversion method is selected, transmits the XGA signal when the second conversion method is selected, and transmits the 525i signal when the third conversion method is selected. The information for specifying the operation of the post-processing circuit 129 is supplied from the register 130 as described above.

Next, operations of the image signal processing section 110 will be described.

In the second tap selection circuit 122, space class tap data (pixel data) located in periphery of each pixel (target pixel) within the unit pixel block constituting the output image signal, Vout, to be produced is selectively extracted from the 525i signal stored in the buffer memory 109 as the input image signal, Vin. In this case, in the second tap selection circuit 122, the selection of tap is performed, based on the conversion method supplied from the register 132 and selected by the user, and the tap position information corresponding to the movement class detected in the movement class detection circuit 125.

The space class tap data selectively extracted in the second tap selection circuit 122 is supplied to the space class detection circuit 124. In the space class detection circuit 124, each set of pixel data as the space class tap data is subjected to an ADRC processing so that a re-quantized code qi as class information of the space class (a class sort mainly for the purpose of expressing the waveform in a space) may be obtained (see the Equation (1)).

In addition, in the third tap selection circuit 123, movement class tap data (pixel data) located in periphery of the pixels within the unit pixel block (target pixel) constituting the output image signal, Vout, to be produced is selectively extracted from the 525i signal stored in the buffer memory 109 as the input image signal, Vin. In this case, in the third tap selection circuit 123, the selection of tap is performed on the basis of the tap position information selected by the user and supplied from the register 133, the tap position information corresponding to the conversion method.

The movement class tap data selectively extracted in the third tap selection circuit 123 is supplied to the space class detection circuit 125. According to the movement class detection circuit 125, class information, MV, about a movement class (a class sort mainly for the purpose of expressing the degree of movement) is obtained from each set of pixel data as movement class tap data.

Thus-obtained movement information, MV, and the aforementioned re-quantized code, qi, are supplied to the class synthesis circuit 126. In the class synthesis circuit 126, the class code, CL, showing a class including data of each pixel within a unit pixel block (target pixel) is obtained from the movement information, MV, and the re-quantized code, qi, as to each unit pixel block constituting the output image signal, Vout, to be produced (see the Equation (3)).

During the vertical blanking period of the output image signal, Vout, in the adaptive product-sum device 137, the sets of coefficient data, $a_{i0}$ to $a_{i8}$ (i=1 to n), of the upper layered production equation shown in the Equation (6) are produced every class according to the Equation (7) using the sets of coefficient seed data, $b_{ij0}$ to $b_{ij8}$, of each class read out of the lower coefficient memory section 136 and the values of parameters, g and f, as the resolution information supplied from the system controller 101. Then, the sets of the coefficient data, $a_{i0}$ to $a_{i8}$ (i=1 to n), of the upper layered production equation shown in the Equation (6), which are produced every class by the adaptive product-sum device 137, are stored in the upper coefficient memory section 138. This is ready to perform the operation according to the Equation (6) to be carried out during the effective vertical scanning period.

During the effective vertical scanning period of the output image signal, Vout, the class codes, CL, sequentially obtained in the class synthesis circuit 126 are then supplied to the upper coefficient memory section 138 as the read-out address information. In the adaptive product-sum device 137, the set(s) of the coefficient data Wi (i=1 to n) in the estimated equation each corresponding to the pieces of phase information, h and v, of each pixel is/are sequentially produced according to the Equation (6) using the sets of the coefficient data, $a_{i0}$ to $a_{i8}$ (i=1 to n), of the classes corresponding to the class codes, CL, which are read out of the upper coefficient memory section 138, and the parameters, h and v, which are generated by the phase information generation circuit 139, as the phase information in the horizontal direction and the vertical direction of each pixel within the unit pixel block constituting the output image signal, Vout.

The set(s) of the coefficient data, Wi (i=1 to n) thus produced by the adaptive product-sum device 137, which correspond(s) to the pieces of phase information, h and v, that are generated by the phase information generation circuit 139, of each pixel within the unit pixel block constituting the output image signal, Vout, is/are supplied to the estimated prediction calculation circuit 127. In the normalized coefficient calculation section 140, the normalized coefficient S is calculated from the set(s) of coefficient data, Wi (i=1 to n) corresponding to the pieces of phase information, h and v, of each pixel sequentially produced by the adaptive product-sum device 137, as described above. The normalized coefficient S thus calculated by the normalized coefficient calculation section 140 is supplied to the normalized calculation circuit 128.

In addition, in the first tap selection circuit 121, prediction tap data (pixel data) located in periphery of each pixel (target pixel) within the unit pixel block constituting the output image signal Vout to be produced is selectively extracted from the 525i signal stored in the buffer memory 109 as the input image signal Vin. In this case, in the first tap selection circuit 121, the selection of tap is performed on the basis of the tap position information corresponding to the conversion method selected by the user and supplied from the register 131. The prediction tap data, xi, selectively extracted by the first tap circuit 121 is supplied to the estimated prediction calculation circuit 127.

In the estimated prediction calculation circuit 127, sets of the data, $y_1$ to $y_p$, of each pixel within the unit pixel block constituting the output image signal, Vout, to be produced are sequentially calculated again and again, from the prediction tap data, xi, and the coefficient data, Wi, in each phase information read out of the adaptive product-sum device 137 (see the Equation (4)). The sets of data, $y_1$ to $y_p$, of each pixel within the unit pixel block constituting the output image signal, Vout, and sequentially transmitted from the estimated prediction calculation circuit 127, are supplied to the normalized calculation circuit 128.

As described above, the normalized coefficient S calculated by the normalized coefficient calculation section 140, that is, the normalized coefficient S corresponding to the coefficient data, Wi, which has been used in calculating the sets of the data, $y_1$ to $y_p$, output from the estimated prediction calculation circuit 127, is supplied to the normalized calculation circuit 128. In the normalized calculation circuit 128, the sets of data, $y_1$ to $y_p$, transmitted from the estimated prediction calculation circuit 127 are normalized with dividing them by their respectively corresponding normalized coefficients S. This removes the level fluctuation of the sets of data, $y_1$ to $y_p$, caused by rounding error occurred when the coefficient data Wi in the estimated equation (see the Equation (4)) is obtained according to the production equations (see the Equations (7) and (6)) using the coefficient seed data.

The sets of data, $y_1'$ to $y_p'$, of each pixel within the unit pixel block, which is normalized in the normalized calculation circuit 128 and sequentially transmitted therefrom, are supplied to the post-processing circuit 129. The post-processing circuit 129 receives the sets of data, $y_1'$ to $y_p'$, and transmits them with a format specified by any one of the first to third conversion methods as the output image signal, Vout. When the first conversion method is selected, the 1080i signal is transmitted as the output image signal, Vout. When the second conversion method is selected, the XGA signal is transmitted as the output image signal, Vout. Further, when the third conversion method is selected, the 525i signal is transmitted as the output image signal, Vout.

Figure 2:
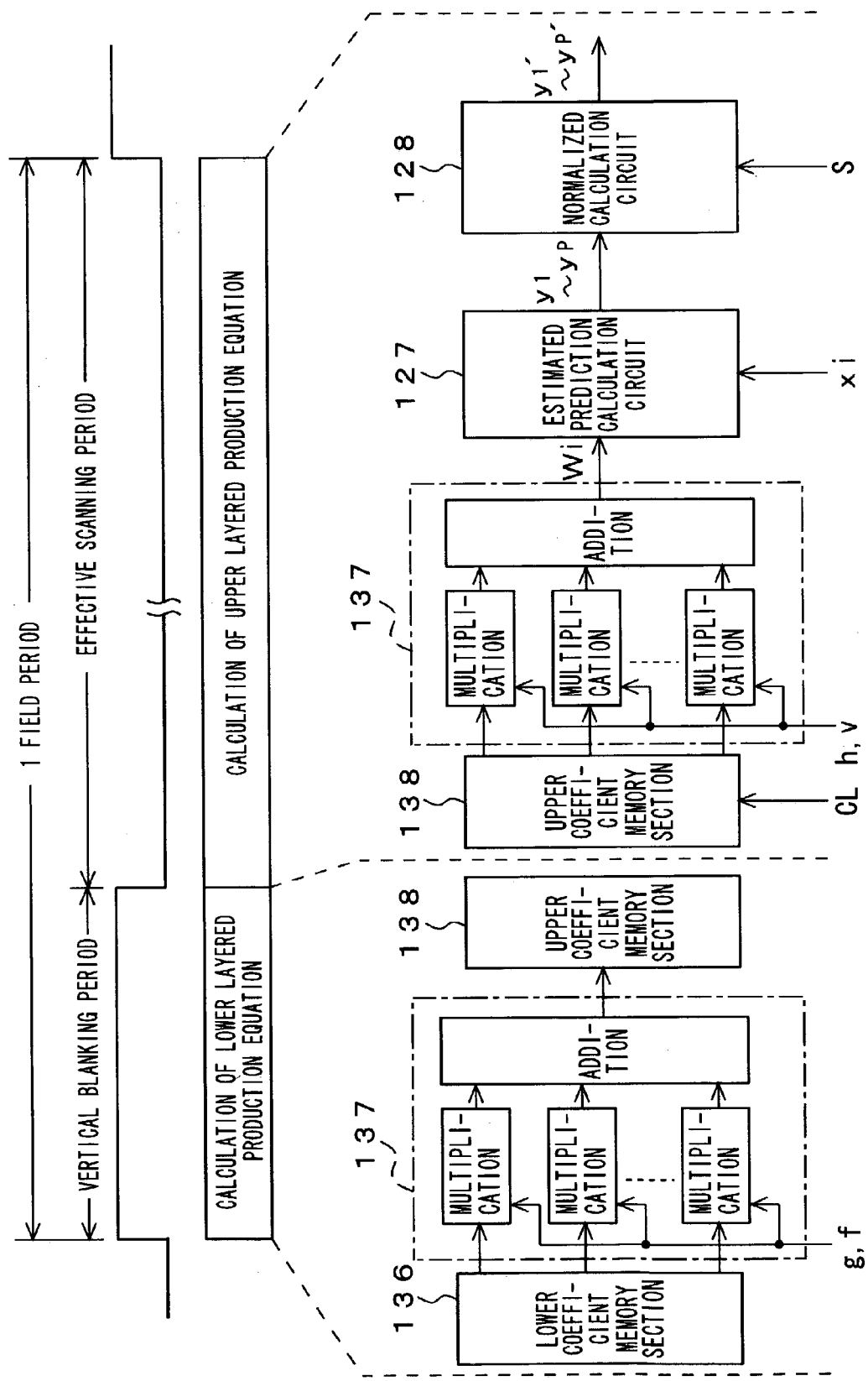
FIG. 2 is a diagram for illustrating calculational timing of each part in the image signal processing section.

FIG. 2 shows operation timing at respective parts of the above image signal processing section 110.

During the vertical blanking period of the output image signal, Vout, the adaptive product-sum device 137 calculates the lower layered production equation (according to the Equation (7)) using the sets of coefficient seed data, $b_{ij0}$ to $b_{ij8}$, of each class read out of the lower coefficient memory section 136 and the values of parameters, g and f, as the resolution information, supplied from the system controller 101 (see FIG. 1). Then, the sets of the coefficient data, $a_{i0}$ to $a_{i8}$ (i=1 to n), of the upper layered production equation (according to the Equation (6)), are produced every class, and the sets of the coefficient data, $a_{i0}$ to $a_{i8}$ (i=1 to n), of each class are stored in the upper coefficient memory section 138.

During the effective vertical scanning period of the output image signal, Vout, the adaptive product-sum device 137 calculates the upper layered production equation (according to the Equation (6)) using the sets of the coefficient data, $a_{i0}$ to $a_{i8}$ (i=1 to n), of the classes corresponding to the class codes, CL, which are read out of the upper coefficient memory section 138, and the values of parameters, h and v, which are generated by the phase information generation circuit 139, as the phase information of each pixel within the unit pixel block constituting the output image signal, Vout. The set(s) of coefficient data, Wi, in the estimated equation corresponding to each pixel within the unit pixel block constituting the output image signal, Vout, is/are produced.

Further, during the effective vertical scanning period of the output image signal, Vout, the estimated prediction calculation circuit 127 calculates the sets of data, $y_1$ to $y_p$, of each pixel within the unit pixel block constituting the output image signal, Vout, using the set(s) of coefficient data, Wi, sequentially produced by the adaptive product-sum device 137, as described above, and then, the normalized calculation circuit 128 normalizes the sets of data, $y_1$ to $y_p$ of each pixel using the normalized coefficient S to obtain the sets of data, $y_1'$ to $y_p'$, of each normalized pixel.

As described above, in the adaptive product-sum device 137, using the sets of coefficient seed data, $b_{ij0}$ to $b_{ij8}$, of each class read out of the lower coefficient memory section 136, the values of parameters, g and f, as the resolution information, supplied from the system controller 101, and the values of parameters, h and v, as the phase information generated by the phase information generation circuit 139, the sets of coefficient data, Wi, in the estimated data each corresponding to the class in accordance with the class codes CL, which are obtained by the class synthesis circuit 126, and corresponding to the values of parameters, g, f, h, and v, are produced and then, in the estimated prediction calculation circuit 127, the sets of data, $y_1$ to $y_p$, of each pixel within the unit pixel block constituting the output image signal, Vout, are calculated using the set(s) of coefficient data, Wi.

As a result of this, when converting the format into 1080i signal or XGA signal and the size into various ones in addition to making a resolution of the image obtained according to the output image signal, Vout, available for being adapted in multiple stages, no memory required for storing a large amount of coefficient data is necessary.

Further, in the adaptive product-sum device 137, during the vertical blanking period, the sets of the coefficient data, $a_{i0}$ to $a_{i8}$, of the upper layered production equation (according to the Equation (6)), are produced every class according to the Equation (7) of the lower layered production equation using the sets of coefficient seed data, $b_{ij0}$ to $b_{ij8}$, of each class and the values of parameters, g and f, and, during the subsequent effective vertical scanning period, using the sets of the coefficient data, $a_{i0}$ to $a_{i8}$, of the class corresponding to the class code CL read out of the upper coefficient memory section 138 and the values of the parameters, h and v, the sets of coefficient data Wi in the estimated equation corresponding to the class and the values of parameters, g, f, h, and v, are produced according to the upper layered production equation.

Therefore, the operations of each step in the adaptive product-sum device 137 are performed according to the Equations (7) and (6), not to the Equation (5), so that a processing amount in each step and the scale of hardware can be reduced. Since the calculations according to both of the Equations (7) and (6) performed in a time-sharing system in the adaptive product-sum device 137, it may make effective use of the hardware.

Since the upper layered production equation (according to the Equation (6)) includes the parameters, h and v, and the lower layered production equation (according to the Equation (7)) includes the parameters, g and f, only when the sets of the coefficient data, $a_{i0}$ to $a_{i8}$, of the upper layered production equation shown in the Equation (6) are produced during the vertical blanking period, the lower layered production equation (according to the Equation (7) is performed. This allows the calculation of the lower layered production equation to be reduced.

As described above, the lower coefficient memory section 136 stores the coefficient seed data in each class which is the coefficient data of the lower layered production equation (according to the Equation (7)). This coefficient seed data is produced beforehand by learning.

First, an example of this method for producing the coefficient seed data will be described. The description will be made as to an example where sets of coefficient data, $w_{i,0}$ to $w_{i,80}$ (i=1 to n) of the production equation that is far from being classified in a hierarchy, (according to the Equation (5)) should be obtained, and sets of the coefficient data, $b_{ij0}$ to $b_{ij8}$ (i=1 to n; j=0 to 8) of the lower layered production equation (according to the Equation (7)), should be then obtained using the sets of coefficient data, $w_{i,0}$ to $w_{i,80}$.

First, the sets of coefficient data, $w_{i,0}$ to $w_{i,80}$ (i=1 to n) of the production equation that is far from being classified in a hierarchy, (according to the Equation (5)) will be obtained. Herein, the terms $g^0f^0v^0h^0$, $g^0f^0v^0h^1$, $g^0f^0v^0h^2$ ... $g^2f^2v^2h^1$, and $g^2f^2v^2h^2$ are respectively defined as $t_0, t_1, t_2, \ldots t_{79}, t_{80}$, for the purpose of description. By use of them, the Equation (5) can be rewritten into Equation (9) as follows:

$$W_i = \sum_{j=0}^{80} w_{i,j} t_j \tag{9}$$

Finally, an undefined coefficient $w_{ij}$ is obtained by the leaning. Specifically, this is a solution method by use of a least square method where a coefficient value which minimizes a square error is defined per class using pixel data of a student signal and pixel data of a teacher signal. Defining the number of learning as m, a residual error at k-th learning data ($1 \leq k \leq m$) as $e_k$, and a sum of square errors as E, E is expressed in following Equation (10) by use of the Equations (4) and (5).

$$\begin{aligned}
E &= \sum_{k=1}^{m} e_k^2 \\
&= \sum_{k=1}^{m} [y_k - [(W_1 x_{1K} + W_2 x_{2K} + \ldots + W_n x_{nK})]]^2 \\
&= \sum_{k=1}^{m} \{y_k - [(t_0 w_{1,0} + t_1 w_{1,1} + \ldots + t_{80} w_{1,80}) x_{1k} + \ldots + (t_0 w_{n,0} + t_1 w_{n,1} + \ldots + t_{80} w_{n,80}) x_{nk}]\}^2 \\
&= \sum_{k=1}^{m} \{y_k - [(w_{1,0} + w_{1,1} h + \ldots + w_{1,80} g^2 f^2 v^2 h^2) x_{1k} + \ldots + (w_{n,0} + w_{n,1} h + \ldots + w_{n,80} g^2 f^2 v^2 h^2) x_{nk}]\}^2
\end{aligned} \tag{10}$$

Herein, the term $x_{ik}$ shows k-th pixel data at a position of i-th prediction tap of the student image, and the term $y_k$ shows k-th pixel data of the teacher image corresponding thereto.

In the solution method by use of the least square method, a value of $w_{i,j}$ which makes the partial differentiation of the Equation (10) into 0 is obtained. This is expressed by Equation (11) as follows:

$$\frac{\partial E}{\partial w_{i,j}} = \sum_{k=1}^{m} 2 \left( \frac{\partial e_k}{\partial w_{i,j}} \right) e_k = -\sum_{k=1}^{m} 2 t_j x_{ik} e_k = 0 \tag{11}$$

Hereinafter, defining the terms $X_{i,p,j,q}$ and $Y_{i,p}$ as shown in following Equations (12) and (13), the Equation (11) can be rewritten into following Equation (14) by use of matrix.

$$X_{i,p,j,q} = \sum_{k=1}^{m} x_{ik} t_p x_{jk} t_q \tag{12}$$

$$Y_{i,p} = \sum_{k=1}^{m} x_{ik} t_p y_k \tag{13}$$

$$\begin{bmatrix}
X_{1,0,1,0} & X_{1,0,1,1} & X_{1,0,1,2} & \cdots & X_{1,0,1,80} & X_{1,0,2,0} & \cdots & X_{1,0,n,80} \\
X_{1,1,1,0} & X_{1,1,1,1} & X_{1,1,1,2} & \cdots & X_{1,1,1,80} & X_{1,1,2,0} & \cdots & X_{1,1,n,80} \\
X_{1,2,1,0} & X_{1,2,1,1} & X_{1,2,1,2} & \cdots & X_{1,2,1,80} & X_{1,2,2,0} & \cdots & X_{1,2,n,80} \\
\vdots & \vdots & \vdots & \ddots & \vdots & \vdots & \ddots & \vdots \\
X_{1,80,1,0} & X_{1,80,1,1} & X_{1,80,1,2} & \cdots & X_{1,80,1,80} & X_{1,80,2,0} & \cdots & X_{1,80,n,80} \\
X_{2,0,1,0} & X_{2,0,1,1} & X_{2,0,1,2} & \cdots & X_{2,0,1,80} & X_{2,0,2,0} & \cdots & X_{2,0,n,80} \\
\vdots & \vdots & \vdots & \ddots & \vdots & \vdots & \ddots & \vdots \\
X_{n,80,1,0} & X_{n,80,1,1} & X_{n,80,1,2} & \cdots & X_{n,80,1,80} & X_{n,80,2,0} & \cdots & X_{n,80,n,80}
\end{bmatrix}
\begin{bmatrix} w_{1,0} \\ w_{1,1} \\ w_{1,2} \\ \vdots \\ w_{1,80} \\ w_{2,0} \\ \vdots \\ w_{n,80} \end{bmatrix}
=
\begin{bmatrix} Y_{1,0} \\ Y_{1,1} \\ Y_{1,2} \\ \vdots \\ Y_{1,80} \\ Y_{2,0} \\ \vdots \\ Y_{n,80} \end{bmatrix} \tag{14}$$

This equation is generally referred to as a normal equation. The normal equation is solved about $w_{i,j}$ by use of a sweeping method (Gauss-Jordan elimination method) and the like so that sets of the coefficient data, $W_{i,0}$ to $W_{i,80}$ (i=1 to n) of the production equation (according to the Equation (5)) that is far from being classified in a hierarchy, can be calculated.

Figure 3:
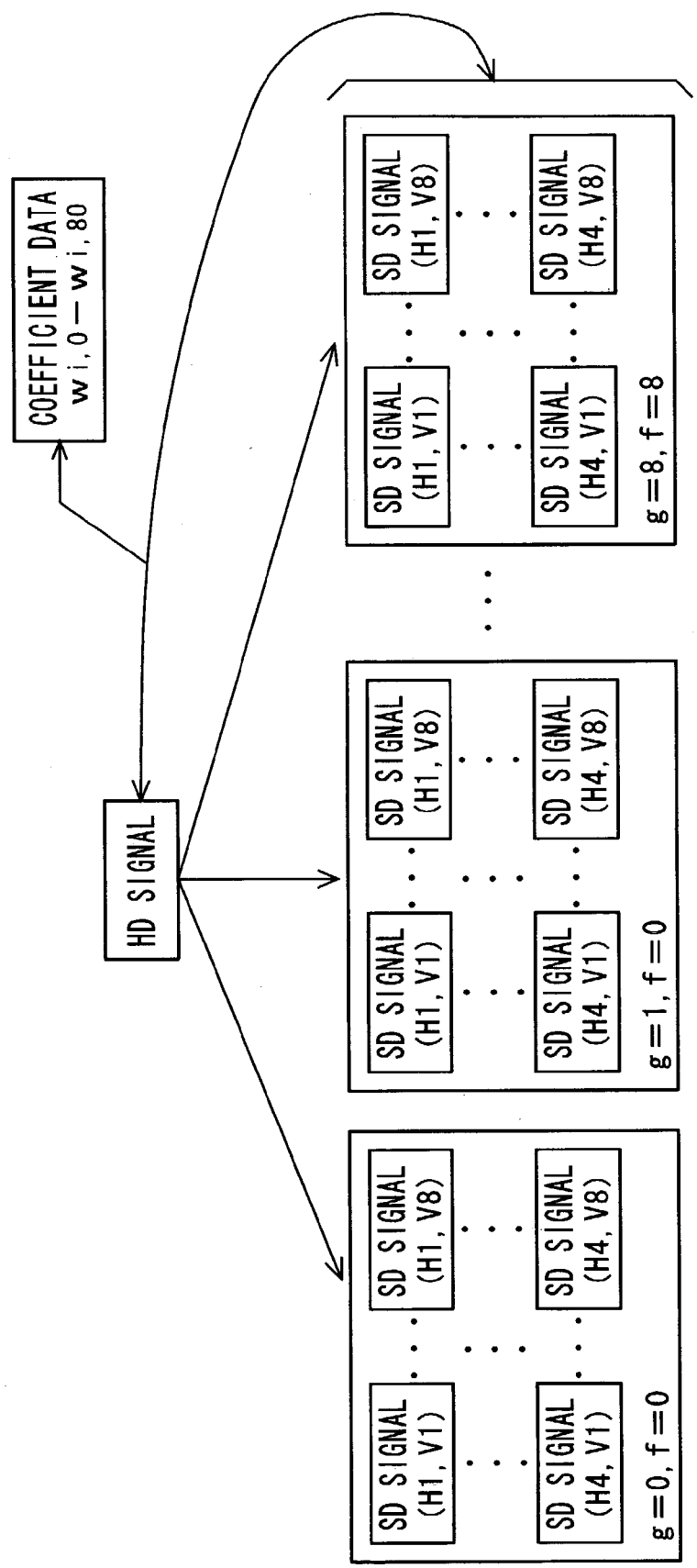
FIG. 3 is a diagram showing concept of an example of the method for producing the plural sets of coefficient data, $W_{i,0}$ through $W_{i,80}$ of the production equation that is still far from being classified in a hierarchy.

FIG. 3 shows a concept of the aforementioned method for producing the coefficient data, $W_{i,0}$ to $W_{i,80}$.

Figure 4:
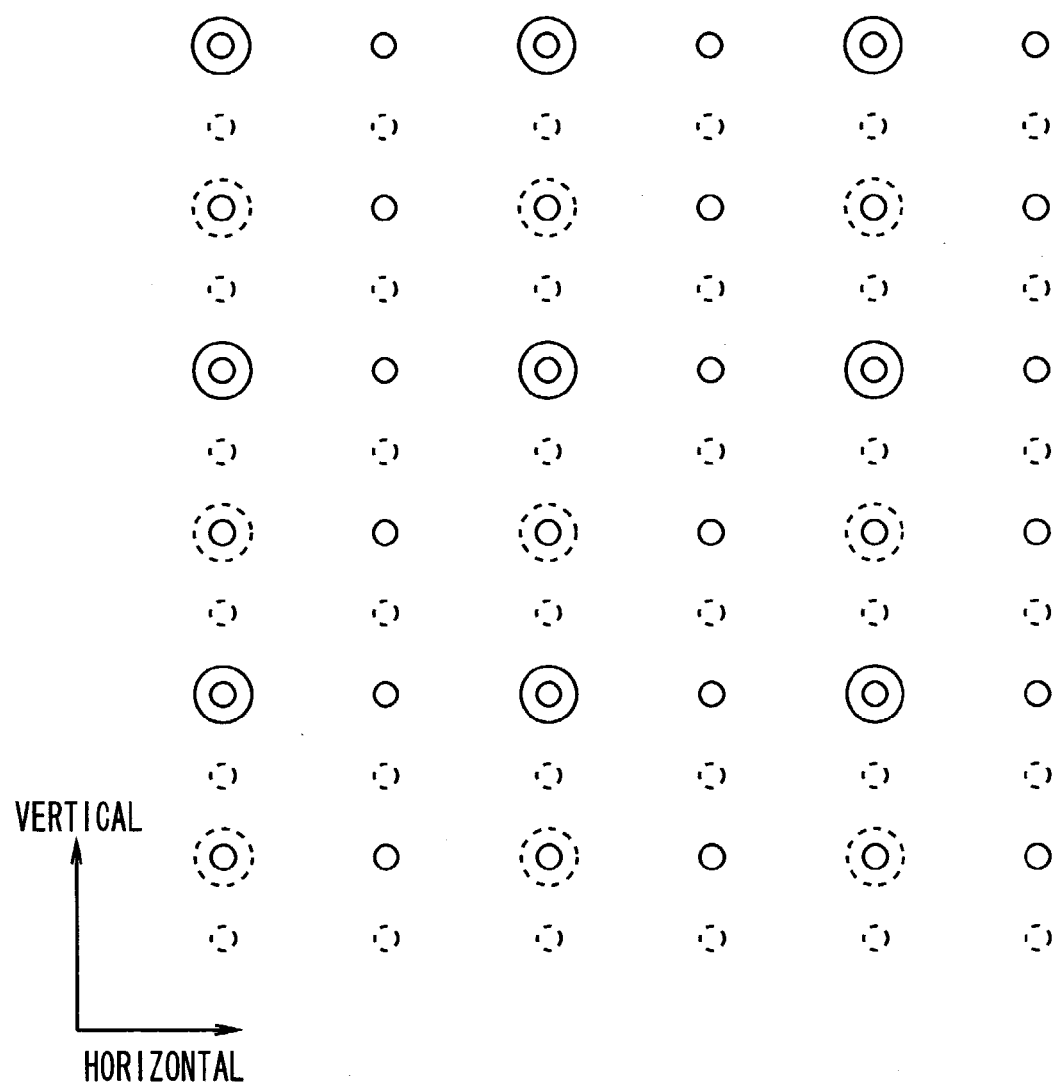
FIG. 4 is a diagram showing positional relationship between the pixels of the 525i signal (the SD signal) and the pixels of the 1050i signal (the HD signal)

An SD signal (525i signal) as a student signal is produced from an HD signal (1050i signal) as a teacher signal. FIG. 4 shows a positional relationship of pixels between the 525i signal and the 1050i signal. Herein, large dots are pixels of the 525i signal, and small dots are pixels of the 1050i signal. Solid lines express the positions of pixels in odd fields, and broken lines express the positions of pixels in even fields.

In this case, the parameters, g and f, for varying the horizontal bandwidth and the vertical bandwidth of the filter used when producing the SD signal from the HD signal are respectively shifted into nine stages so that 81 kinds in total of SD signals can be produced. The phase of the respective 81 kinds of SD signal thus produced is shifted into eight stages in a vertical direction, and is shifted into four stages in a horizontal direction so that 81×32 kinds in total of SD signals can be produced.

Figure 5:
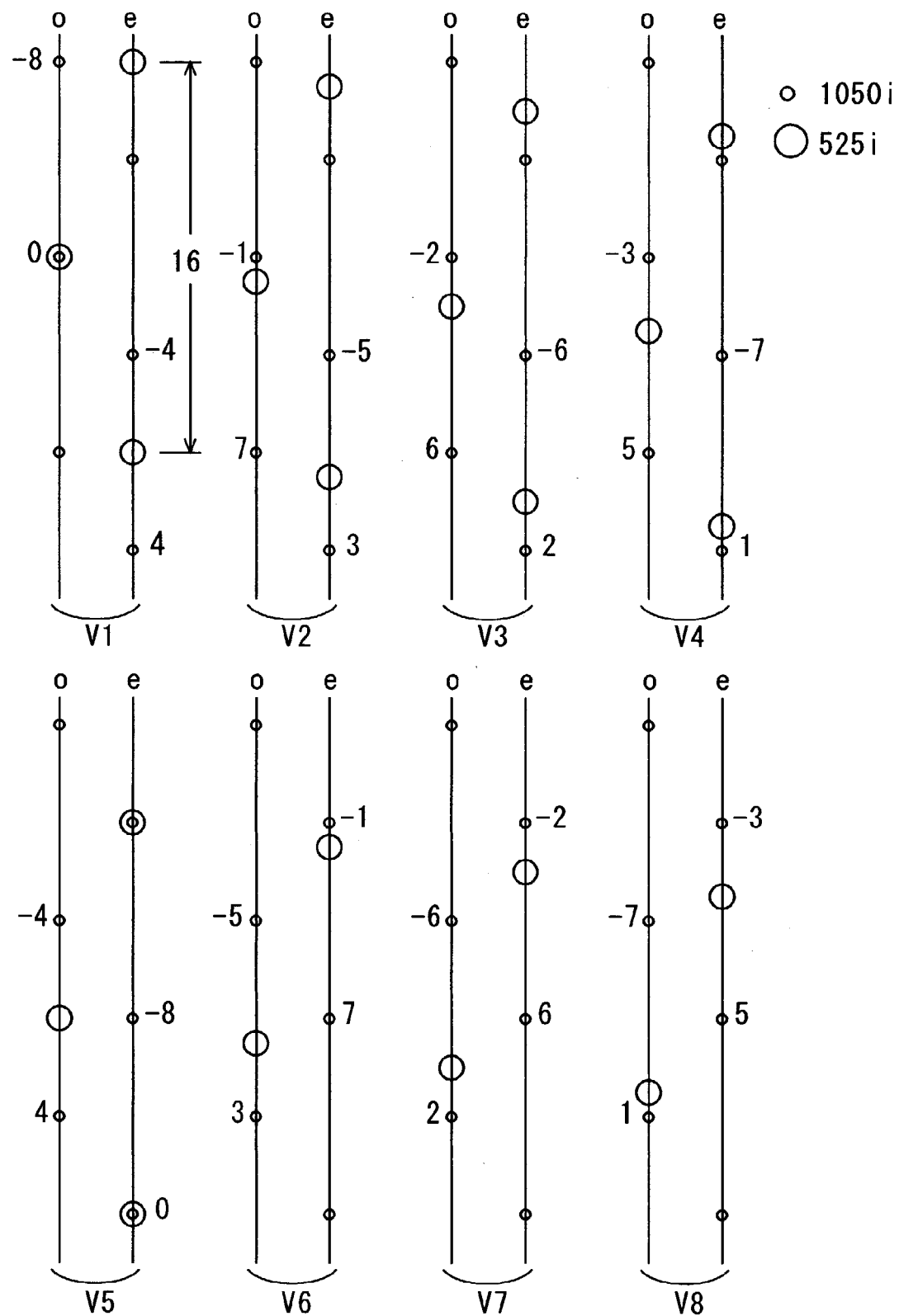
FIG. 5 is a diagram for illustrating a phase shift in eight stages in a vertical direction.

FIG. 5 shows the states of phase shifts, V1 to V8, into eight stages in a vertical direction. Herein, the interval between pixels of the SD signal in the vertical direction is 16, and the downward direction is set to a positive direction. In addition, the term "o" expresses an odd field, and the term "e" expresses an even field.

In the state of V1, the shift amount of the SD signal is set to 0. In this case, the pixels of the HD signal come to have phases of 4, 0, −4, and −8 with respect to the pixels of the SD signal. In the state of V2, the shift amount of the SD signal is set to 1. In this case, the pixels of the HD signal come to have phases of 7, 3, −1, and −5 with respect to the pixels of the SD signal. In the state of V3, the shift amount of the SD signal is set to 2. In this case, the pixels of the HD signal come to have phases of 6, 2, −2, and −6 with respect to the pixels of the SD signal. In the state of V4, the shift amount of the SD signal is set to 3. In this case, the pixels of the HD signal come to have phases of 5, 1, −3, and −7 with respect to the pixels of the SD signal.

In the state of V5, the shift amount of the SD signal is set to 4. In this case, the pixels of the HD signal come to have phases of 4, 0, −4, and −8 with respect to the pixels of the SD signal. In the state of V6, the shift amount of the SD signal is set to 5. In this case, the pixels of the HD signal come to have phases of 7, 3, −1, and −5 with respect to the pixels of the SD signal. In the state of V7, the shift amount of the SD signal is set to 6. In this case, the pixels of the HD signal come to have phases of 6, 2, −2, and −6 with respect to the pixels of the SD signal. In the state of V8, the shift amount of the SD signal is set to 7. In this case, the pixels of the HD signal come to have phases of 5, 1, −3, and −7 with respect to the pixels of the SD signal.

Figure 6:
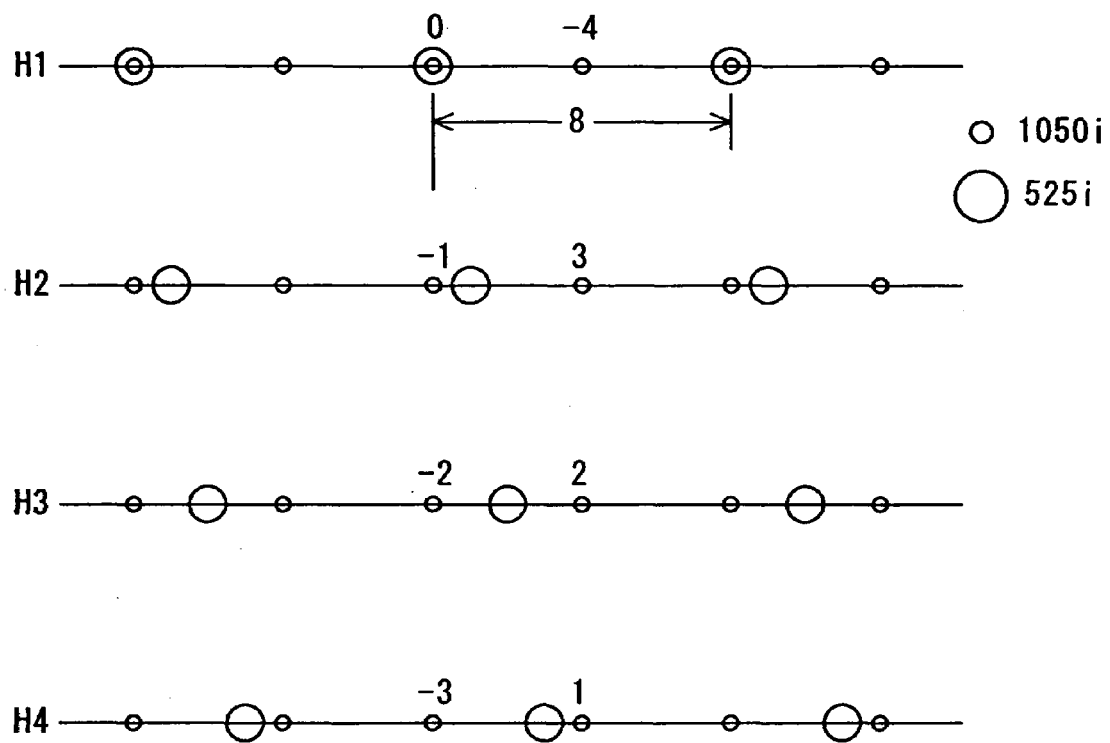
FIG. 6 is a diagram for illustrating a phase shift in four stages in a horizontal direction.

FIG. 6 shows the states of phase shifts H1 to H4 into four stages in a horizontal direction. Herein, the interval between pixels of the SD signal in the horizontal direction is set to 8, and the right direction is set to a positive direction.

In the state of H1, the shift amount of the SD signal is set to 0. In this case, the pixels of the HD signal come to have phases of 0 and −4 with respect to the pixels of the SD signal. In the state of H2, the shift amount of the SD signal is set to 1. In this case, the pixels of the HD signal come to have 3 and −1 with respect to the pixels of the SD signal. In the state of H3, the shift amount of the SD signal is set to 2. In this case, the pixels of the HD signal come to have phases of 2 and −2 with respect to the pixels of the SD signal. In the state of H4, the shift amount of the SD signal is set to 3. In this case, the pixels of the HD signal come to have phases of 1 and −3 with respect to the pixels of the SD signal.

Figure 7:
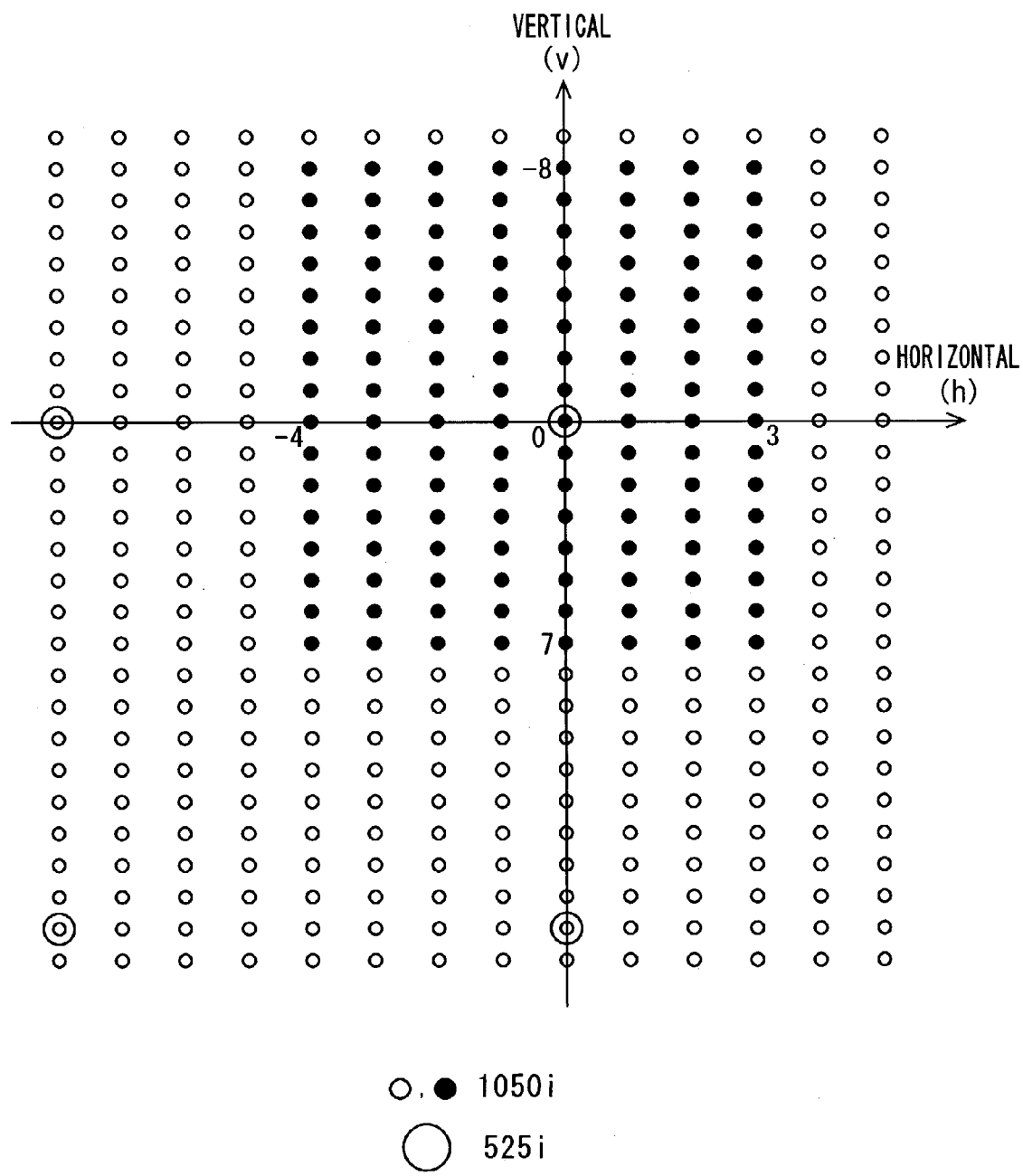
FIG. 7 is a diagram showing a phase relationship between the SD signal (the 525i signal) and the HD signal (the 1050i signal)

FIG. 7 shows the phases of the pixels of the HD signal in a case where the pixels of the SD signal are located at center positions, as to 32 kinds of SD signals obtained as a result of shifting the phase of the SD signal into 8 stages in the vertical direction and into 4 stages in the horizontal direction as described above. In other words, the pixels of the HD signal come to have phases (h=−4, v=−8 through h=3, v=7) expressed by symbols ● in FIG. 7 with respect to the pixels of the SD signal.

Returning back to FIG. 3, learning is performed between each of the SD signals in 81×32 kinds in total obtained as a result of shifting the parameters, g and f, when producing the SD signal into nine stages and shifting the phase of SD signal into 8 stages in the vertical direction and into 4 stages in the horizontal direction, and the HD signal, as described above, so that the sets of coefficient data, $W_{i,0}$ to $W_{i,80}$, can be produced.

FIG. 8 shows a configuration of a coefficient seed data production device 150 for producing the coefficient data, $W_{i,0}$ to $W_{i,80}$, based on the concept as described above and then obtaining as the coefficient seed data the coefficient data, $b_{ij0}$ to $b_{ij8}$ of the lower layered production equation (according to the Equation (7)), based on the sets of coefficient data, $W_{i,0}$ to $W_{i,80}$.

The coefficient seed data production device 150 includes an input terminal 151 for receiving the HD signal (1050i signal) as a teacher signal, an SD signal production circuit 152A for performing a thinning-out processing on the HD signal in horizontal and vertical directions so as to obtain the SD signal as the student signal. The parameters, g and f, are supplied to this SD signal production circuit 152A as the control signal. Corresponding to the values of these parameters, g and f, the horizontal bandwidth and the vertical bandwidth of the filter used when producing the SD signal from the HD signal are respectively varied into nine stages. The following will describe some examples of details of the filter.

Figure 9:
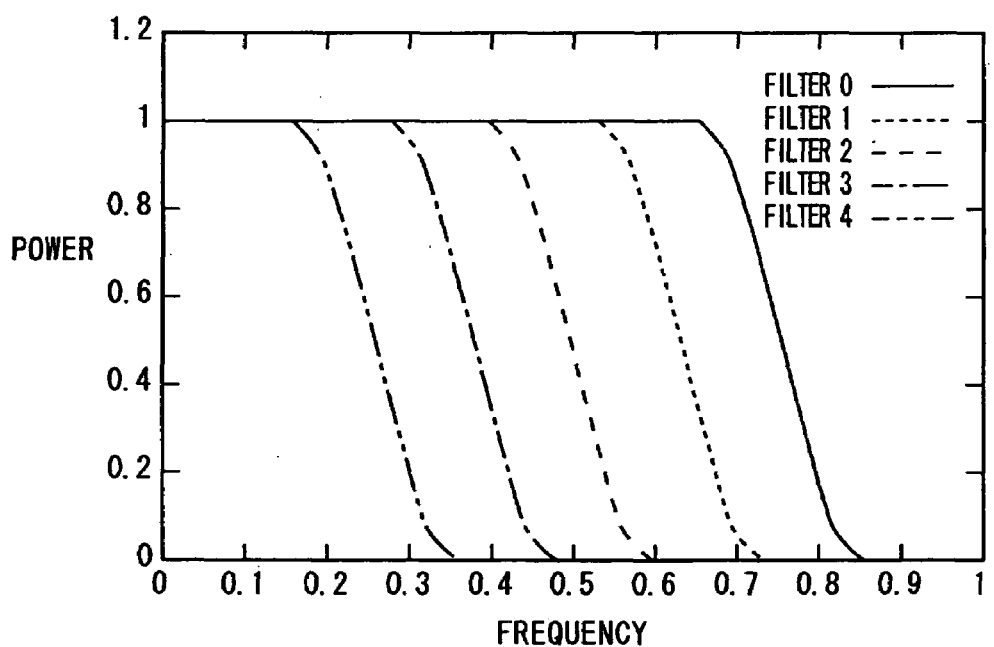
FIG. 9 is a diagram showing frequency characteristics of an example of band filter.

For example, it is conceivable to constitute the filter by a band-pass filter for restricting the horizontal-band frequencies and a band-pass filter for restricting the vertical-band frequencies. In this case, as shown in FIG. 9, by designing a frequency response corresponding to step-wise given values of the parameter, g or f, to perform inverse Fourier transform, a one-dimensional filter having the frequency response corresponding to the step-wise given values of the parameter, g or f, can be obtained.

Also, for example, it is conceivable to constitute the filter by a one-dimensional Gaussian filter for restricting the horizontal-band frequencies and a one-dimensional Gaussian filter for restricting the vertical-band frequencies. Such the one-dimensional Gaussian filter can be represented by following Equation (15).

$$Out = \frac{1.0}{\sigma\sqrt{2.0\pi}} e^{\frac{-(4.0\times -37)^2}{2.0\sigma^2}} \tag{15}$$

In this case, by step-wise changing the value of a standard deviation σ in correspondence with the step-wise given values of the parameter, g or f, a one-dimensional Gaussian filter having the frequency response that corresponds to the step-wise give values of the parameter, g or f, can be obtained.

Also, for example, it is conceivable to constitute the filter by a two-dimensional filter F (g, f) having both horizontal and vertical frequency responses that are decided by both of the parameters, g and f. In this method for producing two-dimensional filter, similar to the above-mentioned one-dimensional filter, the two-dimensional frequency response corresponding to the step-wise given values of the parameters, g and f, is designed, and two-dimensional inverse Fourier transform is performed. As a result, the two-dimensional filter having the two-dimensional frequency response that corresponds to the step-wise given values of the parameters, g and f, can be obtained.

Returning back to FIG. 8, the coefficient seed data production device 150 also includes a phase shift circuit 152B for shifting the phase of the SD signal obtained by the SD signal production circuit 152A. The phase shift circuit 152B receives parameters H, V, each for specifying the values of the phase shifts in the vertical direction and in the horizontal direction. The phase shift circuit 152B shifts the phase of the SD signal thus received into eight stages in the vertical direction and into four stages in the horizontal direction.

The phase shift circuit 152B is constituted by, for example, a filter having a characteristic of sinx/x; however, it is also possible to employ another kind of filter which enables phase shift. As an example of another kind of filter, there is a method where only a desired phase is extracted from an over sampling filter, or the like.

As described above, in the SD signal production circuit 152A, the horizontal bandwidth and the vertical bandwidth of the filter used when producing the SD signal from the HD signal are respectively varied into nine stages and, in the phase shift circuit 152B, the phase of the SD signal produced by the SD signal production circuit 152A is shifted into eight stages in the vertical direction and four stages in the horizontal direction. As the result thereof, the phase shift circuit 152B transmits the SD signal in 81×32 kinds.

Further, the coefficient seed data production device 150 includes first to third tap selection circuits 153 to 155 each for selectively extracting the data of plural SD pixels located in periphery of the target position in the HD signal (1050i signal) from the SD signal received from the phase shift circuit 152B, and then transmits the extracted data.

These first to third tap selection circuits 153 to 155 are constituted so as to have the same structures as those of the first to third tap selection circuits 121 to 123 in the image signal processing section 110 described above. The taps selected in the fist to third tap selection circuits 153 to 155 are specified by the tap position information provided from a tap selection control section 156. In addition, the class information MV of the movement class output from a movement class detection circuit 158, which will be described later, is supplied to the tap selection control circuit 156. As a result of this, the tap position information to be supplied to the second tap selection circuit 154 is differed depending on whether a movement is large or small.

The coefficient seed data production apparatus 150 also includes a space class detection circuit 157 for detecting the distribution pattern of the levels of the space class tap data (SD pixel data) selectively extracted in the second tap selection circuit 154, detecting a space class based on the distribution pattern of levels, and then transmitting the class information thereof. The space class detection circuit 157 is constituted so as to have the same structure as that of the space class detection circuit 124 in the image signal processing section 110 described above. The space class detection circuit 157 transmits, as class information showing the space class, a re-quantized code qi for each SD pixel data as the space class tap data.

The coefficient seed data production apparatus 150 also includes the movement class detection circuit 158 for detecting a movement class mainly showing the degree of movement from the class tap data (SD pixel data) selectively extracted in the third tap selection circuit 155, and then transmitting the class information MV thereof. The movement class detection circuit 158 is constituted so as to have the same structure as that of the movement class detection circuit 125 in the image signal processing section 110 described above. In the movement class detection circuit 158, a differential between frames is calculated from the movement class tap data (SD pixel data), which is selectively extracted in the third tap selection circuit 155. Then, a threshold value processing is performed on an average value of the absolute values of differentials so that the movement class, which is an index of movement, can be detected.

The coefficient seed data production apparatus 150 also includes a class synthesis circuit 159 for obtaining a class code CL showing a class including the pixel data at the target position in the HD signal (1050i signal), based on the re-quantized code qi as the class information about the space class received from the space class detection circuit 157 and the class information MV about the movement class received from the movement class detection circuit 158. The class synthesis circuit 159 is also constituted so as to have the same structure as that of the class synthesis circuit 126 in the image signal processing section 110 described above.

The coefficient seed data production apparatus 150 also includes a normal equation production section 160 for producing a normal equation (see the Equation (14)) to be employed for obtaining sets of the coefficient data, $W_{i,0}$ to $W_{i,80}$, for each class, from each set of HD pixel data, y, as pixel data at the target position obtained from the HD signal received at the input terminal 151, each set of prediction tap data (SD pixel data), xi, selectively extracted in the first tap selection circuit 153 respectively in correspondence with the respective sets of HD pixel data, y, each of the class codes, CL, received from the class synthesis circuit 159 respectively in correspondence with respective sets of HD pixel data, y, the parameters, g and f, for varying the horizontal bandwidth and the vertical bandwidth of the filter, and the parameters, H and V, of the phase shift values in the vertical direction and in the horizontal direction.

In this case, learning data is produced in combination of one set of the HD pixel data, y, and n sets of the prediction tap pixel data each corresponding to the HD pixel data, y. The parameters, g and f, to be supplied to the SD signal production circuit 152A and the parameters H, V to be supplied to the phase shift circuit 152B are sequentially changed so that SD signals of 81×32 kinds having gradually-changed horizontal and vertical bandwidths and gradually-changed phase shift values can be sequentially produced. As a result, a normal equation in which a large number of sets of the learning data corresponding to each combination of the values of parameters, g, f, h, and v, are registered is produced in the normal equation production section 160. Thus, sequentially producing the SD signals of plural kinds to register the learning data as described above allows the sets of coefficient data, $W_{i,0}$ to $W_{i,80}$, for obtaining pixel data having resolution with multiple stages and an arbitrary phase to be obtained.

Although not shown in the drawings, when disposing a delay circuit for time adjustment at a preceding stage of the first tap selection circuit 153, the timing of the SD pixel data, xi, supplied from the first tap selection circuit 153 to the normal equation production section 160 can be adjusted.

The coefficient seed data production apparatus 150 also includes a coefficient data decision section 161 for receiving data of the normal equation produced for each class in the normal equation production section 160 and for solving the normal equation for each class so as to obtain the sets of coefficient data, $W_{i,0}$ to $W_{i,80}$, in each class, a coefficient calculation section 162 for obtaining sets of the coefficient data, $b_{ij0}$ to $b_{ij8}$, of lower layered production equation (according to the Equation (7)) in each class from the obtained sets of coefficient data, $W_{i,0}$ to $W_{i,80}$, of the production equation (according to the Equation (5)) that is still far from being classified in a hierarchy, and a coefficient seed memory 163 for storing thus-obtained sets of coefficient data, $b_{ij0}$ to $b_{ij8}$, in each class as the coefficient seed data. In the coefficient data decision section 161, the normal equation is solved according to a method such as sweeping so that the sets of coefficient data, $W_{i,0}$ to $W_{i,80}$, can be obtained.

Operations of the coefficient seed data production apparatus 150 shown in FIG. 8 will be described. When the input terminal 151 receives an HD signal (1050i signal) as a teacher signal, the HD signal is subjected to the thinning-out processing in horizontal and vertical directions in the SD signal production circuit 152A so that an SD signal (525i signal) as a student signal can be produced. In this case, the parameters, g and f, are supplied to the SD signal production circuit 152A as the control signal so that the SD signal of 81 kinds with the horizontal and vertical bandwidths varying step by step can be sequentially produced.

The SD signals of 81 kinds thus produced are supplied to the phase shift circuit 152B, which shift the phase of the SD signal into 8 stages in the vertical direction and into 4 stages in the horizontal direction (see FIGS. 5 and 6). Therefore, the phase shift circuit 152B transmits the SD signals of 81×32 kinds sequentially.

In the second tap selection circuit 154, space class tap data (SD pixel data) located in periphery of the target position in the HD signal is selectively extracted from the SD signal of plural kinds. In the second tap selection circuit 154, the selection of tap is performed, based on the tap position information supplied from the tap selection control circuit 156, the tap position information corresponding to the movement class detected in the movement class detection circuit 158.

The space class tap data (SD pixel data) selectively extracted by the second tap selection circuit 154, is supplied to the space class detection circuit 157. In the space class detection circuit 157, each set of SD pixel data as the space class tap data is subjected to ADRC processing so that a re-quantized code qi as class information of the space class (a class sort mainly for the purpose of expressing the waveform in a space) can be produced (see the Equation (1)).

In addition, in the third tap selection circuit 155, movement class tap data (SD pixel data) located in periphery of the target position in the HD signal is selectively extracted from the SD signal of plural kinds transmitted from the phase shift circuit 152B. In this case, in the third tap selection circuit 155, the selection of the tap is performed, based on the tap position information supplied from the tap selection control circuit 156.

The movement class tap data (SD pixel data) selectively extracted from the third tap selection circuit 155 is supplied to the movement class detection circuit 158. In the movement class detection circuit 158, the class information, MV, about the movement class (a class sort mainly for the purpose of expressing the degree of movement) is obtained from each set of SD pixel data as the movement class tap data.

Thus-obtained movement information, MV, and the aforementioned re-quantized code, qi, are supplied to the class synthesis circuit 159. In the class synthesis circuit 159, the class code CL showing a class including pixel data at the target position in the HD signal is obtained using the movement information, MV, and the re-quantized code, qi (see the Equation (3)).

Further, in the first tap selection circuit 153, the prediction tap data (SD pixel data) located in periphery of the target position in the HD signal is selectively extracted from the SD signal of plural kinds transmitted from the phase shift circuit 152B. In this case, in the first tap selection circuit 153, the selection of tap is performed, based on the tap position information supplied from the tap selection control circuit 156.

In the normal equation production section 160, a normal equation (see the Equation (14)) to be employed for obtaining sets of the coefficient data, $W_{i,0}$ to $W_{i,80}$, is produced for each class, from each set of HD pixel data, y, as pixel data at the target position obtained from the HD signal received at the input terminal 151, prediction tap data (SD pixel data), xi, selectively extracted in the first tap selection circuit 153 respectively in correspondence with each set of HD pixel data, y, the class code CL received from the class synthesis circuit 159 respectively in correspondence with each set of HD pixel data, y, the parameters, g and f, for varying the horizontal bandwidth and the vertical bandwidth of the filter, and the parameters, H and V, of the phase shift values in the vertical direction and in the horizontal direction.

Then, the normal equation is solved in the coefficient data decision section 161 so that the sets of coefficient data, $W_{i,0}$ to $W_{i,80}$, of the production equation (according to the Equation (5)) that still far from being classified in a hierarchy can be obtained for each class. The sets of coefficient data, $W_{i,0}$ to $W_{i,80}$, for each class are supplied to the coefficient calculation section 162. In the coefficient calculation section 162, the sets of coefficient data, $b_{ij0}$ to $b_{ij8}$, of the lower layered production equation (according to the equation (7)) are determined from the sets of coefficient data, $W_{i,0}$ to $W_{i,80}$, for each class based on the relationship between the upper layered production equation (according to the equation (6)) and the lower layered production equation (according to the equation (7)). The sets of coefficient data, $b_{ij0}$ to $b_{ij8}$, are stored in the coefficient seed memory 163 in which addresses are assigned for each class, as the coefficient seed data.

As described above, in the coefficient seed data production device 150 shown in FIG. 8, it is possible to produce the sets of coefficient seed data, $b_{ij0}$ to $b_{ij8}$, for each class stored in the lower coefficient memory section 136 of the image signal processing section 110 shown in FIG. 1.

Next, another example of a method for producing the coefficient seed data will be described. In the following example, the description will be made as to an example where set(s) of the coefficient data, Wi (i=1 to n) in the estimated equation is/are obtained according to the Equation (4) every combination of the values of the parameters, g, f, h, and v; sets of the coefficient data, $W_{i,0}$ to $W_{i,80}$ (i=1 to n) of the production equation (according to the Equation (5)) that still far from being classified in a hierarchy are obtained using the coefficient data, Wi corresponding to each combination; and sets of the coefficient data, $b_{ij0}$ to $b_{ij8}$ ( i=1 to n and j=0 to 8) of the lower layered production equation are obtained according to the equation (7) using the sets of coefficient data, $W_{i,0}$ to $W_{i,80}$.

FIG. 10 shows a concept of a method for producing the coefficient data, $W_{i,0}$ to $W_{i,80}$, in this example. As is the case of the method for producing the coefficient seed data described above, the parameters, g and f, for varying the horizontal bandwidth and the vertical bandwidth of the filter used when producing the SD signal from the HD signal are respectively shifted into nine stages so that SD signal of 81 kinds in total is produced, and then, the phase of SD signal is shifted into 8 stages in the vertical direction and is shifted into 4 stages into the horizontal direction with respect to each SD signal of 81 kinds, so that the SD signal of 81×32 kinds in total can be sequentially produced.

Then, learning is performed between each SD signal and the HD signal so that coefficient data, Wi, in the estimated equation of the Equation (4) every combination of the parameters, g, f, h, and v, can be obtained. Then, coefficient seed data is produced using the coefficient data, Wi, in correspondence with each combination thereof.

First, a method for obtaining the coefficient data in the estimated equation will be described. Herein, a description will be made as to a case where the set(s) of coefficient data, Wi (i=1 to n) of the estimated equation of the Equation (4) is/are obtained using a least square method. A consideration will be made on an observation equation of following Equation (16) as a generalized example, defining X as input data, W as coefficient data, and Y as a predicted value.

$$XW = Y$$

$$X = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}, \quad W = \begin{bmatrix} W_1 \\ W_2 \\ \cdots \\ W_n \end{bmatrix}, \quad Y = \begin{bmatrix} y_1 \\ y_2 \\ \cdots \\ y_m \end{bmatrix} \quad (16)$$

In the Equation (16), m expresses the number of the sets of learning data, and n expresses the number of prediction taps.

The least square method is applied to the data collected by use of the observation equation of the Equation (16). Based on the observation equation of the Equation (16), a residual equation of following Equation (17) is considered.

$$XW = Y + E, \quad E = \begin{bmatrix} e_1 \\ e_2 \\ \cdots \\ e_m \end{bmatrix} \quad (17)$$

From the residual equation of the Equation (17), it is considered that the most probable value of each Wi is established when the condition that minimizes the value of $e^2$ of following Equation (18) is satisfied. That is, the condition of following Equation (19) may be considered.

$$e^2 = \sum_{i=1}^{m} e_i^2 \quad (18)$$

$$e_1 \frac{\partial e_1}{\partial w_i} + e_2 \frac{\partial e_2}{\partial w_i} + \ldots + e_m \frac{\partial e_m}{\partial w_i} = 0 \quad (i = 1, 2, \ldots, n) \quad (19)$$

Specifically, conditions in the number of n based on the value of i of the Equation (19) are considered, and $W_1$, $W_2 \ldots W_n$ having values satisfying these conditions may be obtained. As a result, following Equation (20) can be obtained from the residual equation of the Equation (17). Further, following Equation (21) can be also obtained from the Equations (20) and (16).

$$\frac{\partial e_i}{\partial w_1} = x_{i1}, \frac{\partial e_i}{\partial w_2} = x_{i2}, \ldots, \frac{\partial e_i}{\partial w_n} = x_{in} \quad (i = 1, 2, \ldots, m) \quad (20)$$

$$\sum_{i=1}^{m} e_i x_{i1} = 0, \sum_{i=1}^{m} e_i x_{i2} = 0, \ldots, \sum_{i=1}^{m} e_i x_{in} = 0 \quad (21)$$

Then, a normal equation of following Equation (22) can be obtained from the Equations (17) and (21).

$$\left(\sum_{j=1}^{m} x_{j1} x_{j1}\right) w_1 + \left(\sum_{j=1}^{m} x_{j1} x_{j2}\right) w_2 + \ldots + \left(\sum_{j=1}^{m} x_{j1} x_{jn}\right) w_n = \left(\sum_{j=1}^{m} x_{j1} y_j\right) \quad (22)$$

$$\left(\sum_{j=1}^{m} x_{j2} x_{j1}\right) w_1 + \left(\sum_{j=1}^{m} x_{j2} x_{j2}\right) w_2 + \ldots + \left(\sum_{j=1}^{m} x_{j2} x_{jn}\right) w_n = \left(\sum_{j=1}^{m} x_{j2} y_j\right)$$

$$\ldots$$

-continued $$\left(\sum_{j=1}^{m} x_{jn} x_{j1}\right) w_1 + \left(\sum_{j=1}^{m} x_{jn} x_{j2}\right) w_2 + \ldots + \left(\sum_{j=1}^{m} x_{jn} x_{jn}\right) w_n = \left(\sum_{j=1}^{m} x_{jn} y_j\right)$$

Since the normal equation of the Equation (22) is capable of making equations in the same number as the unknown number, n, the most probable value of each Wi can be obtained. In this case, simultaneous equations are solved by a method such as sweeping.

Next, a method for obtaining the sets of the coefficient data, $W_{j,0}$ to $W_{j,80}$, of the production equation (according to the Equation (5)) that still far from being classified in a hierarchy, using the set(s) of coefficient data, Wi (i=1 to n), in the estimated equation of the Equation (4) produced every combination of the values of parameters, g, f, h, and v, will be described.

It is assumed that coefficient data in the estimated equation in a certain class, corresponding to the values of certain parameters, g, f, h, and v, is resulted into $k_{gfvhi}$. Herein, the term, i, expresses the prediction tap number. The sets of the coefficient data, $W_{i,0}$ to $W_{i,80}$, of the production equation that still far from being classified in a hierarchy, of this class are obtained from the $k_{gfvhi}$.

Each set of coefficient data, Wi (i=1 to n) is expressed in the Equation (5) described above using the sets of coefficient seed data, $W_{i,0}$ to $W_{i,80}$. Herein, under the consideration that a least square method is employed for the coefficient data, Wi, a residual is expressed by following Equation (23).

$$e_{gfvhi} = k_{gfvhi} - (W_{i,0} + W_{i,1}h + \ldots + W_{i,80}g^2 f^2 v^2 h^2) \quad (23)$$

$$= k_{gfvhi} - \sum_{j=0}^{80} w_{i,j} t_j$$

Herein, the term, $t_0, t_1, t_2 \ldots t_{79}, t_{80}$ has been respectively substituted for $g^0 f^0 v^0 h^0$, $g^0 f^0 v^0 h^1$, $g^0 f^0 v^0 h^2 \ldots g^2 f^2 v^2 h^1$, $g^2 f^2 v^2 h^2$. When a least square method is employed in the Equation (23), following Equation (24) can be obtained.

$$\frac{\partial}{\partial w_{i,j}} = \sum_{g} \sum_{f} \sum_{h} \sum_{v} (e_{gfhvi})^2 \quad (24)$$

$$= \sum_{g} \sum_{f} \sum_{h} \sum_{v} 2\left(\frac{\partial e_{gfhvi}}{\partial w_{i,j}}\right) e_{gfhvi}$$

$$= -\sum_{g} \sum_{f} \sum_{h} \sum_{v} 2 t_j e_{gfhvi}$$

$$= 0$$

Herein, defining the terms $X_{i,k}, Y_j$ as following Equations (25) and (26) respectively, Equation (24) can be rewritten into following Equation (27).

$$X_{j,k} = \sum_{g} \sum_{f} \sum_{h} \sum_{v} t_j t_k \quad (25)$$

$$Y_j = \sum_{g} \sum_{f} \sum_{h} \sum_{v} t_j k_{gfhvi} \quad (26)$$

-continued $$\begin{bmatrix} X_{0,0} & X_{0,1} & \cdots & X_{0,80} \\ X_{1,0} & X_{1,1} & \cdots & X_{0,80} \\ \vdots & \vdots & \ddots & \vdots \\ X_{80,0} & X_{80,1} & \cdots & X_{80,80} \end{bmatrix} \begin{bmatrix} w_{i,0} \\ w_{i,1} \\ \vdots \\ w_{i,80} \end{bmatrix} = \begin{bmatrix} Y_0 \\ Y_1 \\ \vdots \\ Y_{80} \end{bmatrix} \quad (27)$$

This Equation (27) is also a normal equation. By solving the Equation (27) according to a general solution such as a sweeping method, the sets of coefficient data, $W_{i,0}$ to $W_{i,80}$, can be obtained.

Figure 11:
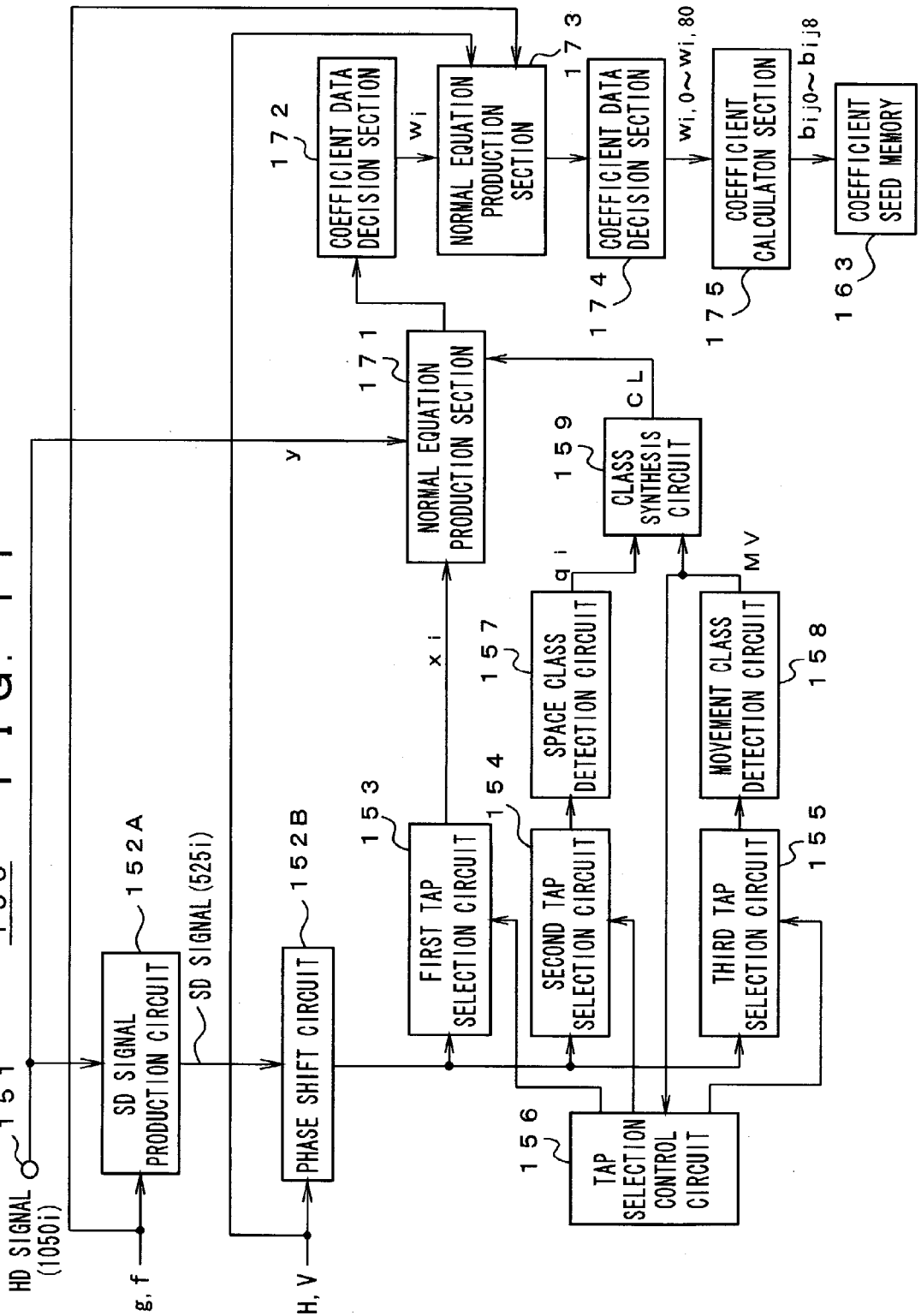
FIG. 11 is a block diagram showing an exemplary structure of another coefficient seed data production device.

FIG. 11 shows a configuration of a coefficient seed data production device 150' for producing sets of the coefficient data, $W_{i,0}$ to $W_{i,80}$, according to the concept as described above and obtaining sets of the coefficient data, $b_{ij0}$ to $b_{ij8}$, of the lower layered production equation (according to the equation (7)) using the sets of coefficient data, $W_{i,0}$ to $W_{i,80}$. In FIG. 11, constituent elements corresponding to those of FIG. 8 are denoted by the same reference numerals, and detailed descriptions thereof will be omitted.

The coefficient seed data production apparatus 150' includes a normal equation production section 171. The normal equation production section 171 produces a normal equation (see the Equation (22)) to be employed for obtaining the set(s) of coefficient data, Wi (i=1 to n) for each class and each combination of the values of parameters, g, f, h, and v, using each set of HD pixel data, y, as target pixel data obtained from the HD signal received at the input terminal 151, prediction tap data (SD pixel data), xi, selectively extracted in the first tap selection circuit 153 respectively in correspondence with each set of HD pixel data, y, and the class code CL received from the class synthesis circuit 159 respectively in correspondence with each set of HD pixel data, y.

In this case, learning data is produced in combination of one set of the HD pixel data, y, and the n sets of the prediction tap pixel data corresponding to the HD pixel data, y. The parameters, g and f, to be supplied to the SD signal production circuit 152A and the parameters, H and V, to be supplied to the phase shift circuit 152B are sequentially changed so that SD signal of 81×32 kinds can be sequentially produced with the horizontal and vertical bandwidths and the values of phase shifts in the horizontal and vertical directions being varied step by step, thereby producing learning data between the HD signal and each SD signal respectively. As a result, in the normal equation production section 171, a normal equation for obtaining set(s) of the coefficient data, Wi (i=1 to n) is produced for each class in correspondence with each combination of the values of parameters, g, f, h, and v.

The coefficient seed data production apparatus 150' also includes a coefficient data decision section 172 and a normal equation production section 173. The data of normal equation produced by normal equation production section 171 is supplied to the coefficient data decision section 172. The coefficient data decision section 172 solves the normal equation so as to obtain set(s) of coefficient data, Wi, in the estimated equation (according to the Equation (4)) for each class respectively corresponding to each combination of the values of parameters, g, f, h, and v. The normal equation production section 173 produces a normal equation (see the Equation (27)) for obtaining the sets of coefficient data, $W_{i,0}$ to $W_{i,80}$ of the production that is still far from being classified in a hierarchy, for each class using the set(s) of coefficient data, Wi, the parameters, g and f, for varying the horizontal bandwidth and the vertical bandwidth of the filter, the parameters, H and V, about the values of phase shifts in the horizontal and vertical directions.

The coefficient seed data production apparatus 150' also includes a coefficient data decision section 174, a coefficient calculation section 175, and a coefficient seed memory 163. The coefficient data decision section 174 receives data of the normal equation produced for each class in the normal equation production section 173. The coefficient data decision section 174 solves the normal equation for each class so as to obtain the sets of coefficient data, $W_{i,0}$ to $W_{i,80}$ in each class. The coefficient calculation section 175 obtains the sets of coefficient data, $b_{ij0}$ to $b_{ij8}$, of the lower layered production equation (according to the equation (7)) for each class based on the relationship between the upper layered production equation (according to the equation (6)) and the lower layered production equation (according to the equation (7)), from the sets of coefficient data thus obtained, $W_{i,0}$ to $W_{i,80}$ of the production equation (according to the Equation (5)) that still far from being classified in a hierarchy. The coefficient seed memory 163 stores the sets of coefficient data, $b_{ij0}$ to $b_{ij8}$, for each class as the coefficient seed data.

The remaining constituent elements of the coefficient seed data production device 150' shown in FIG. 11 have the same configuration as that of the coefficient seed data production device 150 shown in FIG. 8.

Operations of the coefficient seed data production apparatus 150' shown in FIG. 11 will be described. An HD signal (1050i signal) is supplied to the input terminal 151 as a teacher signal. Then, the HD signal is subjected to the thinning-out processing in the horizontal and vertical directions in the SD signal production circuit 152A so that an SD signal (525i signal) as a student signal can be obtained. In this case, the parameters, g and f, are supplied to the SD signal production circuit 152A as the control signal so that SD signals of 81 kinds can be sequentially produced with the horizontal and vertical bandwidths being varied step by step, Thus-produced SD signals of 81 kinds are supplied to the phase shift circuit 152B where the phase of each SD signal is shifted into 8 stages in the vertical direction and is shifted into 4 stages in the horizontal direction (see FIGS. 5 and 6). Therefore, the phase shift circuit 152B sequentially transmits SD signals of 81×32 kinds.

In the second tap selection circuit 154, sets of space class tap data (SD pixel data) located in periphery of the target position in the HD signal (1050i signal) are selectively extracted from these SD signal of plural kinds. In the second tap selection circuit 154, the selection of tap is performed, based on the tap position information supplied from the tap selection control circuit 156, the tap position information corresponding to the movement class detected in the movement class detection circuit 158.

The sets of space class tap data (SD pixel data) selectively extracted by the second tap selection circuit 154 are supplied to the space class detection circuit 157. In the space class detection circuit 157, each set of SD pixel data as the space class tap data is subjected to ADRC processing so that a re-quantized code, qi, as class information of the space class (a class sort mainly for the purpose of expressing the waveform in a space) can be obtained (see the Equation (1)).

In addition, in the third tap selection circuit 155, sets of movement class tap data (SD pixel data) located in periphery of the target position in the HD signal are selectively extracted from the SD signal of plural kinds obtained in the phase shift circuit 152B. In this case, in the third tap selection circuit 155, the selection of the tap is performed, based on the tap position information supplied from the tap selection control circuit 156.

The movement class tap data (SD pixel data) selectively extracted by the third tap selection circuit 155 is supplied to the movement class detection circuit 158. In the movement class detection circuit 158, class information, MV, about a movement class (a class sort mainly for the purpose of expressing the degree of movement) is obtained from each set of SD pixel data as movement class tap data.

The movement information, MV, and the aforementioned re-quantized code, qi, are supplied to the class synthesis circuit 159. In the class synthesis circuit 159, a class code, CL, showing a class including pixel data at the target position in the HD signal is obtained from the movement information, MV, and the re-quantized code, qi (see the Equation (3)).

Further, in the first tap selection circuit 153, the sets of prediction tap data (SD pixel data) located in periphery of the target position in the HD signal are selectively extracted from the SD signal of plural kinds produced in the phase shift circuit 152B. In this case, in the first tap selection circuit 153, the selection of tap is performed, based on the tap position information supplied from the tap selection control circuit 156.

In the normal equation production section 171, a normal equation (see the Equation (22)) to be employed for obtaining the set(s) of coefficient data, Wi (i=1 to n) in the estimated equation (according to the Equation (4)) is produced for each class in correspondence with each combination of the values of the parameters, g, f, h, and v, from each set of HD pixel data, y, as pixel data at the target position obtained from the HD signal received at the input terminal 151, prediction tap data (SD pixel data), xi, selectively extracted in the first tap selection circuit 153 respectively in correspondence with each set of HD pixel data, y, and the class code, CL, received from the class synthesis circuit 159 respectively in correspondence with each set of HD pixel data, y.

Then, the normal equation is solved in the coefficient data decision section 172 so that the set(s) of coefficient data, Wi for each class respectively corresponding to each combination of the values of the parameters, g, f, h, and v can be produced. In the normal equation production section 173, a normal equation (see the Equation (27)) employed for obtaining the sets of coefficient data, $W_{i,0}$ to $W_{i,80}$ for each class, is produced from the set(s) of coefficient data, Wi for each class, the parameters, g and f, for varying the horizontal bandwidth and the vertical bandwidth of the filter, and the parameters, H and V about the phase shift values in the vertical direction and in the horizontal direction.

Then, the normal equation is solved in the coefficient seed data decision section 174 so that sets of the coefficient data, $W_{i,0}$ to $W_{i,80}$ of the production equation (according to the Equation (5)) that still far from being classified in a hierarchy, for each class can be obtained. The sets of the coefficient data, $W_{i,0}$ to $W_{i,80}$ for each class are supplied to the coefficient calculation section 175 where sets of the coefficient data, $b_{ij0}$ to $b_{ij8}$, of the lower layered production equation (according to the equation (7)) are obtained for each class from the sets of coefficient data, $W_{i,0}$ to $W_{i,80}$ The sets of the coefficient data, $b_{ij0}$ to $b_{ij8}$, are stored in the coefficient seed memory 162 in which addresses are assigned for each class, as the coefficient seed data.

As described above, in the coefficient seed data production device 150' shown in FIG. 11 as well, it is possible to produce the coefficient seed data, $b_{ij0}$ to $b_{ij8}$, for each class stored in the lower coefficient memory section 136 of the image signal processing section 110 shown in FIG. 1.

Incidentally, in the image signal processing section 110 shown in FIG. 1, the production equations of the Equations (7) and (6) obtained by classifying in a hierarchy in two layers the production equation of the Equation (5) that is still far from being classified in a hierarchy have been employed for producing the set(s) of coefficient data, Wi (i=1 to n). Alternatively, it is also possible to classify that production equation in a hierarchy in more than two layers, not limited to two layers.

Further alternatively, as to the production equation that is still far from being classified in a hierarchy, it is not limited to the one of the Equation (5). Employing a polynomial equation of different degrees or an equation expressed by another function allows it to be implemented. As to the parameter included in the production equation, the parameter is not limited to such the parameters, g, f, h, and v. A production equation including a parameter together with these ones or another parameter is available.

Although the lower layered production equation (according to the Equation (7)) and the upper layered production equation (according to the Equation (6)) having the similar formula to each other have been shown, they may have the different formula from each other. If so, the adaptive product-sum device 137 is available in common when information about the product-sum structure to be supplied to the adaptive product-sum device 137 is altered. In this case, the least common multiple scaled device that may calculate various layered production equations may suffice for the adaptive product-sum device 137.

Figure 12:
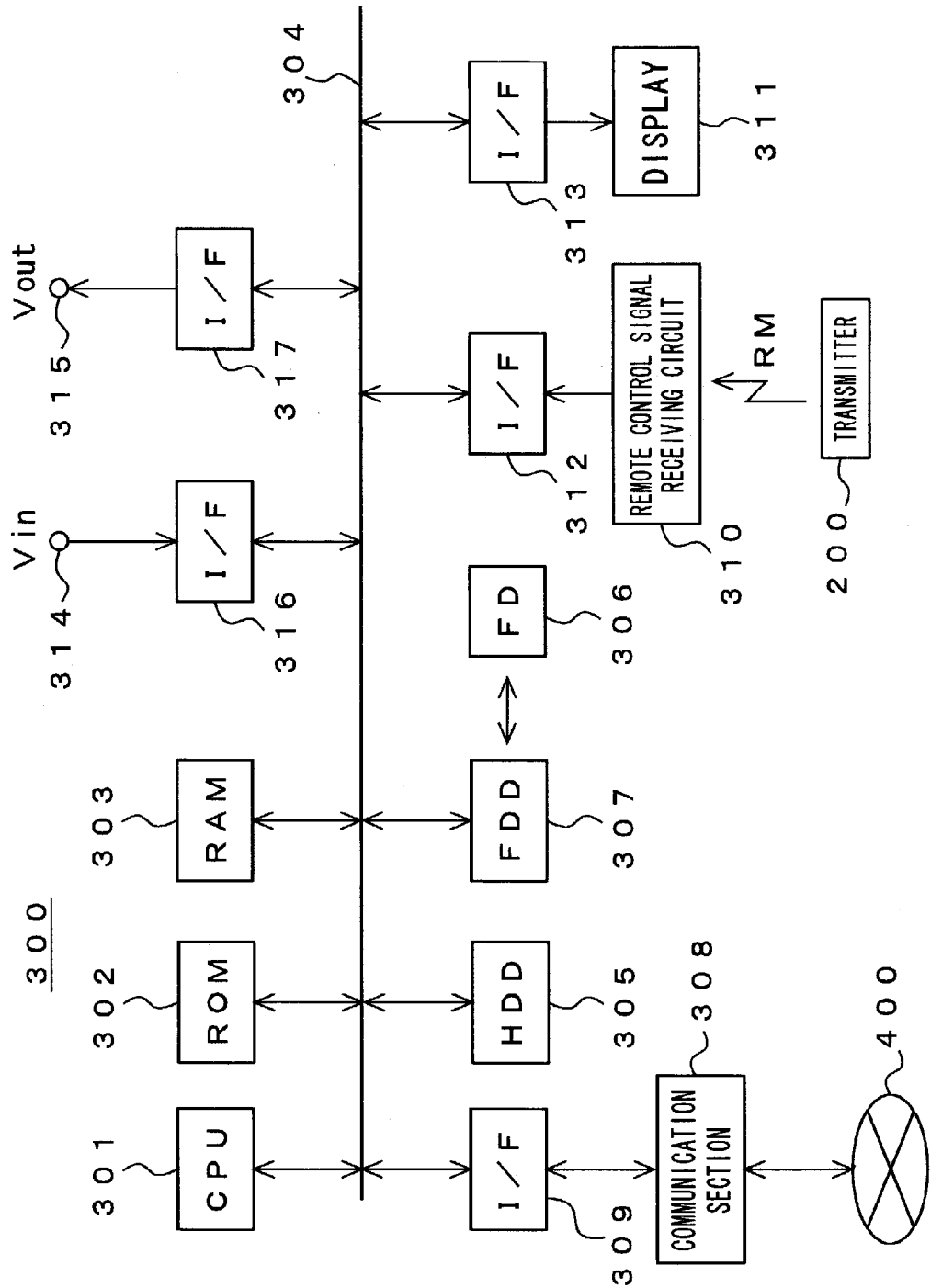
FIG. 12 is a block diagram showing an exemplary structure of an image signal processor to be implemented in software.

In addition, the processing performed in the image signal processing section 110 shown in FIG. 1 can be implemented in software, by use of an image signal processor such as the image signal processor 300 as shown in FIG. 12.

First, the image signal processor 300 shown in FIG. 12 will be described. The image signal processor 300 comprises a CPU 301 for controlling operations of the entire apparatus, a ROM (Read Only Memory) 302 for storing an operation program for the CPU 301, the coefficient seed data, and the like, and a RAM (Random Access Memory) 303 for organizing a working area for the CPU 301. These CPU 301, ROM 302 and RAM 303 are connected to a bus 304, respectively.

The image signal processor 300 also comprises a hard disc drive (HDD) 305 as an external storage apparatus, and a disc drive (FDD) 307 for driving a Floppy (Trade Name) disc 306. These drives 305, 307 are connected to the bus 304, respectively.

The image signal processor 300 also comprises a communication section 308 for connecting to a communication network 400 such as the Internet through wired transmission or radio transmission. The communication section 308 is connected to the bus 304 via an interface 309.

The image signal processor 300 also comprises a user interface section. The user interface section includes a remote control signal receiving circuit 310 for receiving a remote control signal, RM, from a remote control transmitter 200, and a display 311 constituted by a liquid crystal display (LCD) and the like. The receiving circuit 310 is connected to the bus 304 via an interface 312, and similarly, the display 311 is connected to the bus 304 via the interface 313.

The image signal processor 300 also comprises an input terminal 314 for receiving a 525i signal as an input image signal, Vin, and an output terminal 315 for transmitting an output image signal, Vout. The input terminal 314 is connected to the bus 304 via an interface 316, and similarly, the output terminal 315 is connected to the bus 304 via an interface 317.

The processing program, the coefficient seed data and the like may be, instead of being stored into the ROM 302 beforehand as described above, downloaded from the communication network 400 such as the Internet via the communication section 308 so as to be stored into the hard disc or the RAM 303, and then be used. Further, the processing program, the coefficient seed data and the like may be provided in the state of being stored in the Floppy (Trade Name) disc 306.

Further, the 525i signal as the input image signal, Vin, may be, instead of being received through the input terminal 314, recorded in a hard disc beforehand, or may be downloaded from the communication network 400 such as the Internet via the communication section 308.

In addition, the output image signal, Vout, may be, instead of or at the same time of being transmitted through the output terminal 315, supplied to the display 311 so as to display an image. Alternatively, the output image signal, Vout, may be stored in a hard disc, or may be transmitted to the communication network 400 such as the Internet via the communication section 308.

Referring to a flow chart of FIG. 13, a processing procedure for obtaining the output image signal, Vout, from an input image signal, Vin, in the image signal processor 300 shown in FIG. 12 will be described.

First, a processing starts in Step ST1. Then, in Step ST2, input image signal, Vin, is input in the unit of frame or in the unit of field through the input terminal 314. If the input image signal, Vin, is input through the input terminal 314, the RAM 303 temporarily stores the pixel data constituting the input image signal, Vin. If the input image signal, Vin, is recorded on the hard disc, the input image signal, Vin, is read out of the hard disc drive 307 and then the RAM 303 temporarily stores the pixel data constituting the input image signal, Vin. Then, in Step ST3, it is judged whether or not the processing of the input image signal, Vin, is finished for all frames or all fields. If the processing is finished, then the processing finishes in Step ST4. Contrarily, if the processing has not yet finished, then the procedure goes to Step ST5.

In this Step ST5, the values of parameters, g and f for determining the horizontal and vertical resolutions selected by the user through operating the remote control transmitter 200 are obtained from the RAM 303, for example. Then, in the Step ST6, the sets of coefficient data of the upper layered production equation (see the Equation (6)) for each class are produced according to the lower layered production equation (see the Equation (7)) using the obtained values of parameters, g and f, and the coefficient seed data of each class, and the sets of coefficient data thus produced are stored in the RAM 303.

In the Step ST7, pixel data of class tap and pixel data of prediction tap are obtained from the pixel data of the input image signal, Vin, input in Step ST2, in correspondence with each set of pixel data within the unit pixel block constituting the output image signal, Vout, to be produced. Then, a class code CL is produced from the pixel data of the class tap obtained in Step ST7.

Next, in the Step ST9, phase information h, v about each pixel within the unit pixel block constituting the output image signal, Vout, is generated using the value of n/m in compliance with the conversion method (including the magnification of an image to be displayed) selected by the user through operating the remote control transmitter 200. Then, in the Step ST10, the set(s) of coefficient data, Wi, of the estimated equation (see the Equation (4)) is/are produced corresponding to each pixel within the unit pixel block according to the upper layered production equation using the phase information h, v about each pixel within the unit pixel block and the coefficient data of the upper layered production equation of the class corresponding to the class code CL produced in the Step ST8.

Then, in Step ST11, data of each pixel within the unit pixel block constituting the output image signal, Vout, is produced according to the estimated equation using the set(s) of coefficient data, Wi, produced in the Step ST10 and the pixel data of the prediction tap obtained in the Step ST7. Then, in Step ST12, it is judged whether or not the processing for obtaining the pixel data of the output image signal, Vout, finishes in all the areas of the input pixel data of the input image signal, Vin, in the unit of frame or field. If the processing finishes, then the procedure returns to the Step ST2 where the procedure goes to a processing of inputting input image signal, Vin, in the next frame or field. Contrarily, if the processing has not yet finished, then the procedure goes to Step ST7 where the same processing as described above is repeated.

Figure 13:
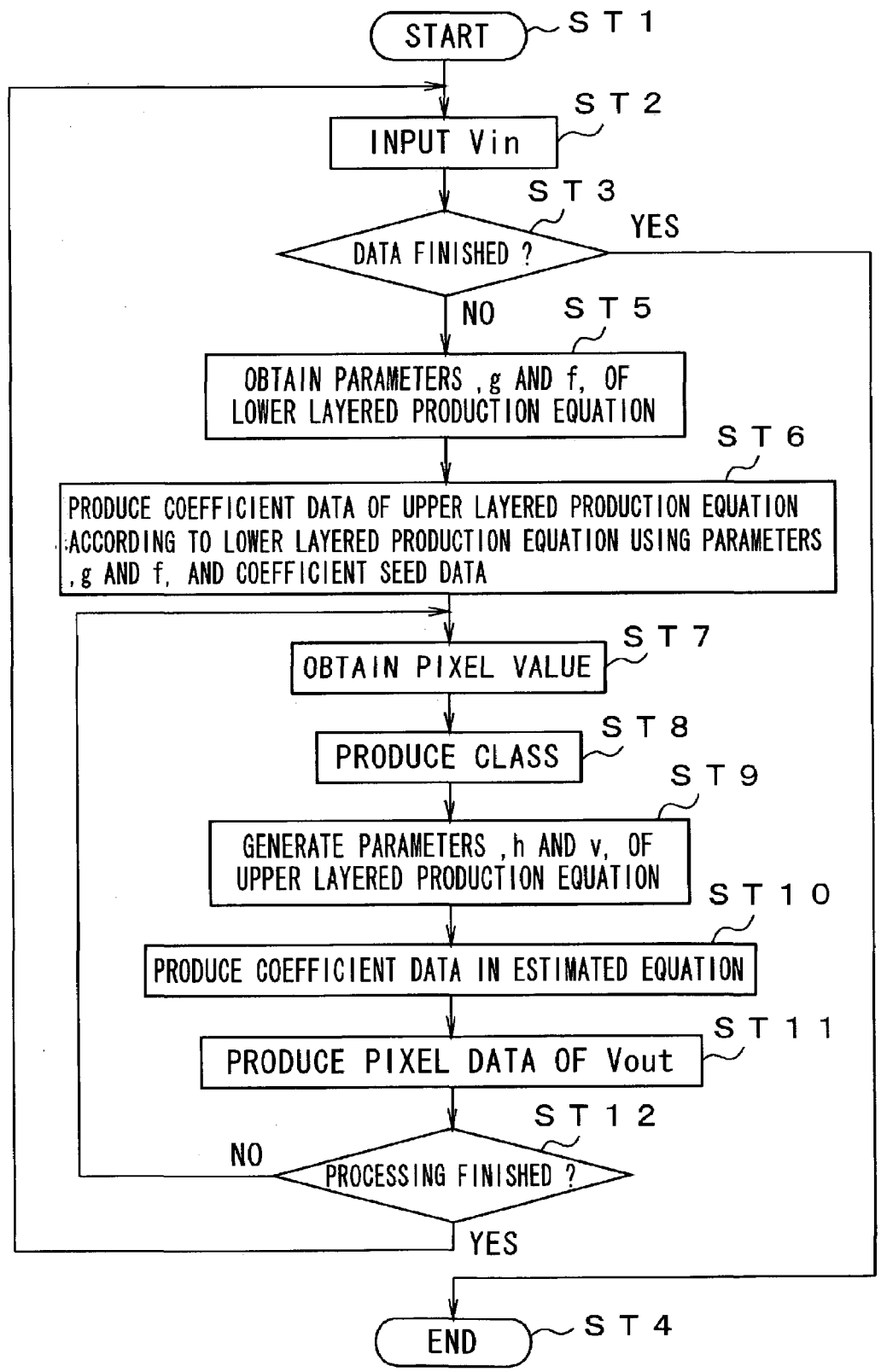
FIG. 13 is a flow chart showing a procedure of processing an image signal.

In the manner as described above, the pixel data of the input image signal, Vin, which has been input is processed by performing the processing in accordance with the flow chart shown in FIG. 13 so that the pixel data of the output image signal, Vout, can be obtained. As described above, the output image signal, Vout, obtained as a result of the processing is transmitted to the output terminal 315, or is supplied to the display 311 to display an image produced thereby. Alternatively, the output image signal, Vout, is supplied to the hard disc drive 305 to be recorded on the hard disc.

In addition, the processing in the coefficient seed data production device 150 shown in FIG. 8 can be implemented in software, although an illustration of the processing device thereof is omitted from the drawings.

Referring to the flow chart of FIG. 14, a processing procedure for producing coefficient seed data will be described.

First, a processing starts in Step ST21. Then, in Step ST22, phase shift values (for example, specified by parameters H, V) of the SD signal to be used for learning are selected. Then, in Step ST23, it is judged whether or not the learning has been completed for all the phase shift values. If the learning has not yet completed for all the phase shift values, then the procedure goes to Step ST24.

In the Step ST24, already-known HD pixel data is input in the unit of frame or field. Then, in Step ST25, it is judged whether or not the processing has been completed for all the HD pixel data. If the processing is completed, then the procedure returns to the Step ST22 where the next phase shift value is selected and the same processing as described above is repeated. Contrarily, if the processing has not yet completed, then the procedure goes to Step ST26.

In Step ST26, SD pixel data having a phase shifted by the phase shift value selected in the Step ST22 is produced from the HD pixel data which have been input in the Step ST24. Then, in Step ST27, pixel data of class tap and pixel data of prediction tap are obtained from the SD pixel data produced in the Step ST26, in correspondence with each set of HD pixel data input in the Step ST24. Then, in Step ST28, it is judged whether or not the learning has been completed for all the areas in the produced SD pixel data. If the learning is completed, then the procedure returns to the Step ST24 wherein the next HD pixel data is input and the same processing as described above is repeated. Contrarily, if the learning has not yet completed, then the procedure goes to Step ST29.

In the Step ST29, a class code CL is produced from the SD pixel data of the class tap obtained in the Step ST27. Then, in Step ST30, a normal equation (see the Equation (14)) is produced. After that, the procedure returns to the Step ST27.

If the learning is completed for all the phase shift values in the Step ST23, then the procedure goes to Step ST31. In the Step ST31, the normal equation is solved by a method such as sweeping so that the sets of coefficient data, $w_{i,0}$ to $w_{i,80}$ (i=1 to n) of the production equation (see the Equation (5)) that is still far from being classified in a hierarchy, for each class can be obtained.

In the Step ST32, sets of the coefficient data, $b_{ij0}$ to $b_{ij8}$, of the lower layered production equation (according to the equation (7)) are obtained for each class from the sets of coefficient data, $W_{i,0}$ to $W_{i,80}$ based on the relationship between the upper layered production equation (according to the equation (6)) and the upper layered production equation (according to the equation (7)). Then, in Step ST33, the sets of the coefficient data, $b_{ij0}$ to $b_{ij8}$, are stored in the memory as the coefficient seed data, and after that, the processing finishes in Step ST34.

Figure 14:
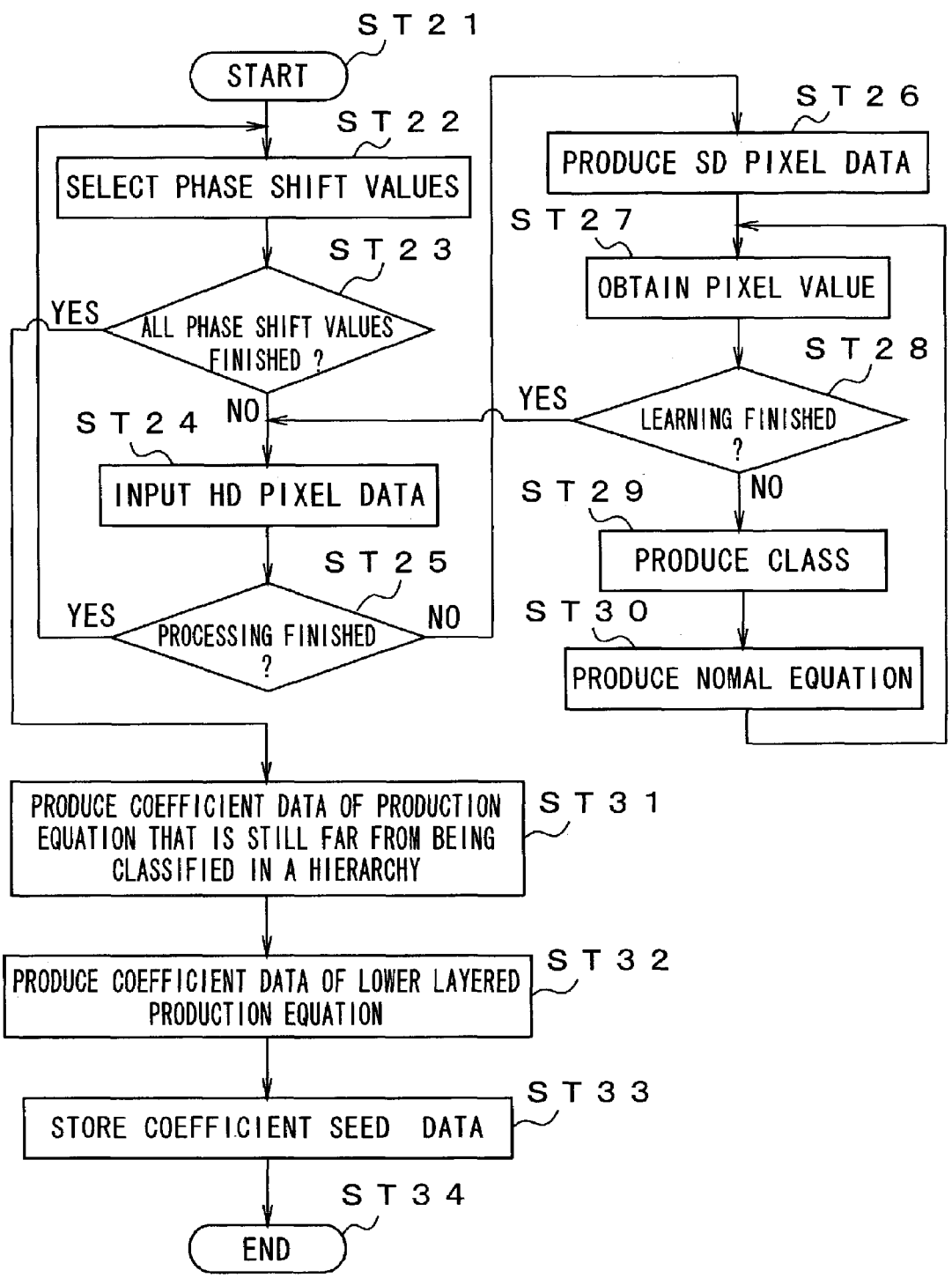
FIG. 14 is a flow chart showing processing for producing coefficient seed data.

As described above, the coefficient seed data for each class can be obtained in the same procedure as that employed in the coefficient seed data production device 150 shown in FIG. 8, through the processing along the flow chart shown in FIG. 14.

In addition, the processing in the coefficient seed data production device 150' shown in FIG. 11 can be also implemented in software, although an illustration of the processing device thereof is omitted from the drawings.

Referring to the flow chart of FIG. 15, a processing procedure for producing coefficient seed data will be described.

First, a processing starts in Step ST41. Then, in Step ST42, phase shift values (for example, specified by parameters H, V) of the SD signal to be used for learning are selected. Then, in Step ST43, it is judged whether or not a calculation processing for coefficient data has been finished for all the phase shift values. If it has not yet finished, then the procedure goes to Step ST44.

In the Step ST44, already-known HD pixel data is input in the unit of frame or field. Then, in Step ST45, it is judged whether or not the processing has been completed for all the HD pixel data. If the processing has not yet completed, the procedure goes to Step ST46 where SD pixel data having a phase shifted by the phase shift value selected in the Step ST42 is produced from the HD pixel data which have been input in the Step ST44.

Then, in Step ST47, pixel data of class tap and pixel data of prediction tap are obtained from the SD pixel data produced in the Step ST46, in correspondence with each HD pixel data input in the Step ST44. Then, in Step ST48, it is judged whether or not the learning has been completed for all the areas in the produced SD pixel data. If the learning is completed, then the procedure returns to the Step ST44 where the next HD pixel data is input and the same processing as described above is repeated. Contrarily, if the learning has not yet completed, then the procedure goes to Step ST49.

In the Step ST49, a class code CL is produced from the SD pixel data of the class tap obtained in the Step ST47. Then, in Step ST50, a normal equation (see the Equation (22)) is produced to be used for obtaining the coefficient data. After that, the procedure returns to the Step ST47.

If the processing is completed for all the HD pixel data in the Step ST45 described above, then the normal equation produced in the Step ST 50 is solved by a method such as sweeping in Step ST 51 where the coefficient data for each class can be obtained. After that, the procedure returns to the Step ST42 where the next phase shift value is selected and the same processing as described above is repeated so that coefficient data corresponding to the next phase shift value for each class can be obtained.

If the coefficient data has been obtained for all the phase shift values in the Step ST43 described above, then the procedure goes to Step ST52. In the Step ST52, a normal equation (see the Equation (27)) employed for obtaining the coefficient data of the production equation (according to the Equation (5)) that is far from being classified in a hierarchy is produced from the coefficient data with respect to all the phase shift values.

Then, in Step ST 53, the normal equation produced in the Step ST52 is solved by a method such as sweeping so that the sets of coefficient data, $W_{i,0}$ to $W_{i,80}$, of the production equation (see the Equation (5)) that is far from being classified in a hierarchy, for each class can be obtained.

Then, the sets of the coefficient data, $b_{ij0}$ to $b_{ij8}$, of the lower layered production equation (see the Equation (7)) are obtained for each class from the sets of coefficient data, $W_{i,0}$ to $W_{i,80}$, based on the relationship between the upper layered production equation (according to the equation (6)) and the upper layered production equation (according to the equation (7)). In Step ST55, the sets of the coefficient data, $b_{ij0}$ to $b_{ij8}$, are stored in the memory as the coefficient seed data, and after that, the processing finishes in Step ST56.

Figure 15:
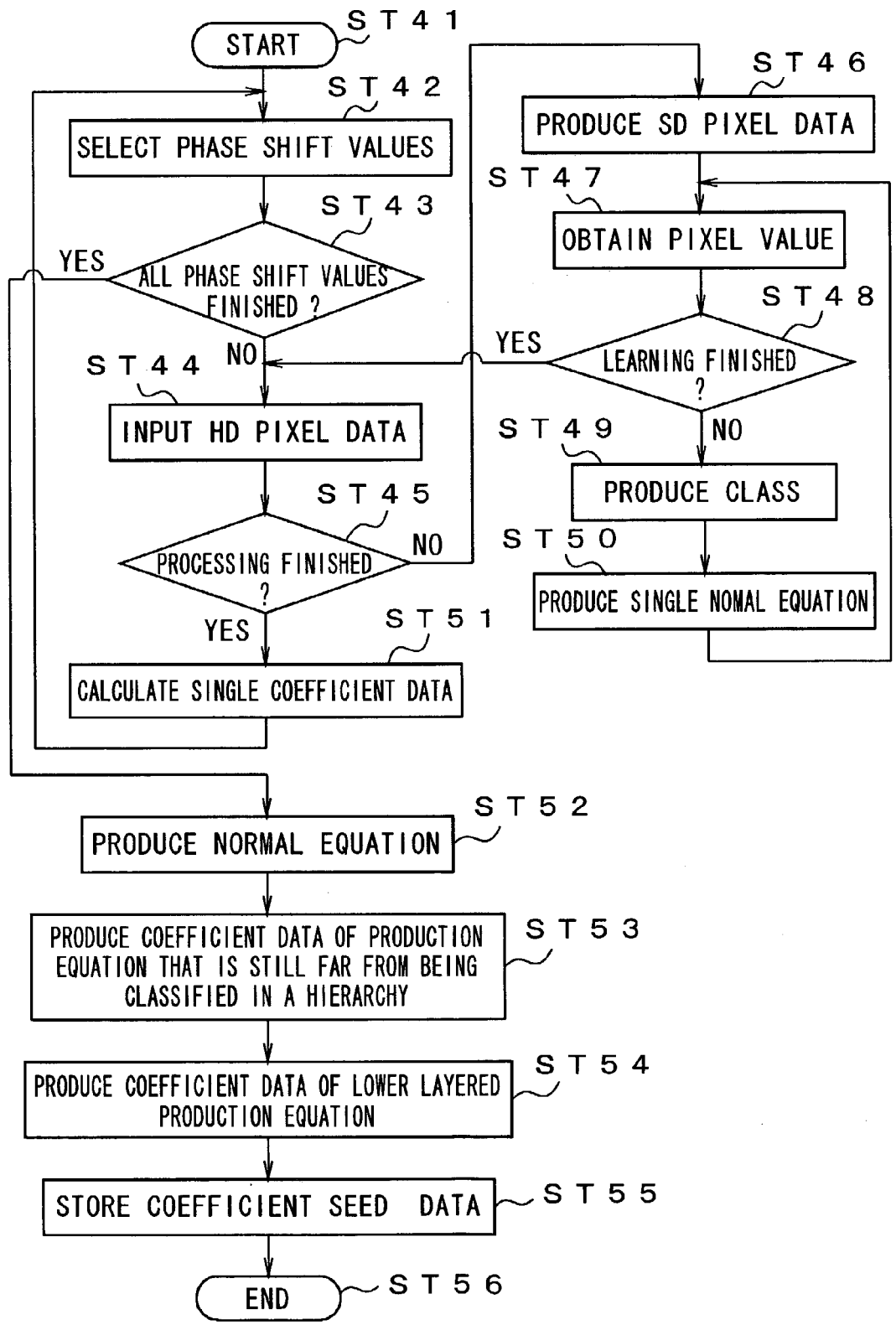
FIG. 15 is a flow chart showing another processing for producing coefficient seed data.

As described above, the coefficient seed data for each class can be obtained in the same procedure as that employed in the coefficient seed data production device 150' shown in FIG. 11, through the processing along the flow chart shown in FIG. 15.

Although, in the embodiments described above, a linear equation is employed as the estimated equation used when producing the output image signal, Vout, the present invention is not limited thereto. Alternatively, a high order polynomial equation may be employed as the estimated equation.

Further, in the embodiments described above, the class code CL is detected, and the coefficient data, Wi, corresponding to the detected class code is used in the estimated prediction calculation. However, it is also conceivable to omit the detected portion of the class code CL. In this case, only one kind of sets of coefficient seed data, $b_{ij0}$ to $b_{ij8}$, is stored in the lower coefficient memory section 136.

Further, although, in the embodiments described above, the space class and the movement class have been obtained as the class, this invention is not limited thereto. Alternatively, a class other than these classes may be obtained on the basis of various characteristic amounts such as whether or not there is an edge, and/or degrees of auto-correlation and it is available therefor.

Further, although, in the embodiments described above, the resolution and the phase information have been used as the parameter, this invention is not limited thereto. This invention is similarly applicable to a case where the parameter for indicating how quality image, sound or the like has, for example, degree of noise reduction, is used.

Further, although, in the embodiments described above, it has been shown that the parameters, g and f, included in the lower layered production equation (according to the Equation (7)) are updated (obtained) for each period of the unit of field or the unit of frame, a period for updating (obtaining)

the parameters, g and f, is not limited thereto in this invention. This is, the values of parameters included in the production equation of various layers may be constituted as to be separately updated (obtained) every calculation of the predetermined sets of informational data.

Further, although, in the embodiments described above, the output image signal, Vout, transmitted from the image signal processing section 110 is supplied to the display section 111 wherein an image created by the output image signal, Vout, is displayed, the output image signal, Vout, may be supplied into a recording device such as a video tape recorder which records it. In this case, the output image signal, Vout, may be processed in the post-processing circuit 129 in such a manner as to have a data structure optimum for recording.

Further, in the embodiments described above, the 525i signal as the input image signal, Vin, is converted into the 1080i signal, the XGA signal, or the 525i signal for obtaining an image to be displayed in a different magnification, as the output image signal, Vout. However, the present invention is not limited thereto. It is a matter of course that the preset invention is similarly applicable to another cases where a first image signal is converted into a second image signal using an estimated equation.

Further, although the embodiments described above have showed the example where the information signal is an image signal, the present invention is not limited thereto. For example, the present invention is also applicable to a case where the information signal is a sound signal.

According to the present invention, the coefficient data in the estimated equation used when a first information signal is to be converted into a second information signal, is produced using the coefficient seed data, thereby easily obtaining the coefficient data corresponding to the set plural parameters. As a result, it becomes possible to eliminate a necessity of a memory for storing a large amount of coefficient data.

Further, according to the present invention, the coefficient data in the estimated equation is produced using the production equation classified in a hierarchy in more than one layers, thereby reducing the processing amount in each step and the scale of the hardware, and making effective use thereof.

Further, according to the present invention, when the higher in layers the production equation classified in a hierarchy in more than one layers includes parameter with a higher update frequency, the lower in layers the production equation includes parameter with a lower update frequency, thereby reducing operational frequency of the production equation in lower layer.

INDUSTRIAL APPLICABILITY

As described above, an information signal processor, a method for processing an information signal, an image signal processor, a method for processing image signal, an image display apparatus using the same, a coefficient seed data production device used in the same, a method for producing coefficient seed data, and computer-readable medium and program according to the present invention are preferable for use in the case of converting a format such as a case where the 525i signal is converted into the 1080i signal, a case where the 525i signal is converted into the XGA signal and the like, or converting an image size.

What is claimed is:

1. An information signal processor for converting a first information signal including plural sets of informational data into a second information signal including plural sets of informational data, comprising:

parameter-setting means for setting values of plural parameters in connection with said second information signal;

first memory means for storing coefficient seed data, said coefficient seed data being coefficient data in a production equation for producing coefficient data to be used in an estimated equation, said production equation being classified in a hierarchy in more than one layers, the lowest layered production equation including said plural parameters and said coefficient seed data;

coefficient data generation means for generating said coefficient data to be used in the estimated equation corresponding to the values of plural parameters set by said parameter-setting means, said coefficient data in the estimated equation being produced according to the production equation classified in a hierarchy in more than one layers using said coefficient seed data stored in said first memory means and said set values of plural parameters;

first data selection means for selecting plural sets of first informational data located in periphery of target position in said second information signal, based on said first information signal; and calculation means for calculating and obtaining informational data of said target position based on said estimated equation using said coefficient data generated in said coefficient data generation means and said plural sets of the first informational data selected in said first data selection mean.

2. The information signal processor according to the claim 1, wherein, in each layered production equation, said values of parameters are updated every time said calculation means calculates a predetermined set of informational data.

3. The information signal processor according to the claim 1, wherein each layered production equation constituting said production equation classified in a hierarchy in more than one layers includes parameter with update frequency of the parameter becoming higher as the layers goes up.

4. The information signal processor according to the claim 1, further comprising:

second data selection means for selecting plural sets of second informational data located in periphery of the target position in said second information signal, based on said first information signal; and class detection means for detecting a class including said informational data at said target position, based on said plural sets of second informational data selected in said second data selection means, wherein said first memory means stores said coefficient seed data obtained beforehand for each class detected in the class detection means, and wherein said coefficient data generation means generates the coefficient data in the estimated equation corresponding to the class detected in said class detection means and said values of plural parameters set by said parameter-setting means.

5. The information signal processor according to the claim 1, wherein said coefficient data generation means further includes:

a single product-sum device for calculating each layered production equation constituting said production equation classified in a hierarchy in more than one layers; and second memory means for storing coefficient data in the production equation in a second layer for calculating the production equation in the second layer, said second layer being higher than first layer given by the calculation of said product-sum device according to the production equation of the first layer.

6. The information signal processor according to the claim 1, further comprising:
    addition means for obtaining a sum of the coefficient data in said estimated equation generated in said coefficient data generation means; and
    normalization means for normalizing with the informational data at said target position obtained in said calculation means being divided by said sum obtained in said addition means.

7. An image signal processor for converting a first image signal including plural sets of pixel data into a second image signal including plural sets of pixel data, comprising:
    parameter-setting means for setting values of plural parameters in connection with the second image signal;
    first memory means for storing coefficient seed data, said coefficient seed data being coefficient data in production equation for producing coefficient data to be used in an estimated equation, said production equation being classified in a hierarchy in more than one layers, the lowest layered production equation including said plural parameters and said coefficient seed data;
    coefficient data generation means for generating the coefficient data to be used in the estimated equation corresponding to the values of plural parameters set by said parameter-setting means, said coefficient data in the estimated equation being produced according to the production equation classified in a hierarchy in more than one layers using said coefficient seed data stored in said first memory means and said set values of plural parameters;
    first data selection means for selecting plural sets of first pixel data located in periphery of target position in the second image signal, based on the first image signal; and
    calculation means for calculating and obtaining pixel data of the target position based on the estimated equation using said coefficient data generated in said coefficient data generation means and said plural sets of the first pixel data selected in said first data selection means.

8. The image signal processor according to the claim 7, wherein, in each layered production equation, said values of parameters are updated every time said calculation means calculates a predetermined set of informational data.

9. The image signal processor according to the claim 7, wherein each layered production equation constituting said production equation classified in a hierarchy in more than one layers includes parameter with update frequency of the parameter becoming higher as the layers goes up.

10. The image signal processor according to the claim 7, further comprising:
    second data selection means for selecting plural sets of second pixel data located in periphery of the target position in said second image signal, based on said first image signal; and
    class detection means for detecting a class including said pixel data at said target position, based on said plural sets of second pixel data selected in said second data selection means,
    wherein said first memory means stores said coefficient seed data obtained beforehand for each class detected in the class detection means, and
    wherein said coefficient data generation means generates the coefficient data in the estimated equation corresponding to the class detected in said class detection means and said values of plural parameters set by said parameter-setting means.

11. The image signal processor according to the claim 7, wherein said coefficient data generation means further includes:
    a single product-sum device for calculating each layered production equation constituting said production equation classified in a hierarchy in more than one layers; and
    second memory means for storing coefficient data in the production equation in a second layer for calculating the production equation in the second layer, said second layer being higher than first layer given by the calculation of said product-sum device according to the production equation of the first layer.

12. The image signal processor according to the claim 7, wherein said plural parameters set in said parameter-setting means comprises a first parameter for determining image quality of image obtained in accordance with the second image signal and a second parameter indicating phase information of the target position in said second image signal; and
    Wherein said production equation for producing the coefficient data in the estimated equation is classified in a hierarchy in upper and lower layers, said lower layered production equation including said first parameter, said upper layered production equation including said second parameter.

13. The image signal processor according to the claim 12, wherein said coefficient data generation means generates the coefficient data in said upper layered production equation corresponding to the value of said first parameter, during vertical blanking period of said second image signal, according to said lower layered production equation using the coefficient seed data stored in said first memory means and the value of said first parameter set by said parameter-setting means while said coefficient data generation means generates the coefficient data in said estimated equation corresponding to the values of said first and second parameters, during effective vertical scanning period of said second image signal, according to said upper layered production equation using the produced coefficient data in said upper layered production equation and the value of said second parameter set by said parameter-setting means.

14. The image signal processor according to the claim 12, further comprising:
    second data selection means for selecting plural sets of second pixel data located in periphery of the target position in said second image signal, based on said first image signal; and
    class detection means for detecting a class including said pixel data at said target position, based on said plural sets of second pixel data selected in said second data selection means,
    wherein said first memory means stores said coefficient seed data obtained beforehand for each class detected in said class detection means, and
    wherein said coefficient data generation means generates the coefficient data in said upper layered production equation corresponding to the value of said first parameter, during vertical blanking period of said second image signal, every class detected by said class detection means according to said lower layered production equation using the coefficient seed data stored in said first memory means and the value of said first parameter set by said parameter-setting means while said coefficient data generation means generates the coefficient data in said estimated equation corresponding to the values of said first and second parameters and the class detected by said class detection means, during effective vertical scanning period of said second image signal, according to said upper layered production equation using the coefficient data in said upper layered production equation in connection with the class detected by said class detection means from among the obtained coefficient data in said upper layered production equation of every class and the value of said second parameter set by said parameter-setting means.

15. The image signal processor according to the claim 7, further comprising:
addition means for obtaining a sum of the coefficient data in said estimated equation generated in said coefficient data generation means; and
normalization means for normalizing with the pixel data at said target position obtained in said calculation means being divided by said sum obtained in said addition means.

16. An image display apparatus comprising:
image signal input means for inputting a first image signal including plural sets of pixel data;
image signal processing means for converting said first image signal received from said image signal input means into a second image signal including plural sets of pixel data and for outputting the resultant second image signal;
image display means for displaying an image produced by the second image signal received from said image signal processing means onto an image display element; and
parameter-setting means for setting values of plural parameters in connection with the second image signal,
wherein said image signal processing means includes:
first memory means for storing coefficient seed data, said coefficient seed data being coefficient data in a production equation for producing coefficient data to be used in an estimated equation, said production equation being classified in a hierarchy in more than one layers, the lowest layered production equation including said plural parameters and the coefficient seed data;
coefficient data generation means for generating the coefficient data to be used in said estimated equation corresponding to the values of plural parameters set by said parameter-setting means, said coefficient data in the estimated equation being produced according to the production equation classified in a hierarchy in more than one layers using said coefficient seed data stored in said first memory means and the set values of said plural parameters;
data selection means for selecting plural sets of first pixel data located in periphery of the target position in said second image signal, based on said first image signal; and
calculation means for calculating and obtaining pixel data of the target position based on said estimated equation using said coefficient data generated in said coefficient data generation means and the plural sets of said first pixel data selected in said data selection means.

17. The image display apparatus according to the claim 16, wherein, in each layered production equation, said values of parameters are updated every time said calculation means calculates a predetermined set of informational data.

18. The image display apparatus according to the claim 16, wherein each layered production equation constituting said production equation classified in a hierarchy in more than one layers includes parameter with update frequency of the parameter becoming higher as the layers goes up.

19. The image display apparatus according to the claim 16, further comprising:
second data selection means for selecting plural sets of second pixel data located in periphery of target position in said second image signal, based on said first image signal; and
class detection means for detecting a class including said pixel data at said target position, based on said plural sets of second pixel data selected in said second data selection means,
wherein said first memory means stores said coefficient seed data obtained beforehand for each class detected in said class detection means, and
wherein said coefficient data generation means generates the coefficient data in said estimated equation corresponding to the class detected in said class detection means and said values of plural parameters set by said parameter-setting means.

20. The image display apparatus according to the claim 16, wherein said coefficient data generation means further includes:
a single product-sum device for calculating each layered production equation constituting said production equation classified in a hierarchy in more than one layers; and
second memory means for storing coefficient data in the production equation in a second layer for calculating the production equation in the second layer, said second layer being higher than first layer given by the calculation of said product-sum device according to the production equation of the first layer.

21. The image display apparatus according to the claim 16, wherein said plural parameters set in said parameter-setting means comprises a first parameter for determining image quality of image obtained in accordance with sad second image signal and a second parameter indicating phase information of the target position in said second image signal; and
wherein said production equation for producing the coefficient data in the estimated equation is classified in a hierarchy in upper and lower layers, said lower layered production equation including said first parameter, said upper layered production equation including said second parameter.

22. The image display apparatus according to the claim 21, wherein said coefficient data generation means generates the coefficient data in said upper layered production equation corresponding to the values of said first parameter, during vertical blanking period of said second image signal, according to said lower layered production equation using the coefficient seed data stored in said first memory means and the value of said first parameter set by said parameter-setting means while said coefficient data generation means generates the coefficient data in said estimated equation corresponding to the values of said first and second parameters, during effective vertical scanning period of said second image signal, according to said upper layered production equation using the produced coefficient data in said upper layered production equation and the value of said second parameter set by said parameter-setting means.

23. The image display apparatus according to the claim 21, further comprising:

second data selection means for selecting plural sets of second pixel data located in periphery of the target position in said second image signal, based on said first image signal; and class detection means for detecting a class including said pixel data at said target position, based on said plural sets of second pixel data selected in said second data selection means, wherein said first memory means stores said coefficient seed data obtained beforehand for each class detected in said class detection means, and wherein said coefficient data generation means generates the coefficient data in said upper layered production equation corresponding to the value of said first parameter, during vertical blanking period of said second image signal, every class detected by said class detection means according to said lower layered production equation using the coefficient seed data stored in said first memory means and the value of said first parameter set by said parameter-setting means while said coefficient data generation means generates the coefficient data in said estimated equation corresponding to the values of said first and second parameters and the class detected by said class detection means, during effective vertical scanning period of said second image signal, according to said upper layered production equation using the coefficient data in said upper layered production equation of the class detected by said class detection means from among the obtained coefficient data in said upper layered production equation in connection with every class and the value of said second parameter set by said parameter-setting means.

24. The image display apparatus according to the claim 16, further comprising:

addition means for obtaining a sum of the coefficient data in said estimated equation generated in said coefficient data generation means; and normalization means for normalizing with the pixel data at said target position obtained in said calculation means being divided by said sum obtained in said addition means.

25. A method for processing an information signal wherein a first information signal including plural sets of informational data is converted into a second information signal including plural sets of informational data, the method comprising:

a first step of setting values of plural parameters in connection with said second information signal;

a second step of generating coefficient data to be used in estimated equation corresponding to the values of plural parameters set by the first step, said coefficient data in the estimated equation being produced according to a production equation classified in a hierarchy in more than one layers using coefficient seed data and the set values of plural parameters, said coefficient seed data being coefficient data in the production equation for producing coefficient data to be used in an estimated equation, the lowest layered production equation including the plural parameters and said coefficient seed data;

a third step of selecting plural sets of first informational data located in periphery of a target position in said second information signal, based on the first information signal; and a fourth step of calculating and obtaining informational data of said target position based on said estimated equation using said coefficient data generated in said second step and the plural sets of first informational data selected in the third step.

26. The method for processing an information signal according to the claim 25, wherein, in each layered production equation, said values of parameters are updated every time a predetermined set of informational data is calculated in said fourth step.

27. The method for processing an information signal according to the claim 25, wherein each layered production equation constituting said production equation classified in a hierarchy in more than one layers includes parameter with update frequency of the parameter becoming higher as the layers goes up.

28. The method for processing an information signal according to the claim 25, further comprising:

a fifth step of selecting plural sets of second informational data located in periphery of the target position in said second information signal, based on said first information signal; and a sixth step of detecting a class including the informational data of said target position, based on the plural sets of said second informational data selected in said fifth step, wherein the coefficient data in said estimated equation is produced in the second step corresponding to the class detected in said sixth step and the values of said plural parameters set in said first step.

29. The method for processing an information signal according to the claim 25, further comprising:

a seventh step of obtaining a sum of the coefficient data in said estimated equation generated in the second step; and an eighth step of normalizing with said informational data at said target position obtained in the fourth step being divided by said sum obtained in said seventh step.

30. A computer readable medium for recording program to allow a computer to execute a method for processing an information signal in order to convert a first information signal including plural sets of informational data into a second information signal including plural sets of informational data, the method comprising:

a first step of setting values of plural parameters in connection with said second information signal;

a second step of generating coefficient data to be used in estimated equation corresponding to the values of plural parameters set by the first step, said coefficient data in the estimated equation being produced according to a production equation classified in a hierarchy in more than one layers using coefficient seed data and the set values of plural parameters, said coefficient seed data being coefficient data in the production equation for producing coefficient data to be used in an estimated equation, the lowest layered production equation including the plural parameters and said coefficient seed data;

a third step of selecting plural sets of first informational data located in periphery of a target position in said second information signal, based on the first information signal; and a fourth step of calculating and obtaining informational data of said target position, based on said estimated equation using said coefficient data generated in said second step and said plural sets of informational data selected in the third step.

31. A program for allowing a computer to execute a method for processing an information signal in order to convert a first information signal including plural sets of informational data into a second information signal including plural sets of informational data, the method comprising:

a first step of setting values of plural parameters in connection with said second information signal;

a second step of generating coefficient data to be used in estimated equation corresponding to the values of plural parameters set by the first step, said coefficient data in the estimated equation being produced according to a production equation classified in a hierarchy in more than one layers using coefficient seed data and the set values of plural parameters, said coefficient seed data being coefficient data in the production equation for producing coefficient data to be used in an estimated equation, the lowest layered production equation including the plural parameters and said coefficient seed data;

a third step of selecting plural sets of first informational data located in periphery of a target position in said second information signal based on the first information signal; and a fourth step of calculating and obtaining informational data of said target position based on said estimated equation using said coefficient data generated in said second step and said plural sets of informational data selected in the third step.

32. A method for processing an image signal wherein a first image signal including plural sets of pixel data is converted into a second image signal including plural sets of pixel data, the method comprising:

a first step of setting values of plural parameters in connection with said second image signal;

a second step of generating coefficient data to be used in estimated equation corresponding to the values of plural parameters set by the first step, said coefficient data in the estimated equation being produced according to a production equation classified in a hierarchy in more than one layers using coefficient seed data and said set values of plural parameters, said coefficient seed data being coefficient data in the production equation for producing the coefficient data to be used in an estimated equation, the lowest layered production equation including said plural parameters and the coefficient seed data;

a third step of selecting plural sets of first pixel data located in periphery of a target position in said second image signal, based on said first image signal; and a fourth step of calculating and obtaining pixel data of said target position based on said estimated equation using said coefficient data generated in said second step and the plural sets of said first pixel data selected in said third step.

33. The method for processing an image signal according to the claim 32 wherein, in each layered production equation, said values of parameters are updated every time a predetermined set of informational data is calculated in said fourth step.

34. The method for processing an image signal according to the claim 32, wherein each layered production equation constituting said production equation classified in a hierarchy in more than one layers includes parameter with update frequency of the parameter becoming higher as the layers goes up.

35. The method for processing an image signal according to the claim 32, further comprising:

a fifth step of selecting plural sets of second pixel data located in periphery of the target position in said second image signal, based on said first image signal; and a sixth step of detecting a class including the pixel data of said target position, based on the plural sets of said second pixel data selected in said fifth step, wherein the coefficient data in said estimated equation is produced in the second step corresponding to the class detected in said sixth step and the values of said plural parameters set in said first step.

36. The method for processing an image signal according to the claim 32, wherein said plural parameters set in said first step comprises a first parameter for determining image quality of image obtained in accordance with said second image signal and a second parameter indicating phase information of the target position in said second image signal; and wherein said production equation for producing the coefficient data in said estimated equation is classified in a hierarchy in upper and lower layers, said lower layered production equation including said first parameter, said upper layered production equation including said second parameter.

37. The method for processing an image signal according to the claim 36, wherein in said second step, the coefficient data in said upper layered production equation is produced corresponding to the value of said first parameter, during vertical blanking period of said second image signal, according to said lower layered production equation using said coefficient seed data and the value of said first parameter, and wherein the coefficient data in said estimated equation is generated corresponding to the values of said first and second parameters, during effective vertical scanning period of said second image signal, according to said upper layered production equation using the produced coefficient data in said upper layered production equation and the values of said second parameter.

38. The method for processing an image signal according to the claim 36, further comprising:

a fifth step of selecting plural sets of second pixel data located in periphery of the target position in said second image signal, based on said first image signal; and a sixth step of detecting a class including the pixel data of said target position, based on the plural sets of said second pixel data selected in said fifth step, wherein, in said second step, the coefficient data in said upper layered production equation is produced corresponding to the value of said first parameter in each class, during vertical blanking period of said second image signal, according to said lower layered production equation using the coefficient seed data of each class and the value of said first parameter, and wherein the coefficient data in said estimated equation is generated corresponding to the values of said first and second parameters and the class detected in said sixth step, during effective vertical scanning period of said second image signal, according to said upper layered production equation using the coefficient data in said upper layer production equation of the class detected in said sixth step from among the obtained coefficient data in said upper layered production equation of every class and the values of said second parameter.

39. The method for processing an image signal according to the claim 32, further comprising:

a seventh step of obtaining a sum of the coefficient data in said estimated equation generated in the second step; and an eighth step of normalizing with said pixel data at said target position obtained in the fourth step being divided by said sum obtained in said seventh step.

40. A computer readable medium for recording program to allow a computer to execute a method for processing an image signal in order to convert a first image signal including plural sets of pixel data into a second image signal including plural sets of pixel data, the method comprising:

a first step of setting values of plural parameters in connection with said second image signal;

a second step of generating coefficient data to be used in estimated equation corresponding to the values of plural parameters set by the first step, said coefficient data in the estimated equation being produced according to a production equation classified in a hierarchy in more than one layers using coefficient seed data and the set values of plural parameters, said coefficient seed data being coefficient data in the production equation for producing coefficient data to be used in an estimated equation, the lowest layered production equation including the plural parameters and said coefficient seed data;

a third step of selecting plural sets of first pixel data located in periphery of a target position in said second image signal, based on the first image signal; and a fourth step of calculating and obtaining pixel data at said target position, based on said estimated equation using said coefficient data generated in said second step and the plural sets of first pixel data selected in the third step.

41. A program for allowing a computer to execute a method for processing an image signal in order to convert a first image signal including plural sets of pixel data into a second image signal including plural sets of pixel data, the method comprising:

a first step of setting values of plural parameters in connection with said second image signal;

a second step of generating coefficient data to be used in estimated equation corresponding to the values of plural parameters set by the first step, said coefficient data in the estimated equation being produced according to a production equation classified in a hierarchy in more than one layers using coefficient seed data and the set values of plural parameters, said coefficient seed data being coefficient data in the production equation for producing coefficient data to be used in the estimated equation, the lowest layered production equation including the plural parameters and said coefficient seed data;

a third step of selecting plural sets of pixel data located in periphery of a target position in said second image signal, based on the first image signal; and a fourth step of calculating and obtaining pixel data at said target position, based on said estimated equation using said coefficient data generated in said second step and the plural sets of pixel data selected in the third step.

42. A coefficient seed data production device for producing coefficient seed data, said coefficient seed data being coefficient data in a production equation for producing coefficient data to be used in estimated equation employed when converting a first information signal including plural sets of informational data into a second information signal including plural sets of informational data, said production equation being classified in a hierarchy in more than one layers, the lowest layered production equation including the coefficient seed data, comprising:

parameter-setting means for setting values of plural parameters each for determining a situation of student signal corresponding to said first information signal in connection with values of plural parameters included in said production equation;

data selection means for selecting plural sets of informational data located in periphery of a target position in the teacher signal corresponding to said second information signal, based on said student signal;

normal equation production means for producing a normal equation for obtaining coefficient data in a production equation that is still far from being classified in a hierarchy in more than one layers, using the plural sets of informational data selected by said data selection means and the informational data at the target position in the teacher signal;

coefficient data calculation means for solving the normal equation to obtain the coefficient data in the production equation that is still far from being classified in a hierarchy; and coefficient seed data calculation means for obtaining as the coefficient seed data coefficient data in the lowest layered production equation constituting said production equation classified in a hierarchy in more than one layers, using the coefficient data in said production equation that is still far from being classified in a hierarchy, obtained in said coefficient data calculation means.

43. A method for producing coefficient seed data, said coefficient seed data being coefficient data in a production equation for producing coefficient data to be used in estimated equation employed when converting a first information signal including plural sets of informational data into a second information signal including plural sets of informational data, said production equation being classified in a hierarchy in more than one layers, the lowest layered production equation including the coefficient seed data, said method comprising:

a first step of setting values of plural parameters each for determining a situation of student signal corresponding to said first information signal in connection with values of plural parameters included in said production equation;

a second step of selecting plural sets of informational data located in periphery of a target position in teacher signal corresponding to said second information signal, based on the student signal;

a third step of producing a normal equation for obtaining the coefficient data in a production equation that is still far from being classified in a hierarchy in more than one layers, using said plural sets of informational data selected in the second step and the informational data at the target position in said teacher signal;

a fourth step of solving the normal equation produced in the third step to obtain coefficient data in said production equation that is still far from being classified in a hierarchy; and a fifth step of obtaining as the coefficient seed data coefficient data in the lowest layered production equation constituting the production equation classified in a hierarchy, using the coefficient data in said production equation that is still far from being classified in a hierarchy, obtained in the fourth step.

44. A computer readable medium for recording program to allow a computer to execute a method for producing coefficient seed data, said coefficient seed data being coefficient data in a production equation for producing coefficient data to be used in estimated equation employed when converting a first information signal including plural sets of informational data into a second information signal including plural sets of informational data, said production equation being classified in a hierarchy in more than one layers, the lowest layered production equation including the coefficient seed data, said method comprising:
- a first step of setting values of plural parameters each for determining a situation of student signal corresponding to said first information signal in connection with values of plural parameters included in said production equation;
- a second step of selecting plural sets of informational data located in periphery of a target position in teacher signal corresponding to said second information signal, based on the student signal;
- a third step of producing a normal equation for obtaining coefficient data in a production equation that is still far from being classified in a hierarchy in more than one layers, using the plural sets of informational data selected in the second step and the informational data at the target position in said teacher signal;
- a fourth step of solving the normal equation produced in the third step to obtain the coefficient data in said production equation that is still far from being classified in a hierarchy; and
- a fifth step of obtaining as the coefficient seed data coefficient data in the lowest layered production equation constituting the production equation classified in a hierarchy, using the coefficient data in said production equation that is still far from being classified in a hierarchy, obtained in the fourth step.

45. A program for allowing a computer to execute a method for producing coefficient seed data, said coefficient seed data being coefficient data in a production equation for producing coefficient data to be used in estimated equation employed when converting a first information signal including plural sets of informational data into a second information signal including plural sets of informational data, said production equation being classified in a hierarchy in more than one layers, the lowest layered production equation including the coefficient seed data, said method comprising:
- a first step of setting values of plural parameters each for determining a situation of student signal corresponding to said first information signal in connection with values of plural parameters included in said production equation;
- a second step of selecting plural sets of informational data located in periphery of a target position in teacher signal corresponding to said second information signal, based on the student signal;
- a third step of producing a normal equation for obtaining coefficient data in a production equation that is still far from being classified in a hierarchy in more than one layers, using the plural sets of informational data selected in the second step and the informational data at the target position in the teacher signal;
- a fourth step of solving the normal equation produced in the third step to obtain the coefficient data in said production equation that is still far from being classified in a hierarchy; and
- a fifth step of obtaining as the coefficient seed data coefficient data in the lowest layered production equation constituting said production equation classified in a hierarchy, using the coefficient data in said production equation that is still far from being classified in a hierarchy, obtained in the fourth step.

46. A coefficient seed data production device for producing coefficient seed data, the coefficient seed data being coefficient data in a production equation for producing coefficient data to be used in estimated equation employed when converting a first information signal including plural sets of informational data into a second information signal including plural sets of informational data, said production equation being classified in a hierarchy in more than one layers, the lowest layered production equation including the coefficient seed data, comprising:
- parameter-setting means for setting values of plural parameters each for determining a situation of student signal corresponding to the first information signal in connection with values of plural parameters included in said production equation;
- data selection means for selecting plural sets of informational data located in periphery of a target position in teacher signal corresponding to said second information signal, based on said student signal;
- first normal equation production means for producing a first normal equation for obtaining the coefficient data in the estimated equation every combination of values of plural parameters set by the parameter-setting means, using the plural sets of informational data selected by the data selection means and the informational data at the target position in said teacher signal;
- first coefficient data calculation means for solving said first normal equation to obtain said coefficient data in the estimated equation every combination described above;
- second normal equation production means for producing a second normal equation for obtaining coefficient data in a production equation that is still far from being classified in a hierarchy in more than one layers, from the coefficient data every combination described above obtained by said first coefficient data calculation means;
- second coefficient data calculation means for solving said second normal equation to obtain the coefficient data in the production equation that is still far from being classified in a hierarchy; and
- coefficient seed data calculation means for obtaining as the coefficient seed data coefficient data in the lowest layered production equation constituting the production equation classified in a hierarchy in more than one layers, using the coefficient data in the production equation that is still far from being classified in a hierarchy, obtained by said second coefficient data calculation means.

47. A method for producing:
- a first step of setting values of plural parameters each for determining a situation of student signal corresponding to said first information signal in connection with values of plural parameters included in said production equation;
- a second step of selecting plural sets of informational data located in periphery of a target position in teacher signal corresponding to said second information signal, based on said student signal;
- a third step of producing a first normal equation for obtaining the coefficient data in said estimated equation every combination of values of plural parameters set in said first step, using the plural sets of informational data selected in said second step and the informational data at the target position in said teacher signal;

a fourth step of solving said first normal equation produced in said third step to obtain the coefficient data in said estimated equation every combination described above;

a fifth step of producing a second normal equation for obtaining coefficient data in a production equation that is still far from being classified in a hierarchy in more than one layers, from the coefficient data every combination obtained in said fourth step;

a sixth step of solving said second normal equation produced in said fifth step to obtain the coefficient data in said production equation that is still far from being classified in a hierarchy; and a seventh step of obtaining as the coefficient seed data coefficient data in the lowest layered production equation constituting the production equation classified in a hierarchy in more than one layers, using the coefficient data in said production equation that is still far from being classified in a hierarchy, obtained in said sixth step.

48. A computer readable medium for recording program to allow a computer to execute a method for producing coefficient seed data, said coefficient seed data being coefficient data in a production equation for producing coefficient data to be used in estimated equation employed when converting a first information signal including plural sets of informational data into a second information signal including plural sets of informational data, said production equation being classified in a hierarchy in more than one layers, the lowest layered production equation including the coefficient seed data, said method:

a first step of setting values of plural parameters each for determining a situation of student signal corresponding to said first information signal in connection with values of plural parameters included in said production equation;

a second step of selecting plural sets of informational data located in periphery of a target position in teacher signal corresponding to said second information signal, based on said student signal;

a third step of producing a first normal equation for obtaining the coefficient data in said estimated equation every combination of values of plural parameters set in said first step, using the plural sets of informational data selected in said second step and the informational data at the target position in said teacher signal;

a fourth step of solving said first normal equation produced in said third step to obtain the coefficient data in said estimated equation every combination described above;

a fifth step of producing a second normal equation for obtaining coefficient data in a production equation that is still far from being classified in a hierarchy in more than one layers, from the coefficient data every combination obtained in said fourth step;

a sixth step of solving said second normal equation produced in said fifth step to obtain the coefficient data in said production equation that is still far from being classified in a hierarchy; and a seventh step of obtaining as the coefficient seed data coefficient data in the lowest layered production equation constituting the production equation classified in a hierarchy in more than one layers, using the coefficient data in said production equation that is still far from being classified in a hierarchy, obtained in said sixth step.

49. A program for allowing a computer to execute a method for producing coefficient seed data, said coefficient seed data being coefficient data in a production equation for producing coefficient data to be used in estimated equation employed when converting a first information signal including plural sets of informational data into a second information signal including plural sets of informational data, said production equation being classified in a hierarchy in more than one layers, the lowest layered production equation including the coefficient seed data, said method comprising:

a first step of setting values of plural parameters each for determining a situation of student signal corresponding to said first information signal in connection with values of plural parameters included in said production equation;

a second step of selecting plural sets of informational data located in periphery of a target position in teacher signal corresponding to said second information signal, based on said student signal;

a third step of producing a first normal equation for obtaining the coefficient data in said estimated equation every combination of values of plural parameters set in said first step, using the plural sets of informational data selected in said second step and the informational data at the target position in said teacher signal;

a fourth step of solving said first normal equation produced in said third step to obtain the coefficient data in said estimated equation every combination described above;

a fifth step of producing a second normal equation for obtaining coefficient data in a production equation that is still far from being classified in a hierarchy in more than one layers, from the coefficient data every combination obtained in said fourth step;

a sixth step of solving said second normal equation produced in said fifth step to obtain the coefficient data in said production equation that is still far from being classified in a hierarchy; and a seventh step of obtaining as the coefficient seed data coefficient data in the lowest layered production equation constituting the production equation classified in a hierarchy in more than one layers, using the coefficient data in said production equation that is still far from being classified in a hierarchy, obtained in said sixth step.

* * * * *